US012667093B1

(12) United States Patent
Zhong et al.

(10) Patent No.: US 12,667,093 B1
(45) Date of Patent: Jun. 30, 2026

(54) SOLAR MOSQUITO KILLER

(71) Applicants: SHENZHEN ANDELIAN TECHNOLOGY CO., LTD., Shenzhen (CN); ZHONGSHAN YONGQI ELECTRONIC TECHNOLOGY CO., LTD., Zhongshan (CN)

(72) Inventors: Shaohua Zhong, Shenzhen (CN); Shaoqi Ji, Zhongshan (CN); Dan Zhao, Zhongshan (CN)

(73) Assignees: SHENZHEN ANDELIAN TECHNOLOGY CO., LTD., Shenzhen (CN); ZHONGSHAN YONGQI ELECTRONIC TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 19/319,072

(22) Filed: Sep. 4, 2025

Related U.S. Application Data

(63) Continuation-in-part of application No. 29/941,845, filed on May 13, 2024, now Pat. No. Des. 1,094,828.

(30) Foreign Application Priority Data

Aug. 28, 2025 (CN) .......................... 202521848178.1
Aug. 28, 2025 (CN) .......................... 202521851099.6
Aug. 28, 2025 (CN) .......................... 202521865762.8

(51) Int. Cl.
    *A01M 1/22*      (2006.01)
    *A01M 1/04*      (2006.01)
    (Continued)

(52) U.S. Cl.
    CPC .............. *A01M 1/223* (2013.01); *A01M 1/04* (2013.01); *H02S 20/10* (2014.12); *A01M 1/106* (2013.01)

(58) Field of Classification Search
    None
    See application file for complete search history.

(56) References Cited

U.S. PATENT DOCUMENTS 8,424,239 B1   4/2013 Gallo
10,772,314 B1   9/2020 Caba
          (Continued)

FOREIGN PATENT DOCUMENTS

CN      205547081 U      9/2016
CN      109601499 A   *  4/2019   .............. F21S 9/035
          (Continued)

OTHER PUBLICATIONS

TylerTube https://www.youtube.com/watch?v=QScHm7_3lxQ&t=749s dated Aug. 10, 2024.*

*Primary Examiner* — Richard G Davis
(74) *Attorney, Agent, or Firm* — HOWARD M COHN and Associates, LLC

(57) ABSTRACT

A solar mosquito killer is provided, including a solar module, a mosquito killing module, and a supporting module. The mosquito killing module is located on one side of solar module, and comprises a frame component and a power grid located in the frame component, a control component electrically connected to the power grid, a button set on the frame component and electrically connected to the control component, and a flexible waterproof cover covering the button. The supporting module is connected to the mosquito killing module to support the mosquito killing module.

15 Claims, 97 Drawing Sheets

(51) Int. Cl.
   *H02S 20/10*        (2014.01)
   *A01M 1/10*        (2006.01)

(56)                References Cited

U.S. PATENT DOCUMENTS

| | | | | |
|---|---|---|---|---|
| D1,045,010 S | * | 10/2024 | Qian | ........................... D22/123 |
| 12,274,254 B2 | | 4/2025 | Li | |
| D1,094,828 S | * | 9/2025 | Zhao | ........................... D22/123 |
| 2009/0038207 A1 | * | 2/2009 | Lin | ......................... A01M 1/04 |
| | | | | 43/112 |
| 2011/0149548 A1 | * | 6/2011 | Yang | .................... F21V 15/013 |
| | | | | 362/217.1 |
| 2014/0165452 A1 | | 6/2014 | Rocha | |
| 2017/0188563 A1 | * | 7/2017 | Lee | ......................... A01M 1/12 |
| 2022/0022442 A1 | * | 1/2022 | Studer | .................... A01M 1/04 |
| 2025/0049017 A1 | * | 2/2025 | Li | ........................... A01M 1/04 |
| 2025/0194577 A1 | * | 6/2025 | Okpala-Ezechukwu | .................... |
| | | | | A01M 1/023 |

FOREIGN PATENT DOCUMENTS

| | | | | | |
|---|---|---|---|---|---|
| CN | 212204323 U | | 12/2020 | | |
| CN | 214047221 U | | 8/2021 | | |
| CN | 113757608 A | | 12/2021 | | |
| KR | 20110005126 U | * | 5/2011 | ............... | F21K 9/69 |
| KR | 20190036653 A | * | 4/2019 | ............ | A01M 1/223 |

* cited by examiner

A

291

292

24

25

21(2)

C

D

E

42a

42

402

4022

| first peak wavelength range | 369nm−372nm |
| second peak wavelength range | 395nm−400nm |
| third peak wavelength range | 397nm−400nm |
| fourth peak wavelength range | 400nm−403nm |

SOLAR MOSQUITO KILLER

CROSS-REFERENCE TO RELATED APPLICATIONS

The application is a Continuation-in-Part of the U.S. application Ser. No. 29/941,845, filed on May 13, 2024, now patented, and claims priorities of Chinese Patent Application No. 202521848178.1, filed on Aug. 28, 2025, Chinese Patent Application No. 202521865762.8, filed on Aug. 28, 2025, and Chinese Patent Application No. 202521851099.6, filed on Aug. 28, 2025, the entire contents of which are incorporated herein by reference.

TECHNICAL FIELD

The present application relates to the field of outdoor mosquito killer technology, particularly to a solar mosquito killer.

BACKGROUND

Currently, outdoor solar mosquito killers usually use chemical agents or high-voltage electric grids to eliminate mosquitoes and insects, these killing devices have some issues, such as the potential harm to human health and the environment caused by the use of chemical agents, and safety hazards in high-voltage electric grids. In addition, most existing solar mosquito killers require an external power source, which limits their flexibility and convenience of use. Additionally, an umbrella shaped rain cover is usually installed at the top to prevent rainwater from seeping into the gaps at the buttons, however, when the wind and rain are strong, rainwater can easily seep into the interior of the solar mosquito killer through the gaps at the buttons, making it inconvenient to use in areas with rivers, if there is water on the buttons, there are certain safety hazards.

SUMMARY

Regarding the aforementioned limitations on the flexibility and convenience of solar mosquito killers in existing technologies, which often require an external power source, as well as the potential safety hazards by rainwater infiltration, this application provides a solar mosquito killer, in which the power required for its operation is mainly provided by solar modules, and the outer side of the buttons is covered with a flexible waterproof cover to prevent rainwater from seeping into the interior of the solar mosquito killer through the gaps at the buttons. This solves the problems of many solar mosquito killers requiring an external power source and water easily seeping into the interior of the device through the gaps between the buttons.

A solar mosquito killer includes a solar module, a mosquito killing module, and a supporting module. The mosquito killing module is located on one side of solar module, and comprises a frame component, a electric grid located in the frame component, a control component electrically connected to the electric grid, a button set on the frame component and electrically connected to the control component, and a flexible waterproof cover covering the button. The supporting module is connected to the mosquito killing module to support themosquito killing module.

Based on the solar mosquito killers in the present embodiment, a solar module is designed to convert solar energy into electrical energy to power the grid, the control components, and other devices in the solar mosquito killer. Compared with the solar mosquito killers in the prior art that requires connection to an external power source, the solar mosquito killer in the present embodiment is not constrained by the external power source and has stronger flexibility and convenience in use. By designing a flexible waterproof cover that covers the buttons to provide waterproofing, the solar mosquito killer in this embodiment of the application effectively prevents liquids such as rainwater from seeping into the interior of the solar mosquito killer through the gaps at the buttons, compared to the existing technology where the solar mosquito killer does not have a waterproof design for the switch that leaks out, the solar mosquito killer in the present embodiment has a good waterproof effect on the buttons that leak out through a flexible waterproof cover, which can effectively prevent liquids such as rainwater from seeping into the interior of the solar mosquito killer through the gaps at the buttons and prevent the device from burning out.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

FIG. 43 shows the peak wavelengths of the light emitting elements of the mosquito trap lamp.

Figure 1:
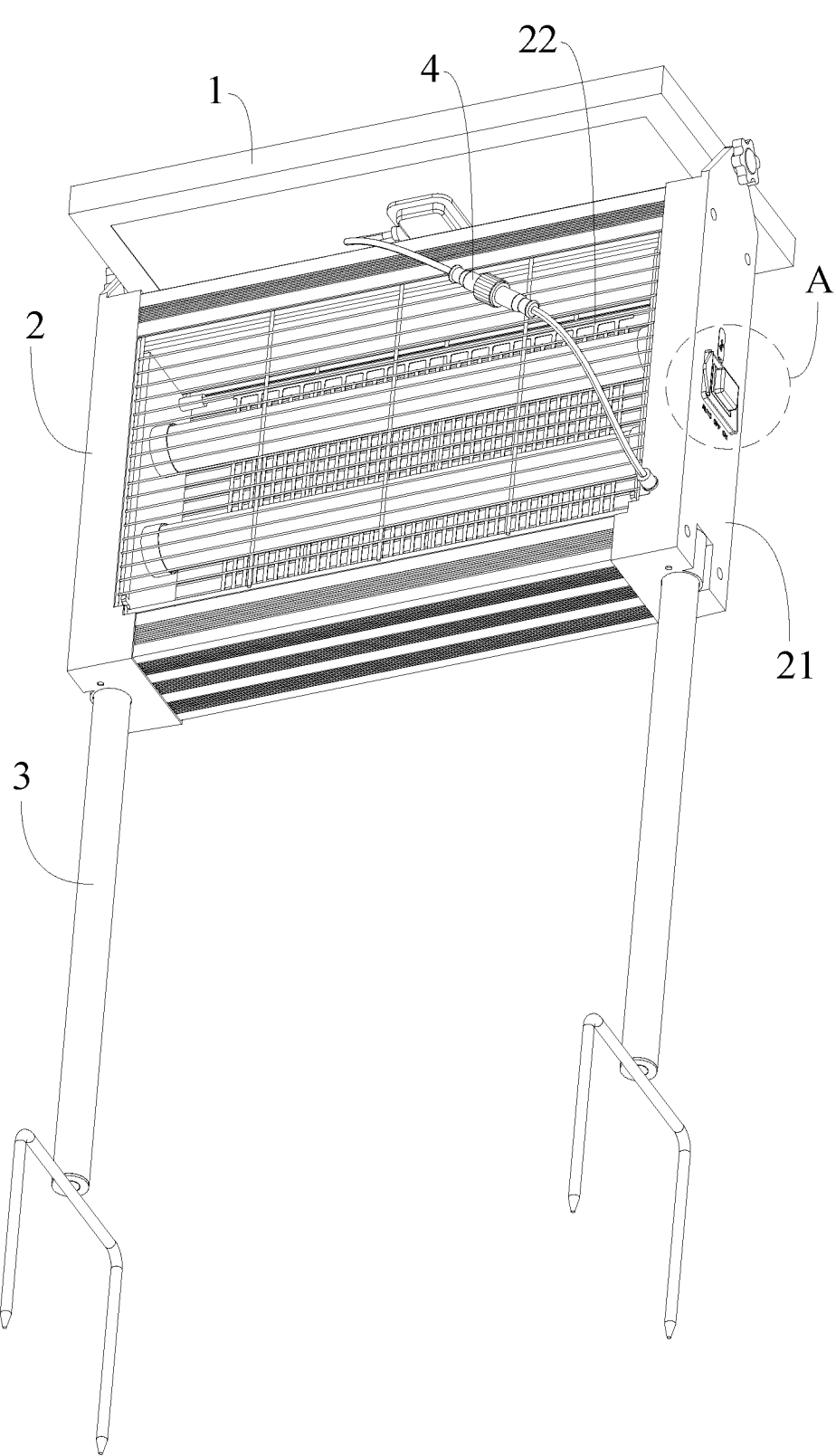
FIG. 1 is a schematic view of the solar mosquito killer according to a first embodiment of present application.

Drawing References: solar module 1; mosquito killing module 2; frame component 21; circular groove 21*a*; socket 21*b*; mounting hole 210; mounting columns 211; conical end 211*a*; box body 201; cover 202; first insertion holes 2111; second insertion holes 2112; fixing slot 2113; top beam 212; bottom beam 213; first placement slot 2131; protective nets 214; electric grid 22; positive electrode component 221; positive electrode connecting part 2211; positive electrode strip 2212; first hook 2213; negative electrode component 222; negative electrode connecting part 2221; negative electrode strip 2222; second hook 2223; connecting strip 223; control component 23; switch control circuit 232; button 24; flexible waterproof cover 25; main body portion 251; connecting portion 252; connecting head 253; mosquito trap lamp 26; lampshade 261; shade body 2611; fixing portion 2612; circuit board assembly 262; circuit board 2621; light emitting element 2622; first light emitting element 2622*a*; second light emitting element 2622*b*; light emitting chip 2622*c*; convex lens structure 2622*d*; main circuit board 28; power supply interface component 29; protective cap 291; another opening 292; supporting module 3; insert component 31; supporting column 310; opening 310*a*; ground plug 311; grounding structure 3111; U-shaped structure 3111*a*; grounding strip 3111*b*; connecting column 3112; electrical connection component 4; first electrical connector 41; first wire 41*a*; second electrical connector 42; second wire 42*a*; hole end connector 401; limiting protrusion 4011; hole 4012; guide groove 4013; pin end connector 402; external threads 4021; pin 4022; surrounding wall 4023; guide shaft 4024; waterproof sealing ring 43; connecting cover 44; internal threads 441; buckle structure 45; buckle 451; hook 452; bolt 5; cap body 51; bolt body 52; installation member 6; electrical connection installation part 61; the other electrical connection installation part 62; hanging chain 7; hanging chain connector 71; battery 8; first connector 81; lighting lamp 9; second connector 91; lamp body 92; bracket 93; frame body 931; connecting ball head 932; connecting structure 94; first connecting seat 941; second connecting seat 942; seat body 9421; connecting wall 9422; cavity 9422*a*; locking sleeve 9423; operating part 254; convex platform structure 21*d*; annular convex edge 21*c*; first sub-groove 210*a*; second sub-groove 210*b*; first step portion 210*c*; second step portion 210*d*; annular protrusion 252*a*; first receiving portion 251*a*; second receiving portion 251*b*; third receiving portion 251*c*.

DETAILED DESCRIPTION OF THE EMBODIMENTS

In order to make the purpose, technical solution, and effect of this application clearer and more specific, the following will provide further detailed explanations of this application with reference to the accompanying drawings and implementation examples. It should be understood that the specific embodiments described herein are only used to explain the present application and are not intended to limit the present application.

Embodiment 1

Figure 2:
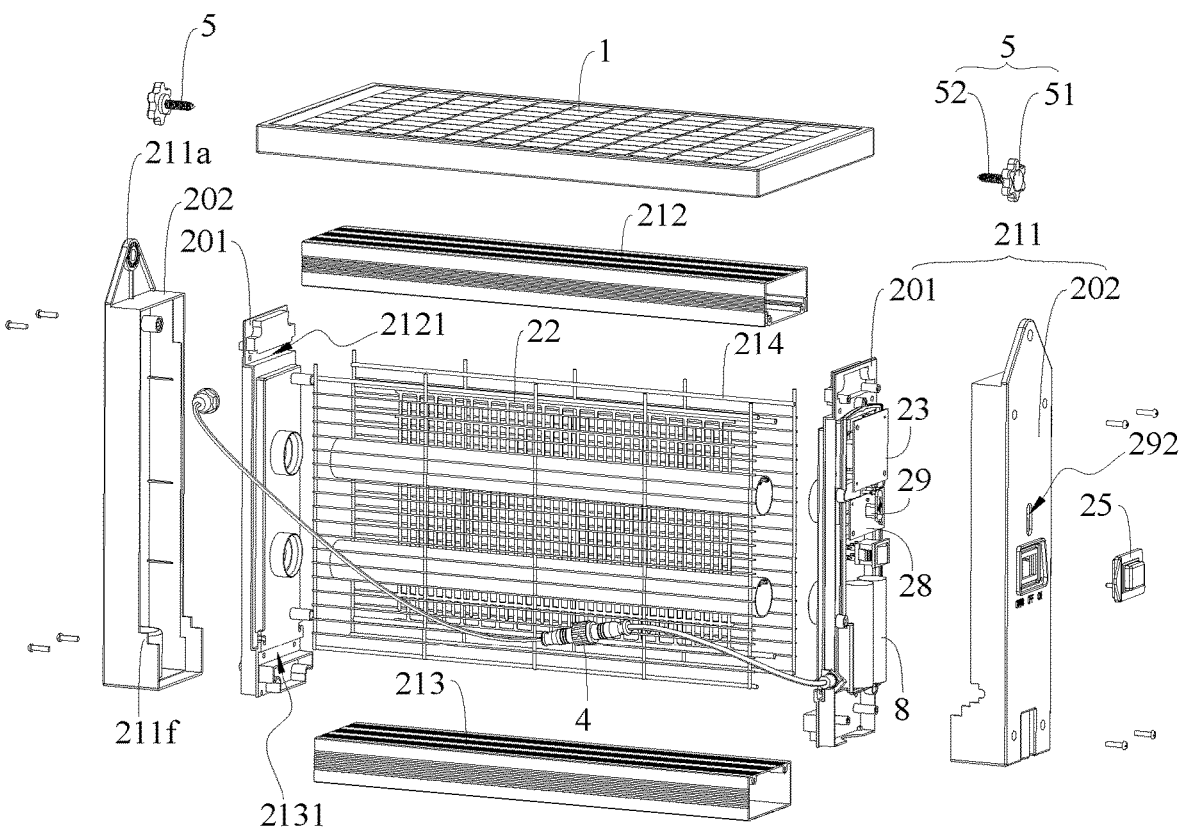
FIG. 2 is a first exploded view of the solar mosquito killer according to a first embodiment of present application.
Figure 3:
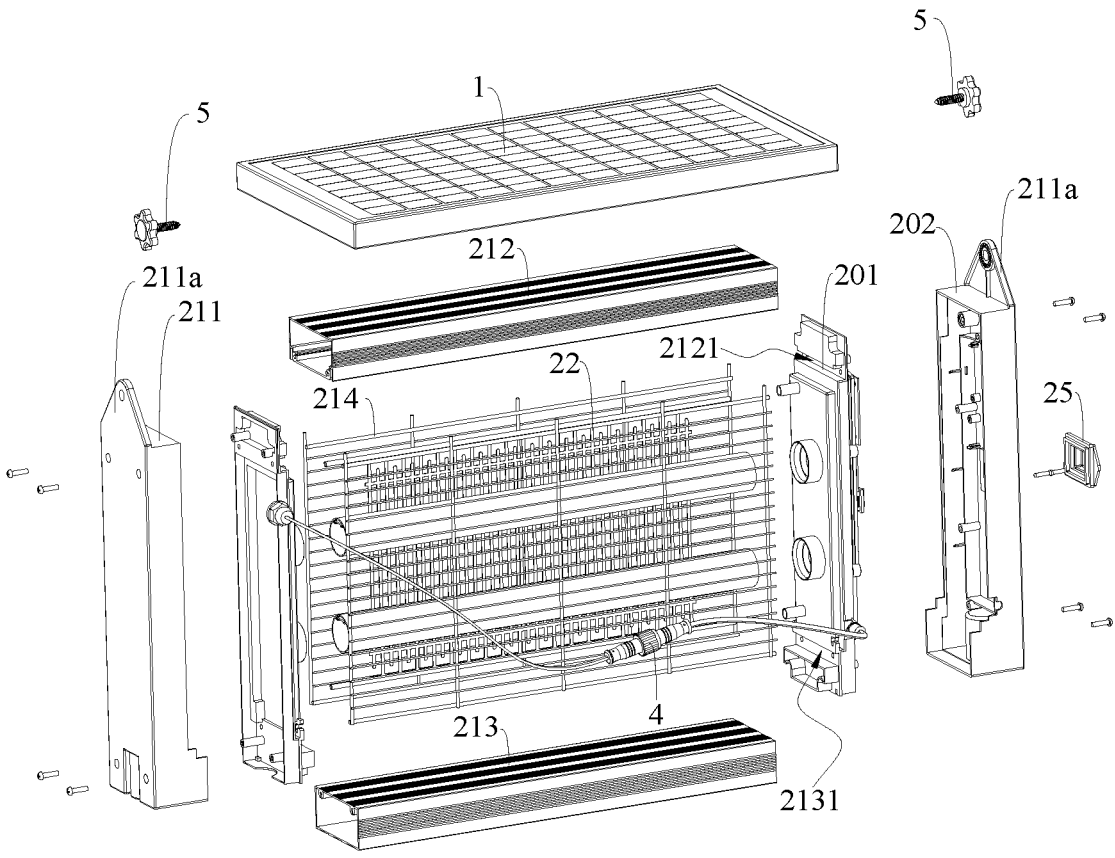
FIG. 3 is a second exploded view of the solar mosquito killer according to a first embodiment of present application.

Please refer to FIGS. 1 to 3, the first embodiment of the present application provides a solar mosquito killer, which includes a solar module 1, a mosquito killing module 2, and a supporting module 3. The mosquito killing module 2 is located on one side of the solar module 1, and the mosquito killing module 2 is electrically connected to the solar module 1. The solar module 1 is capable of receiving light (such as sunlight) and converting it into electrical energy to power the mosquito killing module 2.

The mosquito killing module 2 includes a frame component 21, an electric grid 22 located in the frame component 21, a control component 23 electrically connected to the electric grid 22, a button 24 set on the frame component 21 and electrically connected to the control component 23, and a flexible waterproof cover 25 covering the button 24. The supporting module 3 is connected to the mosquito killing module 2 to support the mosquito killing module 2.

The material of the flexible waterproof cover 25 can be a single material with waterproofing property and adhesion or shrinkage ductility, such as a rubber material, or composite materials such as polyethylene polypropylene composite material.

The button 24 can be the on/off button of the solar mosquito killer or the strength button of the electric grid 22, etc, here, button 24 is preferably the on/off button of the solar mosquito killer.

The supporting module 3 is used to provide support for the mosquito killing module 2, the supporting module 3 can include multiple sets of insert components 31 (as described below), a base, or three or four supporting columns, but it is preferred to use detachable insert components 31.

Based on the solar mosquito killer in the present embodiment, a solar module 1 is designed to convert solar energy into electrical energy to supply power to the electric grid 22, the control components 23, and other devices in the mosquito killing module 2. Compared with the solar mosquito killer in the prior art that requires connection to an external power source, the solar mosquito killer in the present embodiment is not constrained by the external power source and has stronger flexibility and convenience in use. By designing a flexible waterproof cover 25 that covers the button 24 to provide waterproofing, the solar mosquito killer in this embodiment of the present application effectively prevents liquids such as rainwater from seeping into the interior of the solar mosquito killer through the gap at the button 24, compared to the existing technology that does not have a waterproof design for the external leakage switch of the solar mosquito killer, the solar mosquito killer in this embodiment of the application has a good waterproof effect on the external leakage button 24 through a flexible waterproof cover 25, which can effectively prevent liquids such as rainwater from seeping into the interior of the solar mosquito killer through the gaps at the button 24, and avoid the solar mosquito killer from burning out.

It can be understood that the flexible waterproof cover 25 is used to effectively waterproof the exposed button 24. The specific manifestations of the flexible waterproof cover 25 can include, but are not limited to, the following two situations.

Figure 4:
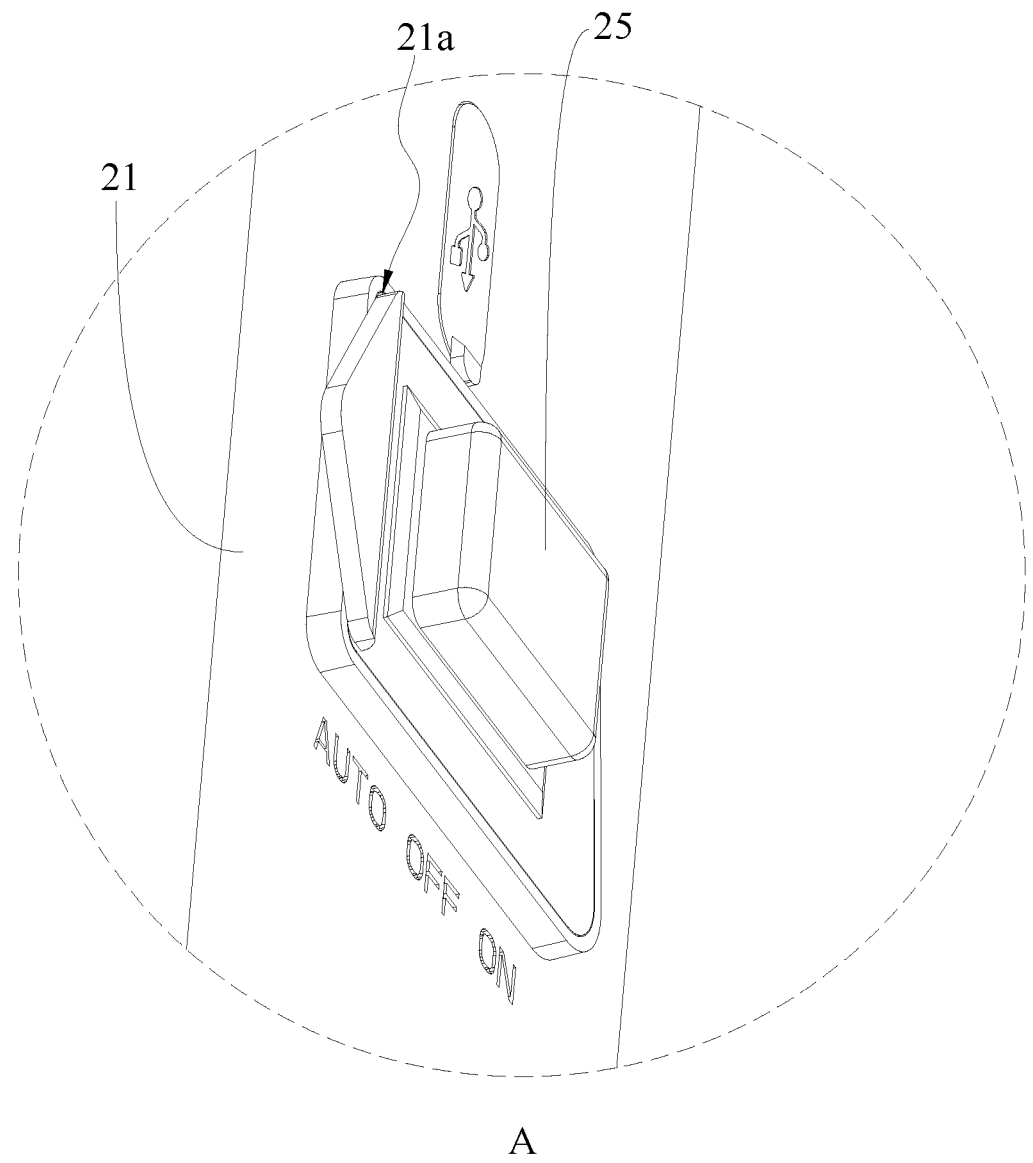
FIG. 4 shows an enlarged view of A part of FIG. 1.
Figure 5:
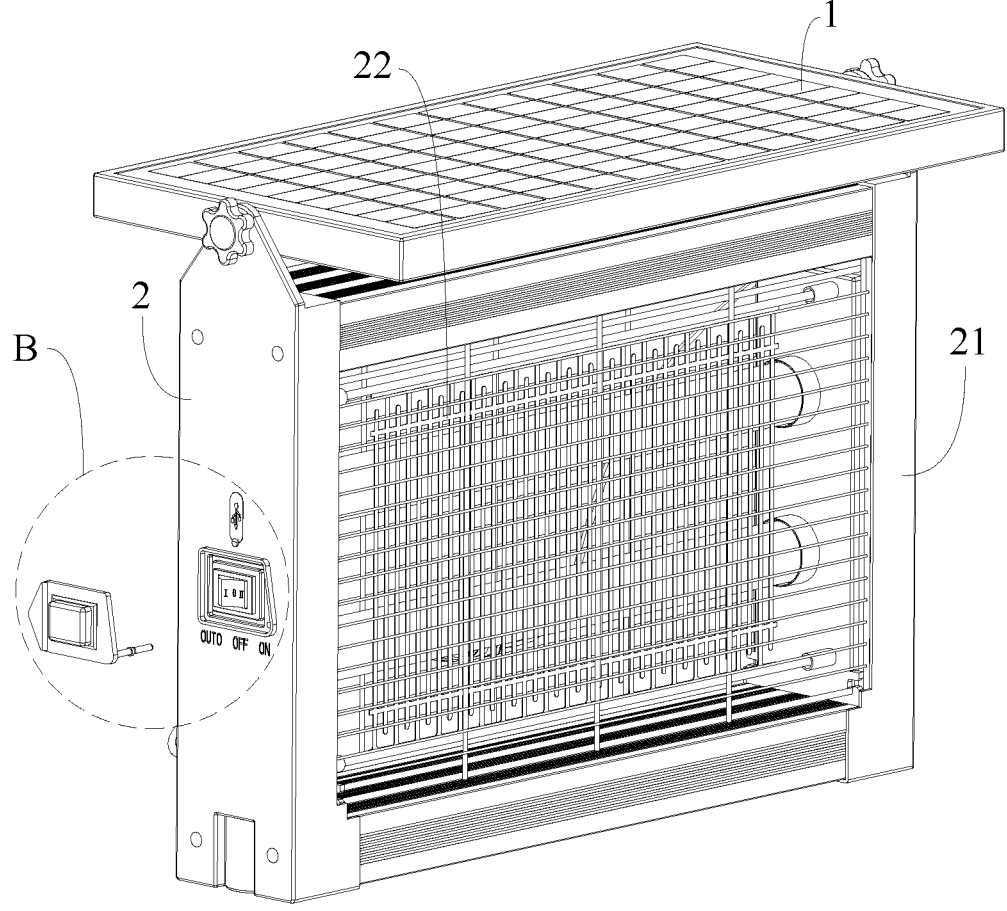
FIG. 5 is a schematic view of the solar module and the mosquito killing module of the solar mosquito killer according to a first embodiment of present application.
Figure 6:
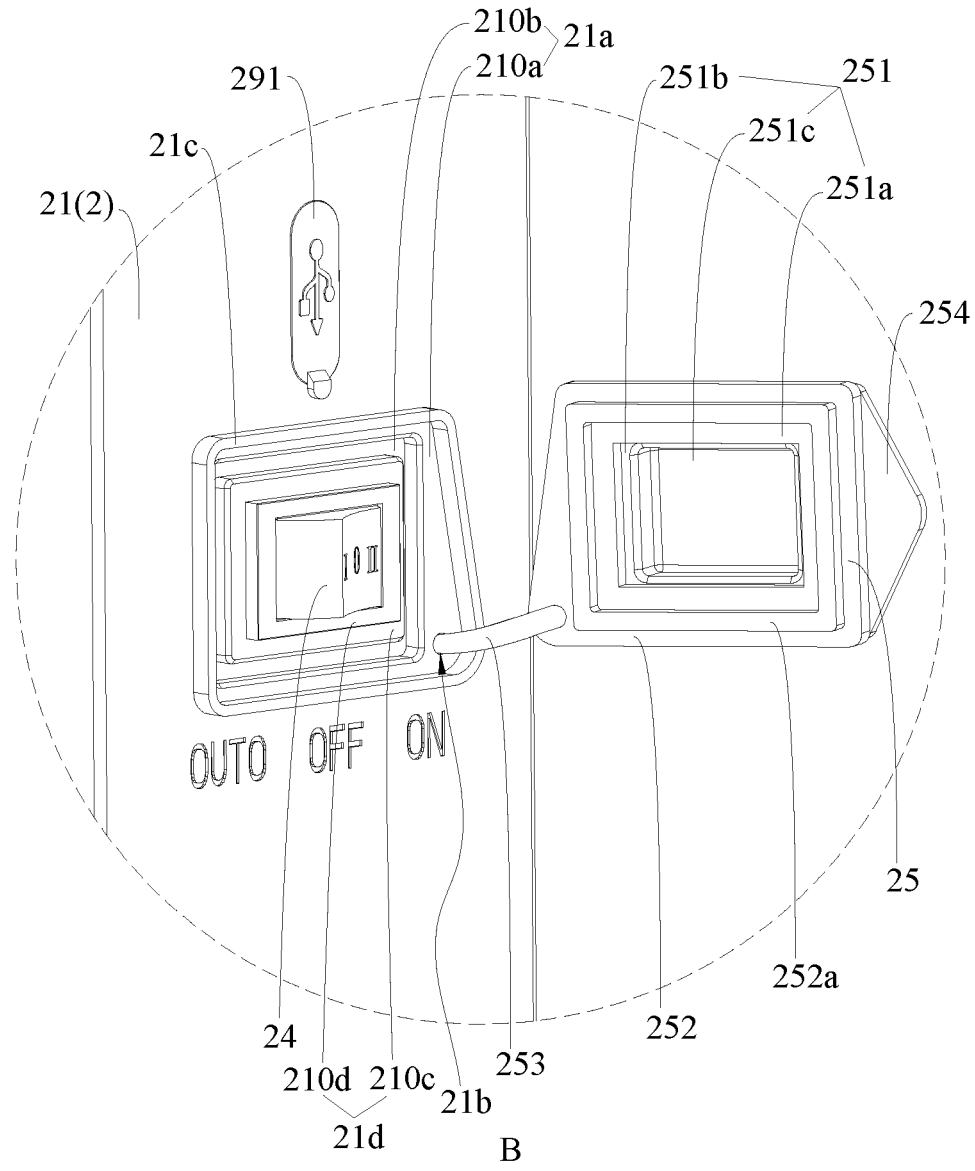
FIG. 6 shows an enlarged view of B part of FIG. 5.

In a first scenario, as shown in FIGS. 4 to 6, the flexible waterproof cover 25 is made of a non-transparent material, and the outer surface of the frame component 21 (specifically the box body 201 described below) is provided with a circular groove 21a surrounding the button 24 at the position corresponding to the button 24. At this time, the non-transparent flexible waterproof cover 25 includes a main body portion 251 that can cover the button 24 and a connecting portion 252 that connects the main body portion 251. The connecting portion 252 is arranged around the circumference of the main body portion 251 and is fixed to the frame component 21. Specifically, the non-transparent flexible waterproof cover 25 also includes a connecting head 253, which is connected to the connecting portion 252, and the main body portion 251, the connecting portion 252, and the connecting head 253 are integrally formed by injection molding or 3D printing. The outer surface of the frame component 21 (specifically the box body 201 described below) is also provided with a socket 21b for inserting the connecting head 253, and the connecting head 253 is inserted into the socket 21b to achieve the connection between the non-transparent flexible waterproof cover 25 and the frame component 21. When the non-transparent flexible waterproof cover 25 covers the button 24, the connecting portion 252 is embedded in the annular groove 21a, and the outer surface of the connecting portion 252 is connected to the annular groove 21a. The static friction force between the groove walls is used to locate the non-transparent flexible waterproof cover 25, avoiding it from detaching from the frame component 21, thus enabling the non-transparent flexible waterproof cover 25 to provide good waterproof effect on the button 24. When the user needs to trigger the button 24, they can directly apply force to the non-transparent flexible waterproof cover 25 to detach the connecting portion 252 from the annular groove 21. The non-transparent flexible waterproof cover 25 in this design can be flexibly covered on the button 24 to prevent liquids such as rainwater from seeping into the interior of the solar mosquito killer through an assembly gap of the button 24.

The flexible waterproof cover 25 also includes an operating part 254 that connects the connecting portion 252. At least a portion of the operating part 254 extends to an outside of the annular groove 21, making it convenient for users to remove the flexible waterproof cover 25 from the annular groove 21. One end of the connecting head 253 is connected to the connecting portion 252, and the other end of the connecting head 253 extends into and is fixed in the frame component 21 through the insertion hole 12b to prevent the flexible waterproof cover 25 from detaching from the frame component 21 after being removed from the annular groove 21a, which can effectively prevent the loss of the flexible waterproof cover 25.

Specifically, as shown in FIG. 6, the frame component 21 also has a convex platform structure 21d, with buttons 24 arranged on the convex platform structure 21d, and an annular groove 21a arranged around a periphery of the convex platform structure 21d. Due to the fact that the button 24 is located on the convex platform structure 21d, even if moisture enters the annular groove 21a, it is difficult for it to enter the button 24 on the convex platform structure 21d, which can achieve better waterproof effect.

In this embodiment, the frame component 21 also has an annular convex edge 21c that surrounds the annular groove 21a, and the annular convex edge 21c has a good water vapor blocking effect. Furthermore, the annular groove 21a includes a first sub-groove 210a and a second sub-groove 210b, and the first sub-groove 210b is located around a periphery of the second sub-groove 210b, and the second sub-groove 210b is located between the first sub-groove 210a and the convex platform structure 21d, with a depth of the second sub-groove 210b greater than a depth of the first sub-groove 210b. By setting the second sub-groove 210b with a depth greater than that of the first sub-groove 210a, it is more difficult for water vapor to enter the button 24 on the convex platform structure 21d, thus further improving the waterproof effect.

Furthermore, the convex platform structure 21d includes a first step portion 210c and a second step portion 210d. The first step portion 210c is arranged around a periphery of the second step portion 210*d*, and the step surface of the first step portion 210*c* is lower than that of the second step portion 210*d*, and the button 24 is provided on the step surface of the second step portion 210*d*. When viewed from a direction from the flexible waterproof cover 25 to the button 24, a planar area corresponding to an outer contour of the button 24 is less than a planar area corresponding to an outer contour of the second step portion 210*d*, and a planar area corresponding to an outer contour of the first sub-groove 210*a*, a planar area corresponding to an outer contour of the second sub-groove 210*b*, a planar area corresponding to an outer contour of the first step portion 210*c*, a planar area corresponding to an outer contour of the second step portion 210*d*, and a planar area corresponding to an outer contour of the button 24 decrease in sequence.

A side of the connecting portion 252 near the button 24 is provided with an annular protrusion 252*a*, and the connecting portion 252 is used to contact the groove side of the first sub-groove 210*a*. The annular protrusion 252*a* is adapted to the size of the second sub-groove 210*b* and is stored in the second sub-groove 210*b*.

The main body portion 251 has a first receiving portion 251*a*, a second receiving portion 251*b*, and a third receiving portion 251*c* on a side thereof near the button 24. The second receiving portion 251*b* and the first receiving portion 251*a* are annular, and the second receiving portion 251*b* is connected between the first receiving portion 251*a* and the third receiving portion 251*c*. The first step portion 210*c*, the second step portion 210*d*, and the button 24 are respectively received and pressed in the first receiving portion 251*a*, the second receiving portion 251*b*, and the third receiving portion 251*c* to achieve good waterproof and assembly effects.

Figure 7:
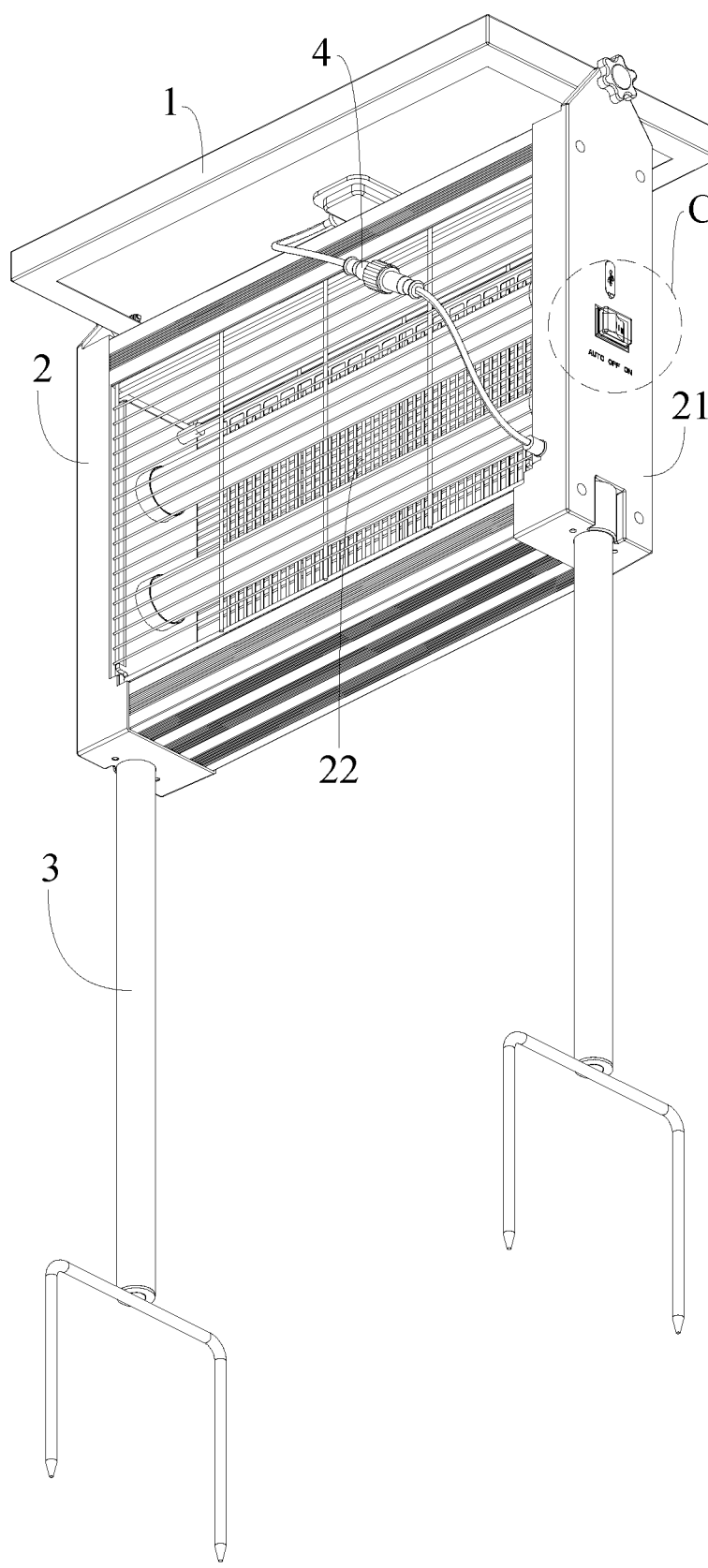
FIG. 7 is another schematic view of the solar mosquito killer according to a first embodiment of present application.
Figure 8:
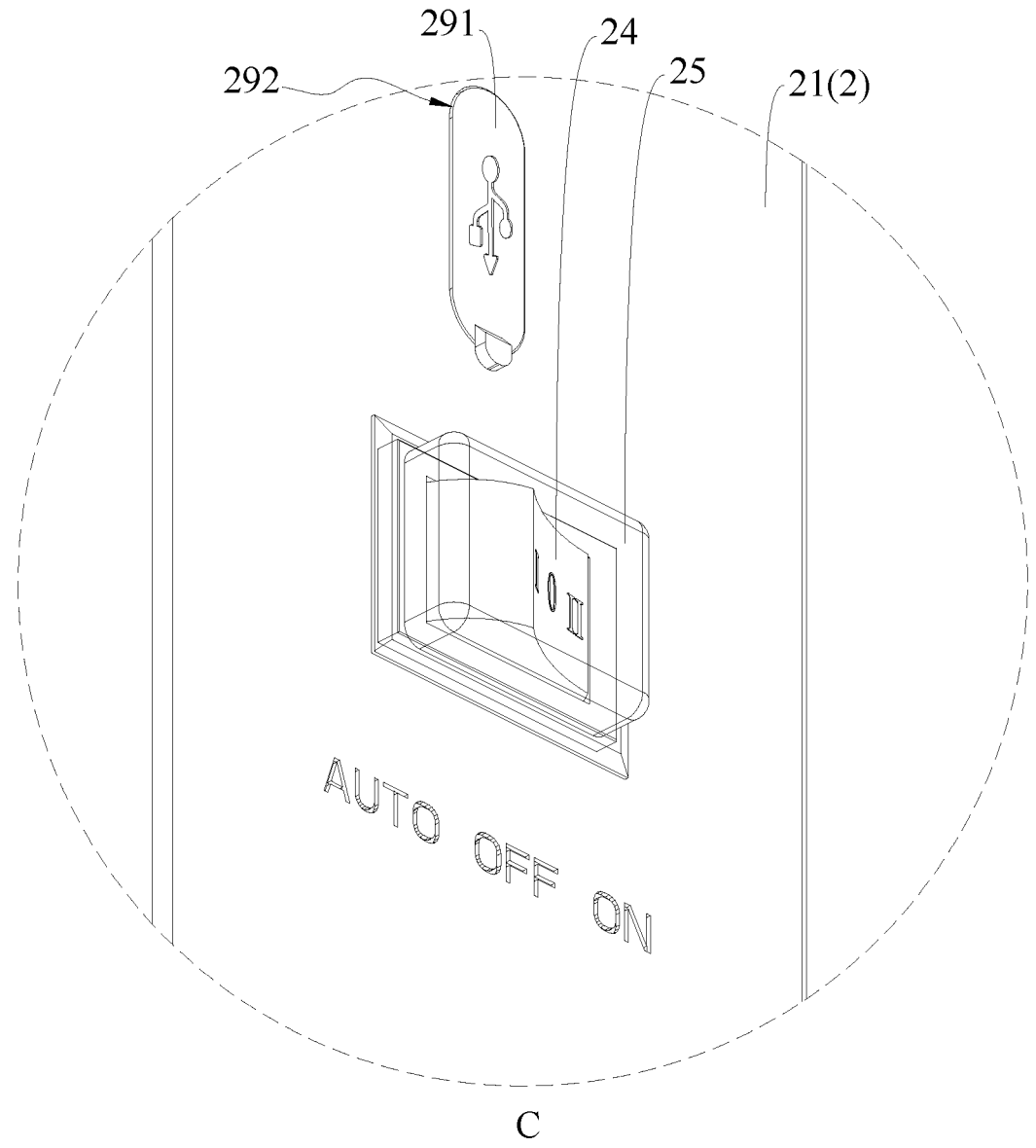
FIG. 8 shows an enlarged view of C part of FIG. 7.

In a second scenario, as shown in FIGS. 7 to 8, the flexible waterproof cover 25 is made of a transparent material, the transparent flexible waterproof cover 25 can be fixed to the frame component 21 using glue and cover a periphery of the button 24. The glue used here is transparent glue. The transparent flexible waterproof cover 25 has flexibility and is directly fixed on the frame component 21 by glue, which facilitates the connection between the transparent flexible waterproof cover 25 and the frame component 21. Users can directly press the transparent flexible waterproof cover 25 to deform and press the button 24, thereby triggering the button 24, this not only provides good waterproof effect on the button 24, but also effectively improves the safety of triggering the button 24 when the surface of the transparent flexible waterproof cover 25 or the user's hand has water.

Figure 9:
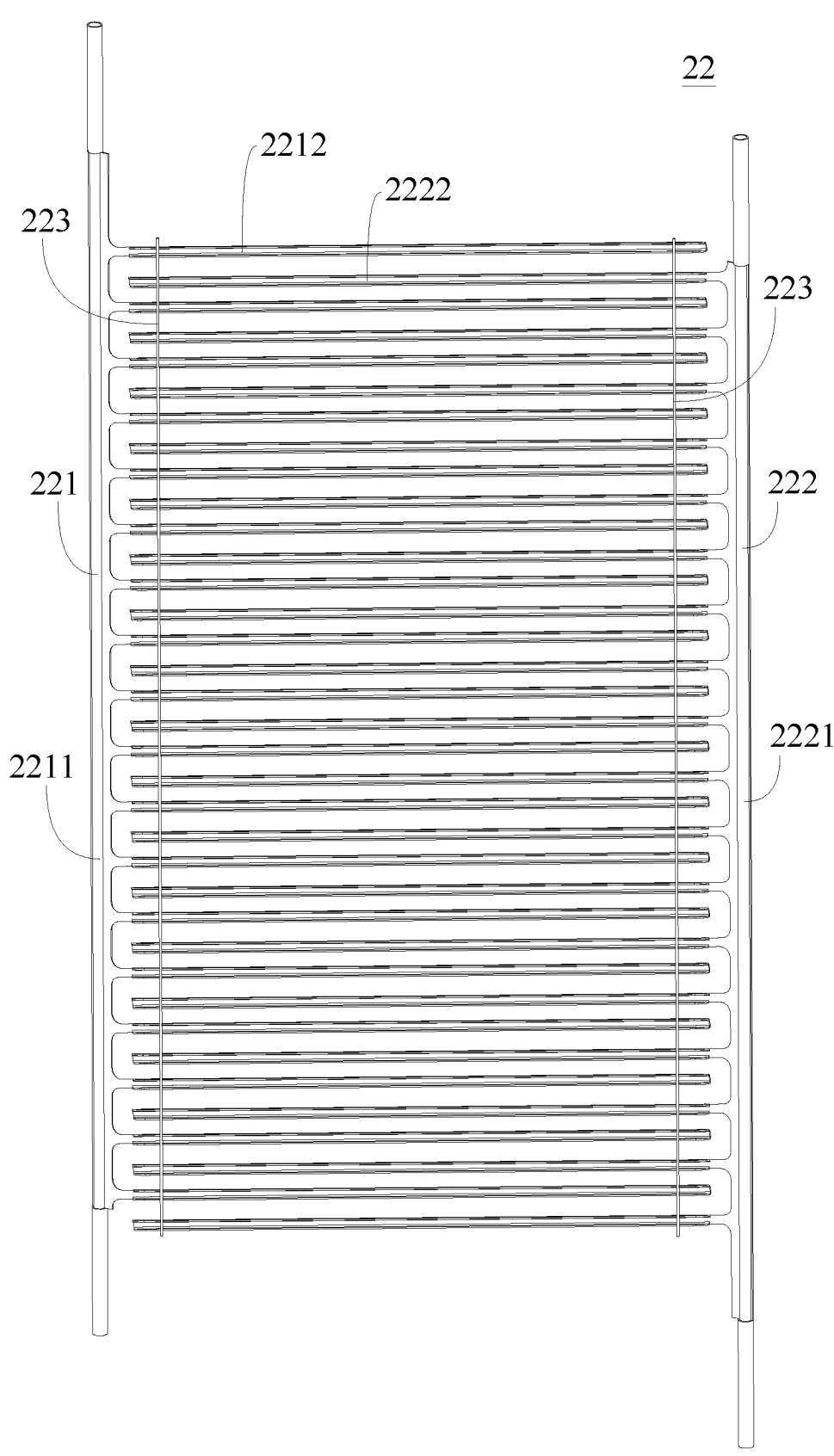
FIG. 9 is a first schematic view of the electric grid of the solar mosquito killer according to a first embodiment of present application.
Figure 10:
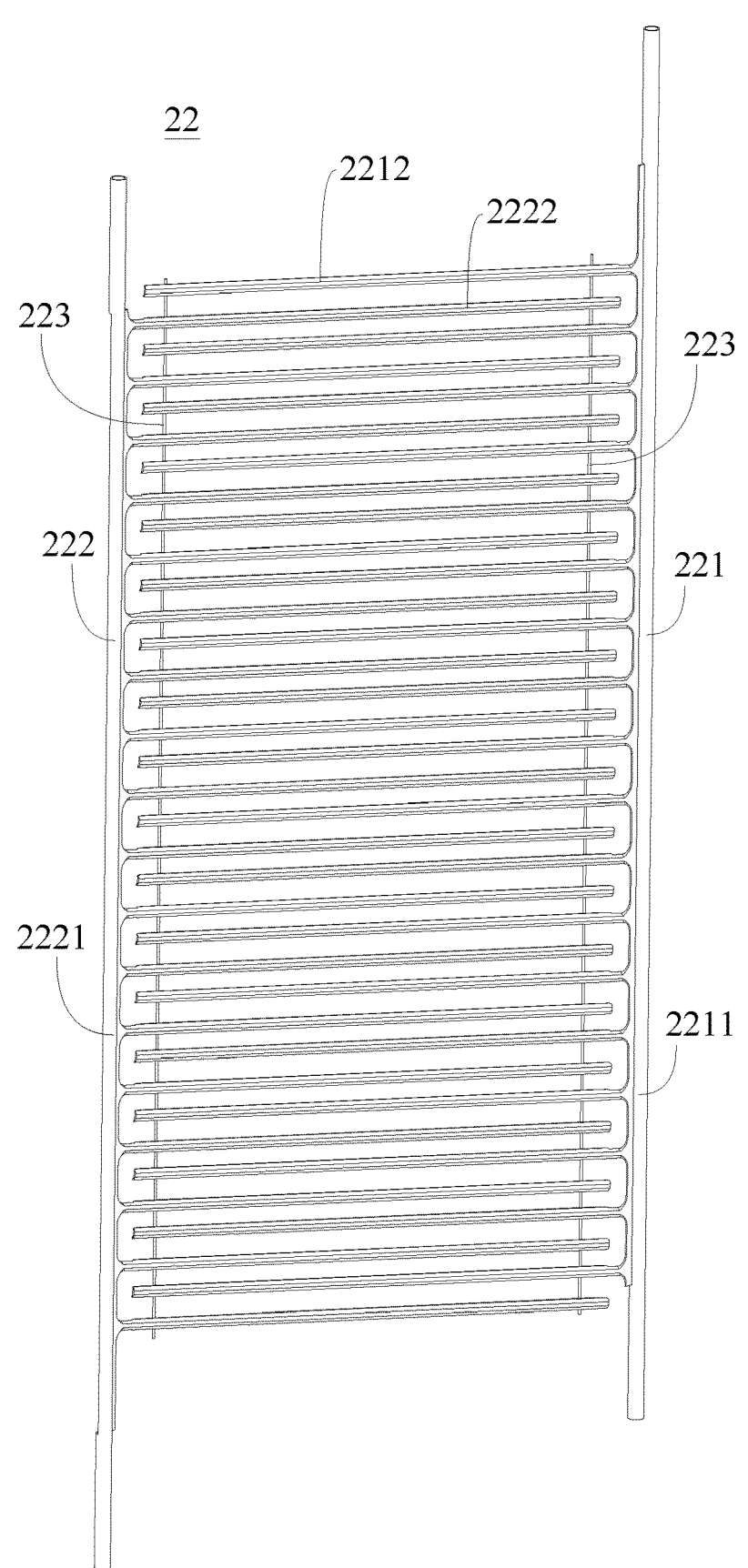
FIG. 10 shows another view of the electric grid of FIG. 9.

In this embodiment, as shown in FIGS. 9 to 10, the electric grid 22 includes a positive electrode component 221, a negative electrode component 222, and at least one connecting strip 223; the positive electrode component 221 includes a positive electrode connecting part 2211 and multiple positive electrode strips 2212 sequentially connected to the positive electrode connecting part 2211; the negative electrode component 222 includes a negative electrode connecting part 2221 and multiple negative electrode strips 2222 sequentially connected to the negative electrode connecting part 2221. Multiple positive electrode strips 2212 and multiple negative electrode strips 2222 are alternately arranged at intervals and located between the positive electrode connecting part 2211 and the negative electrode connecting part 2221; and at least one connecting strip 223 integrates multiple positive electrode strips 2212 and multiple negative electrode strips 2222 as a whole. The connecting strip 223 plays a role in fixing and connecting multiple positive electrode strips 2212 and multiple negative electrode strips 2222 together, and also serves as insulation between the positive and negative electrodes. The setting of the structure of this electric grid 22 is mainly to kill mosquitoes and insects through the positive and negative pole structures. When mosquitoes and insects land on the electric grid 22, they come into contact with the adjacent positive electrode strip 2212 and negative electrode strip 2222 to form a conductive circuit, and current flows through the conductive circuit to electrocute the mosquitoes and insects. As the insulating and fixing function of the connecting strip 223, which is located in the middle of the entire frame component 21, and the multiple positive electrode strips 2212 and multiple negative electrode strips 2222 are alternated, therefore, in order to make the structure clearer, it is preferred to use transparent material for the connecting strip 223.

In this embodiment, as shown in FIGS. 9 to 10, the at least one connecting strip 223 includes two connecting strips 223, one connecting strip 223 is located near the positive electrode connecting part 2211, and the other connecting strip 223 is located near the negative electrode connecting part 2221. Setting two connecting strips 223 can not only achieve the function of fixed insulation, but also save processes, improve production efficiency, and save materials. It is best to set the two connecting strips 223 parallel to each other to make the appearance neater, the texture higher, and also facilitate the clear division and installation of the structure.

In this embodiment, as shown in FIGS. 9 to 10, at least one connecting strip 223 is made of transparent material, and it is preferred that all connecting strips 223 are made of transparent material to facilitate clear division and installation of the structure. Multiple positive electrode strips 2212 and multiple negative electrode strips 2222 are parallel to each other, and the at least one connecting strip 223 is perpendicular to multiple positive electrode strips 2212 and multiple negative electrode strips 2222, this structure makes the appearance of the solar mosquito killer more neat, orderly, and clearly structured, improving the user experience.

Figure 11:
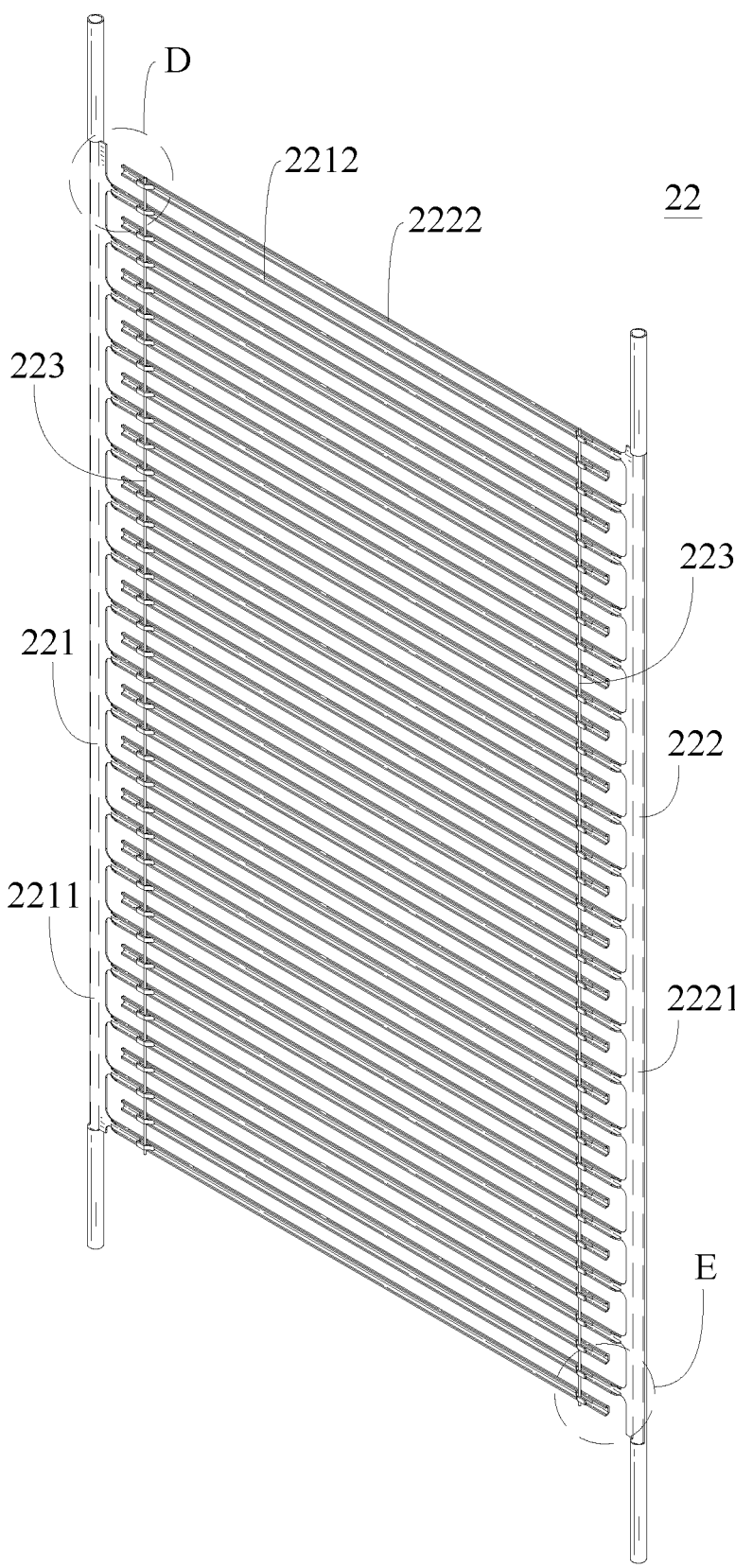
FIG. 11 is a second schematic view of the electric grid of the solar mosquito killer according to a first embodiment of present application.
Figure 12:
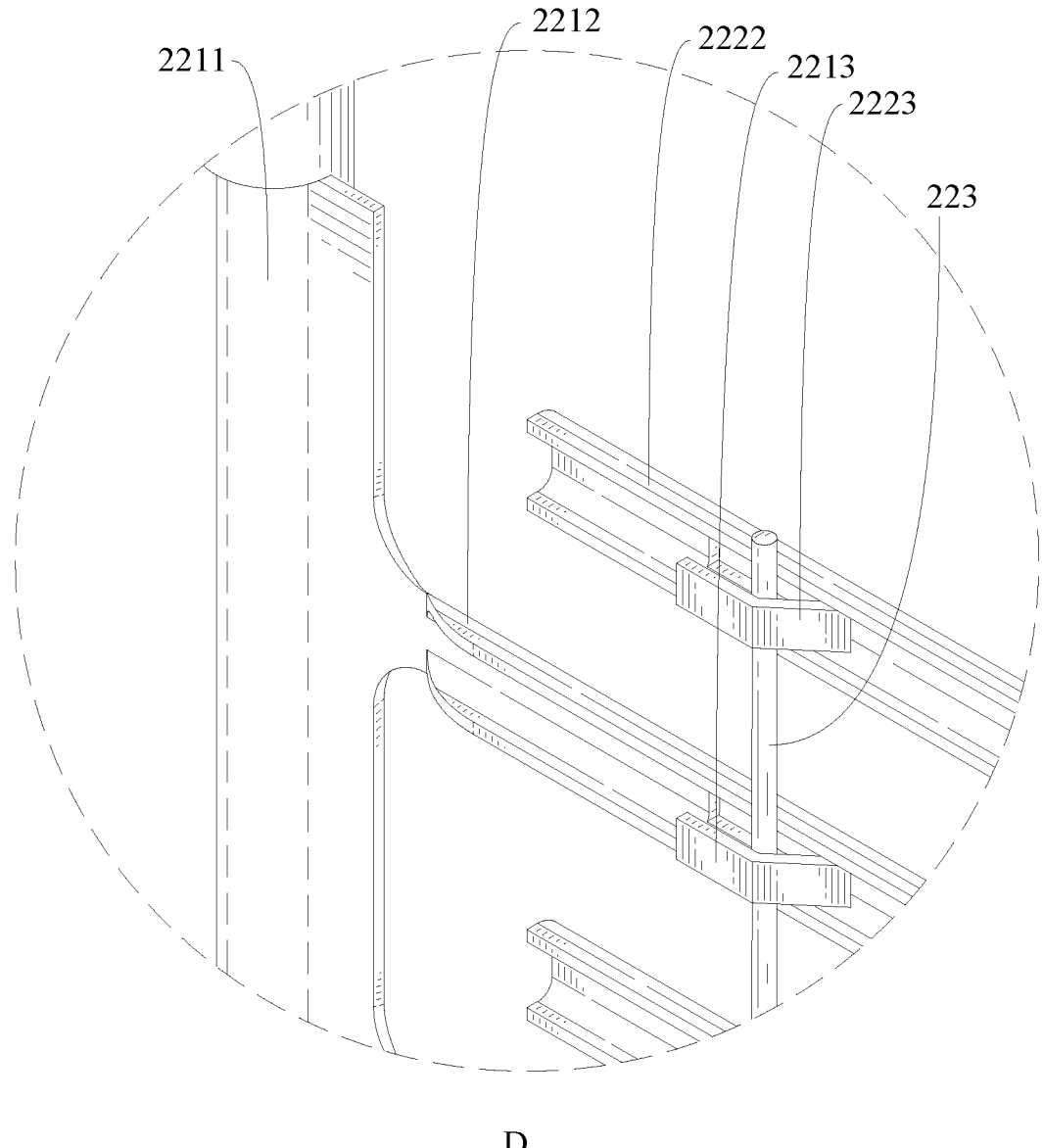
FIG. 12 shows an enlarged view of D part of FIG. 11.
Figure 13:
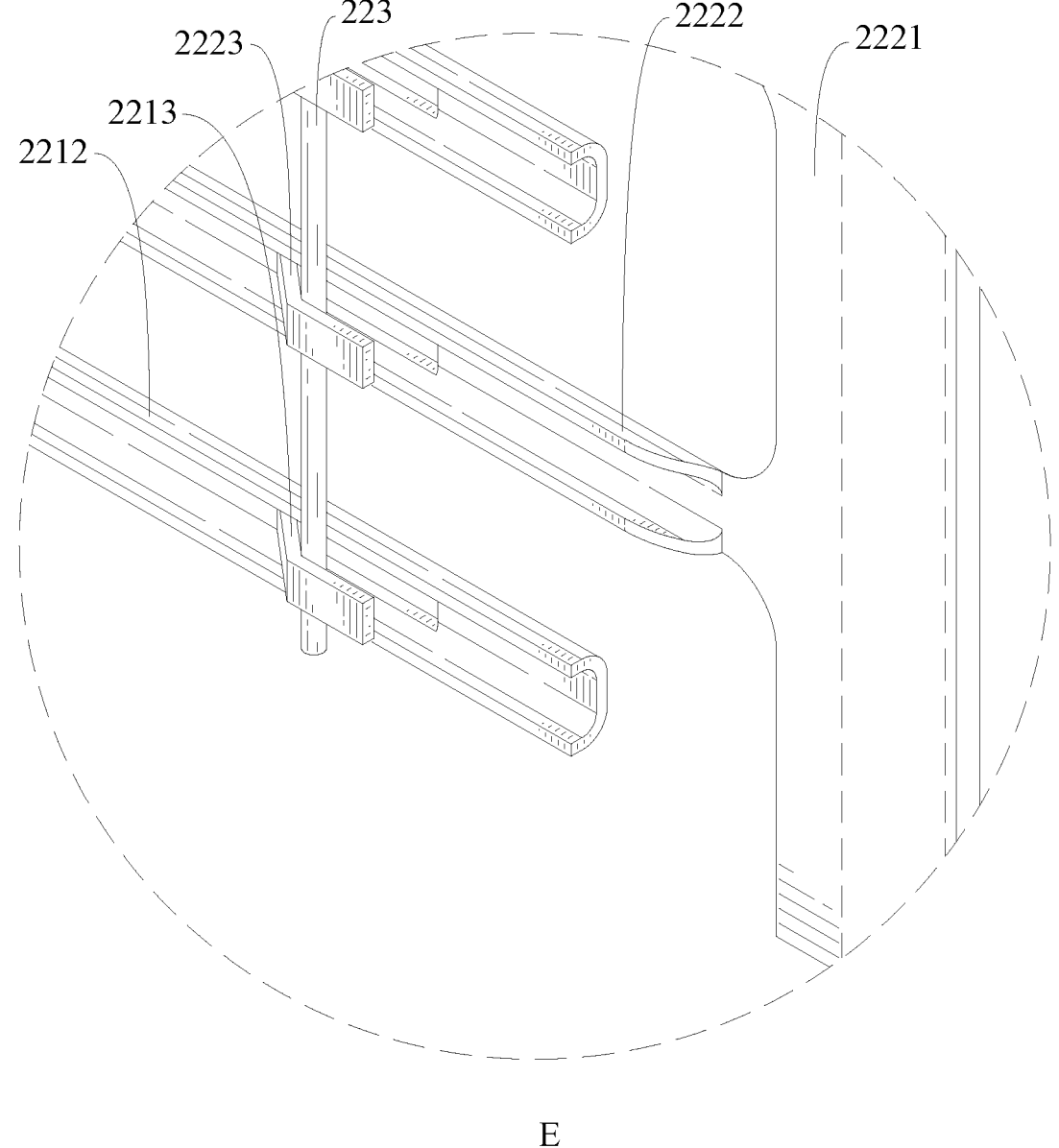
FIG. 13 shows an enlarged view of E part of FIG. 11.
Figure 14:
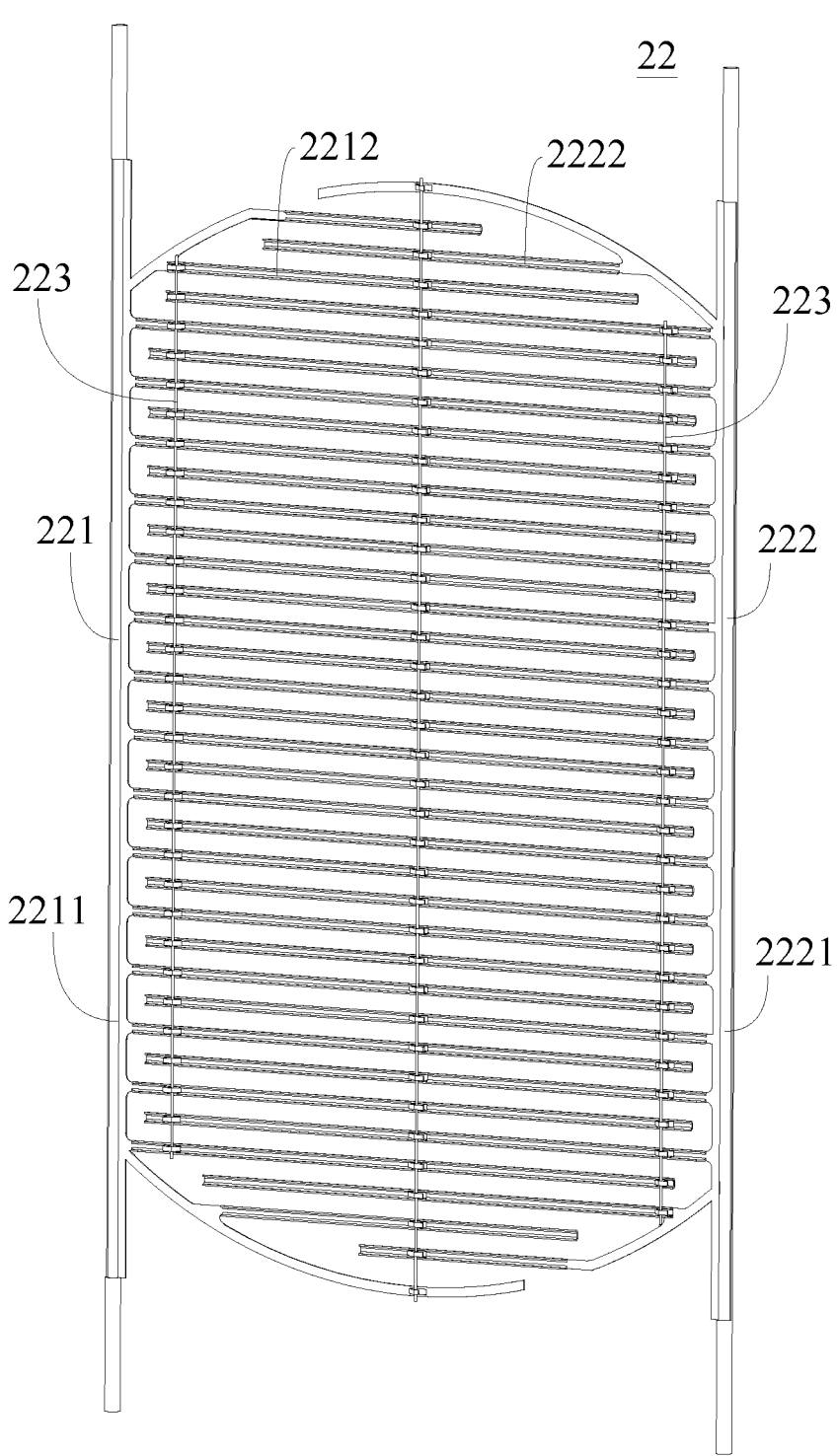
FIG. 14 is a third schematic view of the electric grid of the solar mosquito killer according to a first embodiment of present application.
Figure 15:
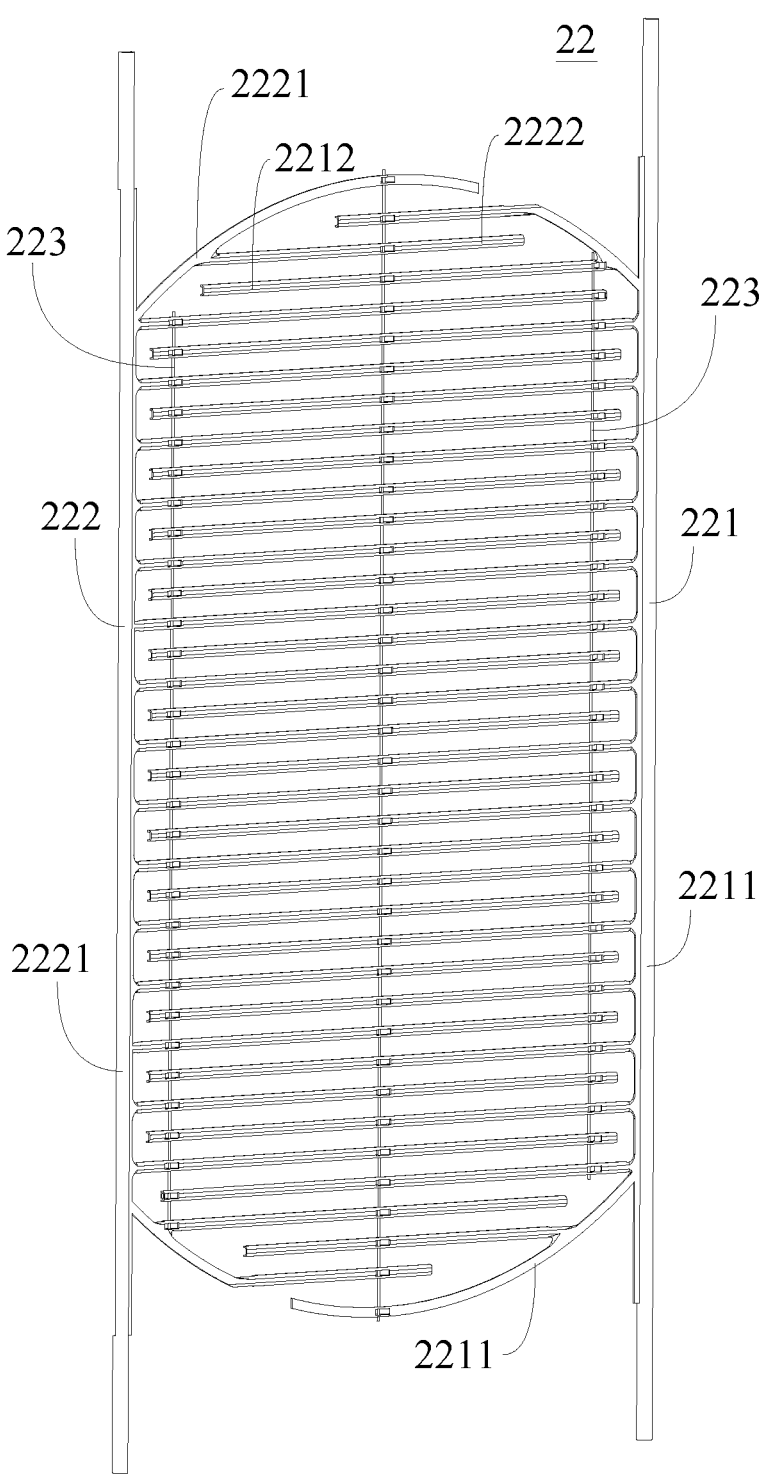
FIG. 15 shows another view of the electric grid of FIG. 14.
Figure 16:
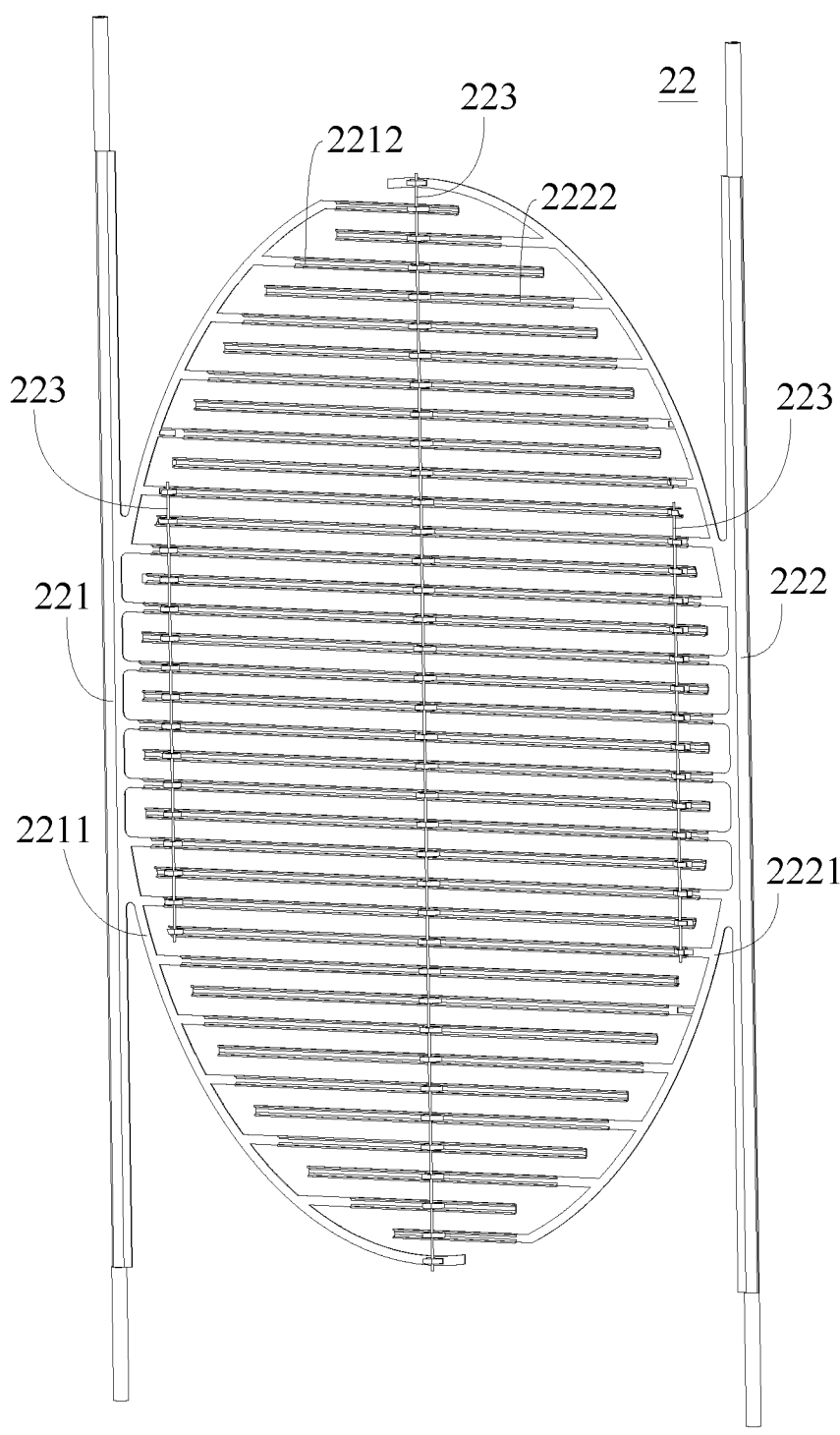
FIG. 16 is a fourth schematic view of the electric grid of the solar mosquito killer according to a first embodiment of present application.
Figure 17:
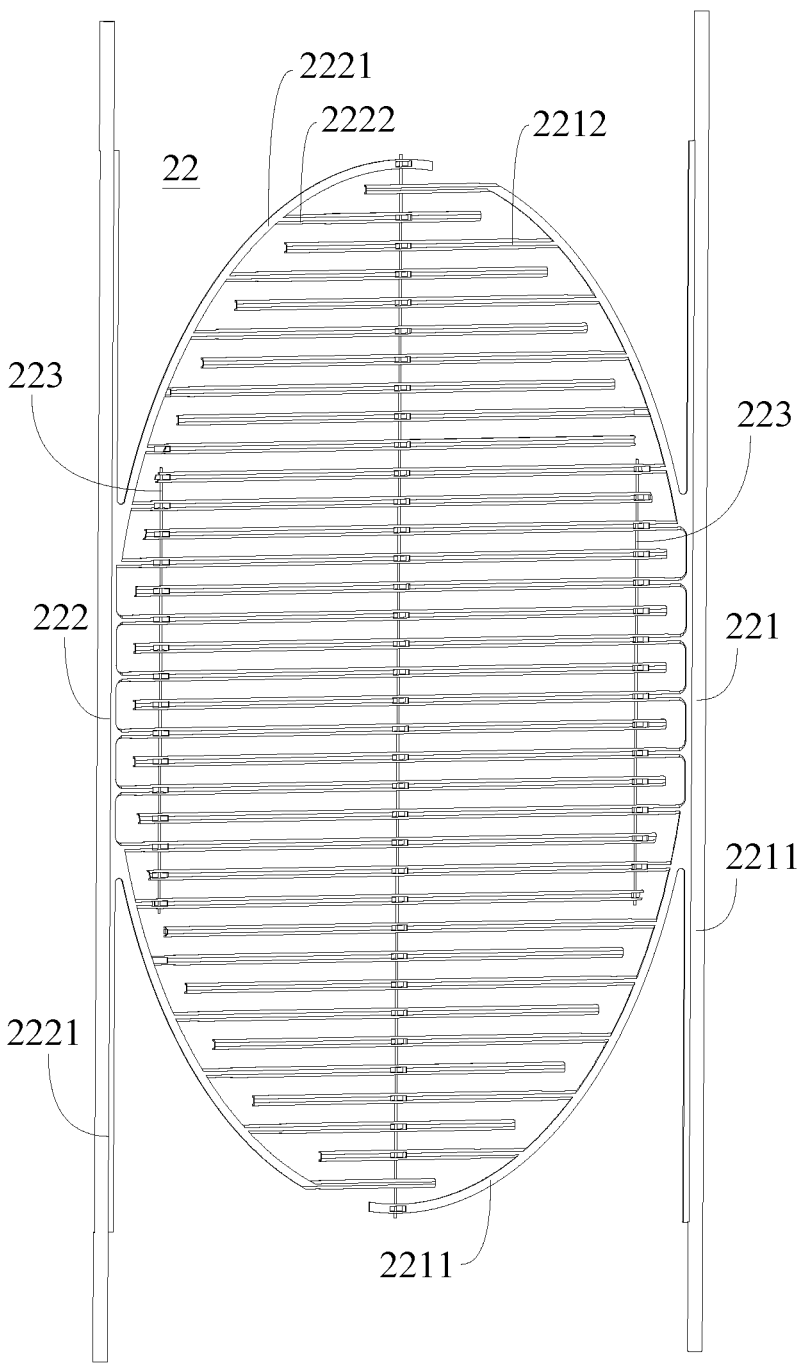
FIG. 17 shows another view of the electric grid of FIG. 16.
Figure 18:
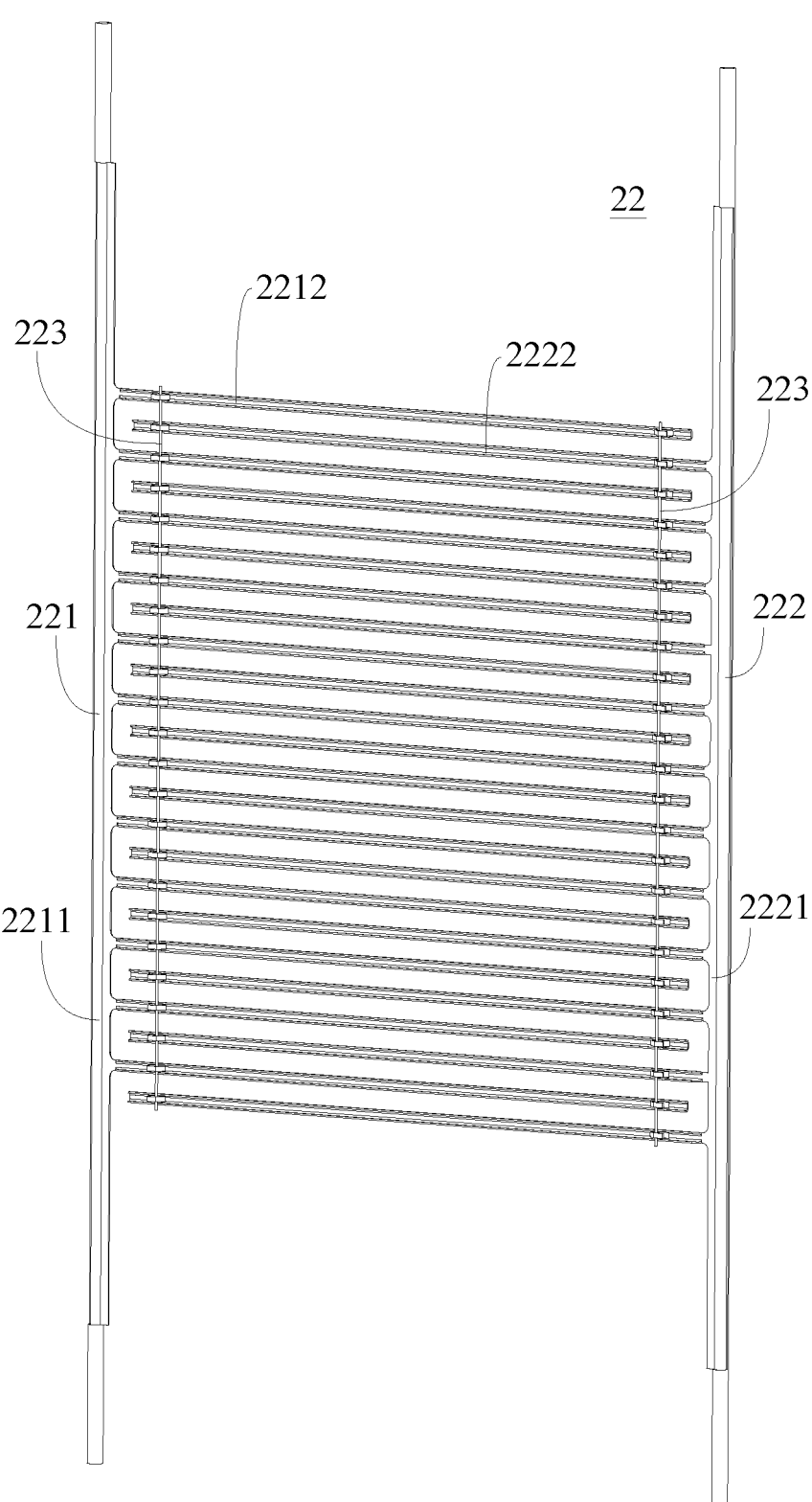
FIG. 18 is a fifth schematic view of the electric grid of the solar mosquito killer according to a first embodiment of present application.
Figure 19:
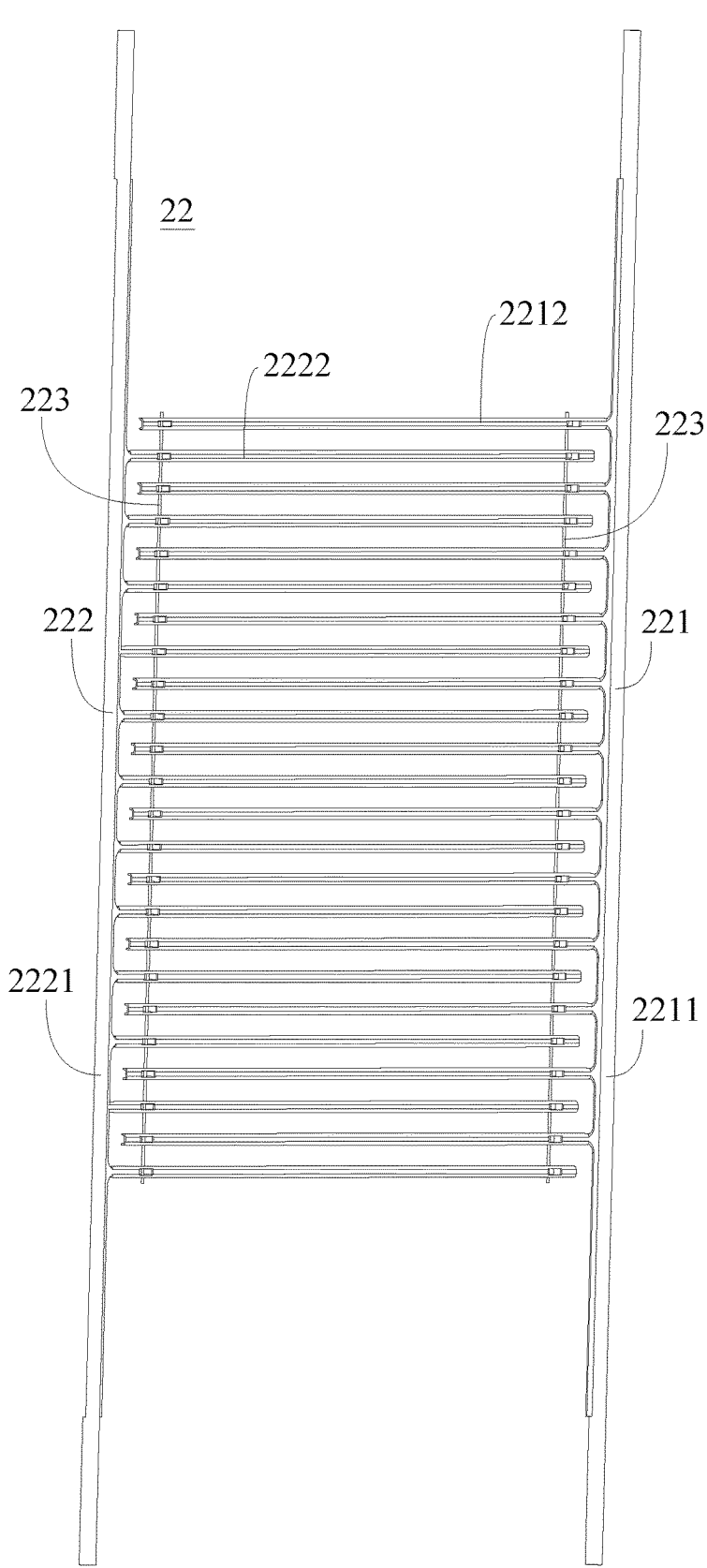
FIG. 19 shows another view of the electric grid of FIG. 18.
Figure 20:
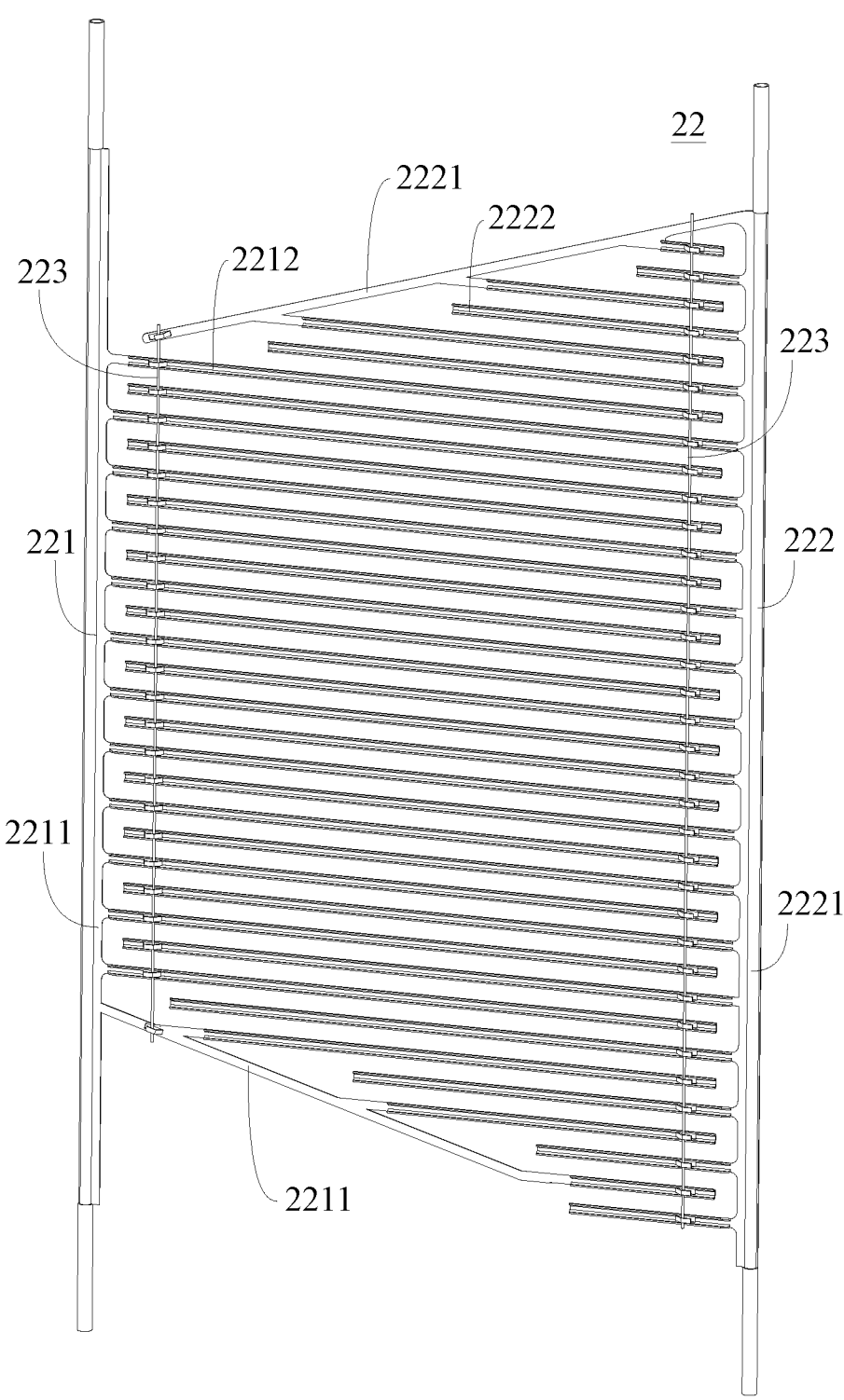
FIG. 20 is a sixth schematic view of the electric grid of the solar mosquito killer according to a first embodiment of present application.
Figure 21:
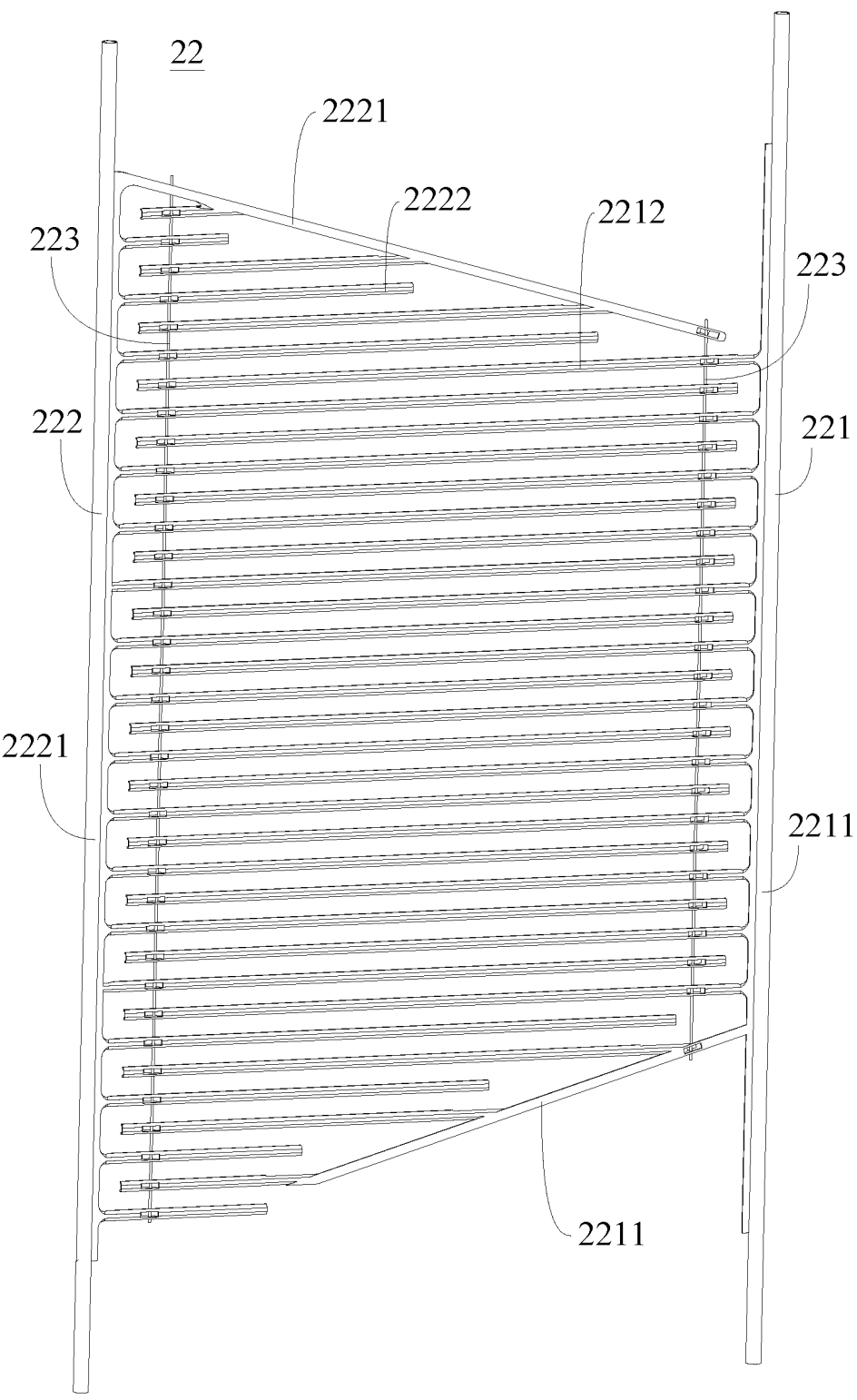
FIG. 21 shows another view of the electric grid of FIG. 20.
Figure 22:
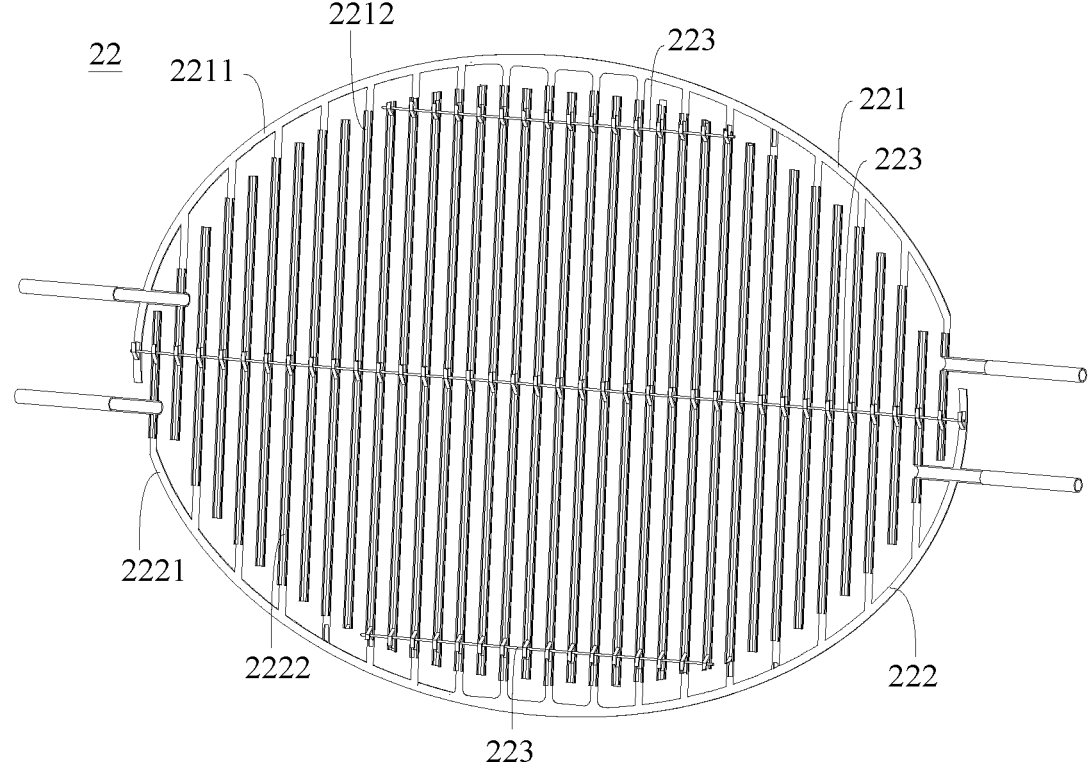
FIG. 22 is a seventh schematic view of the electric grid of the solar mosquito killer according to a first embodiment of present application.
Figure 23:
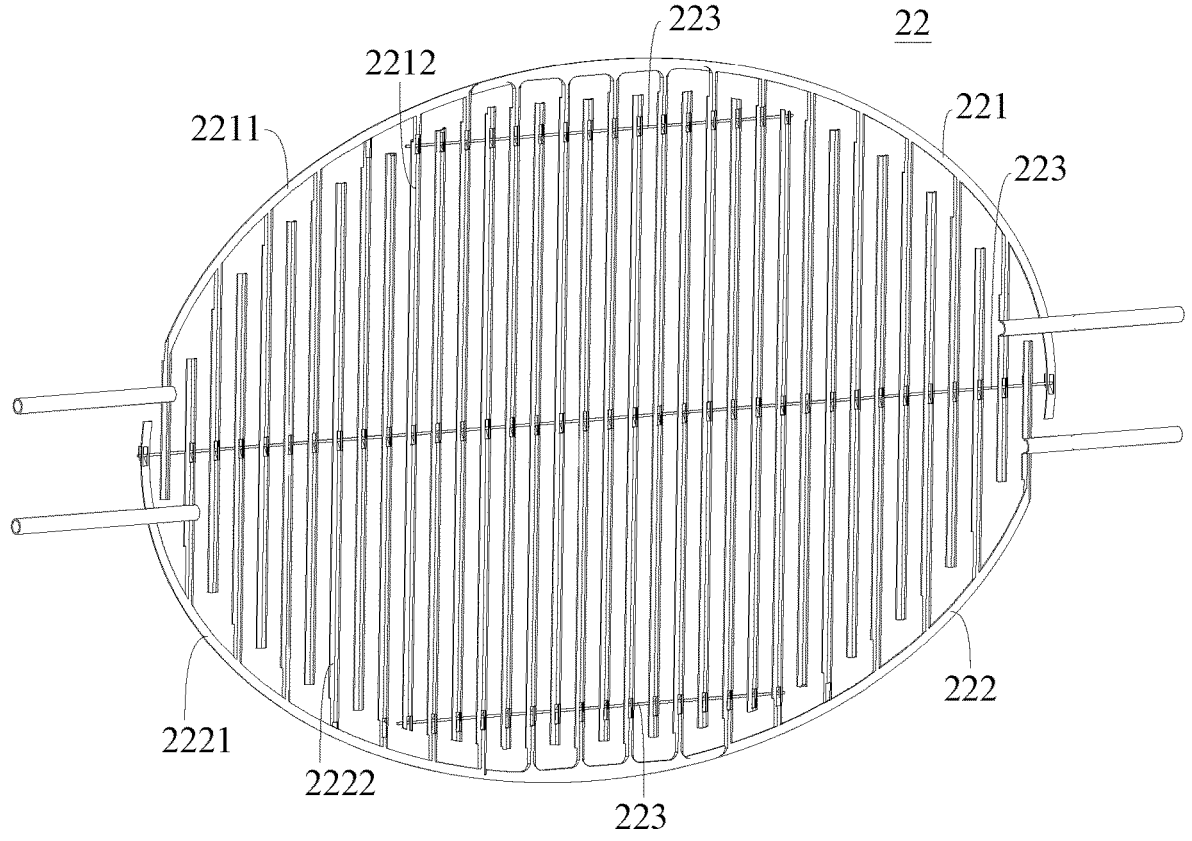
FIG. 23 shows another view of the electric grid of FIG. 22.
Figure 24:
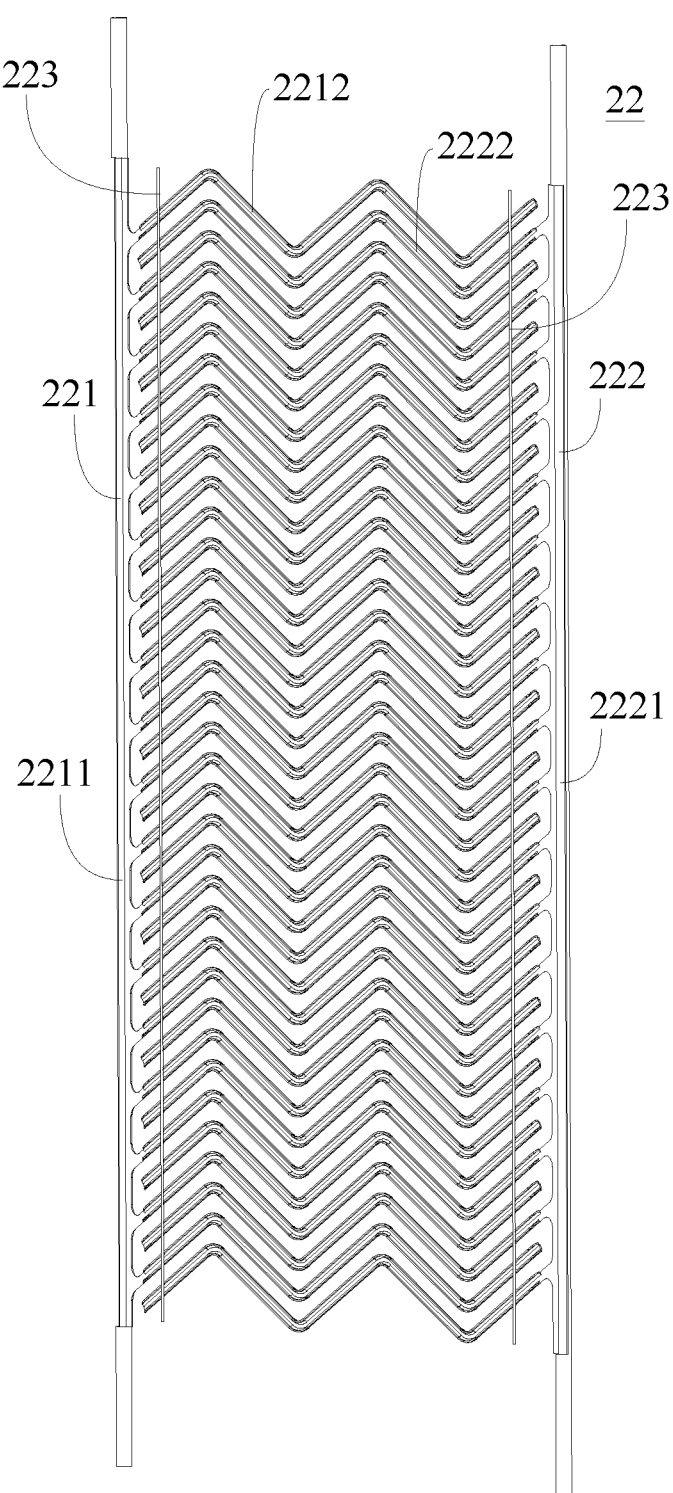
FIG. 24 is an eighth schematic view of the electric grid of the solar mosquito killer according to a first embodiment of present application.
Figure 25:
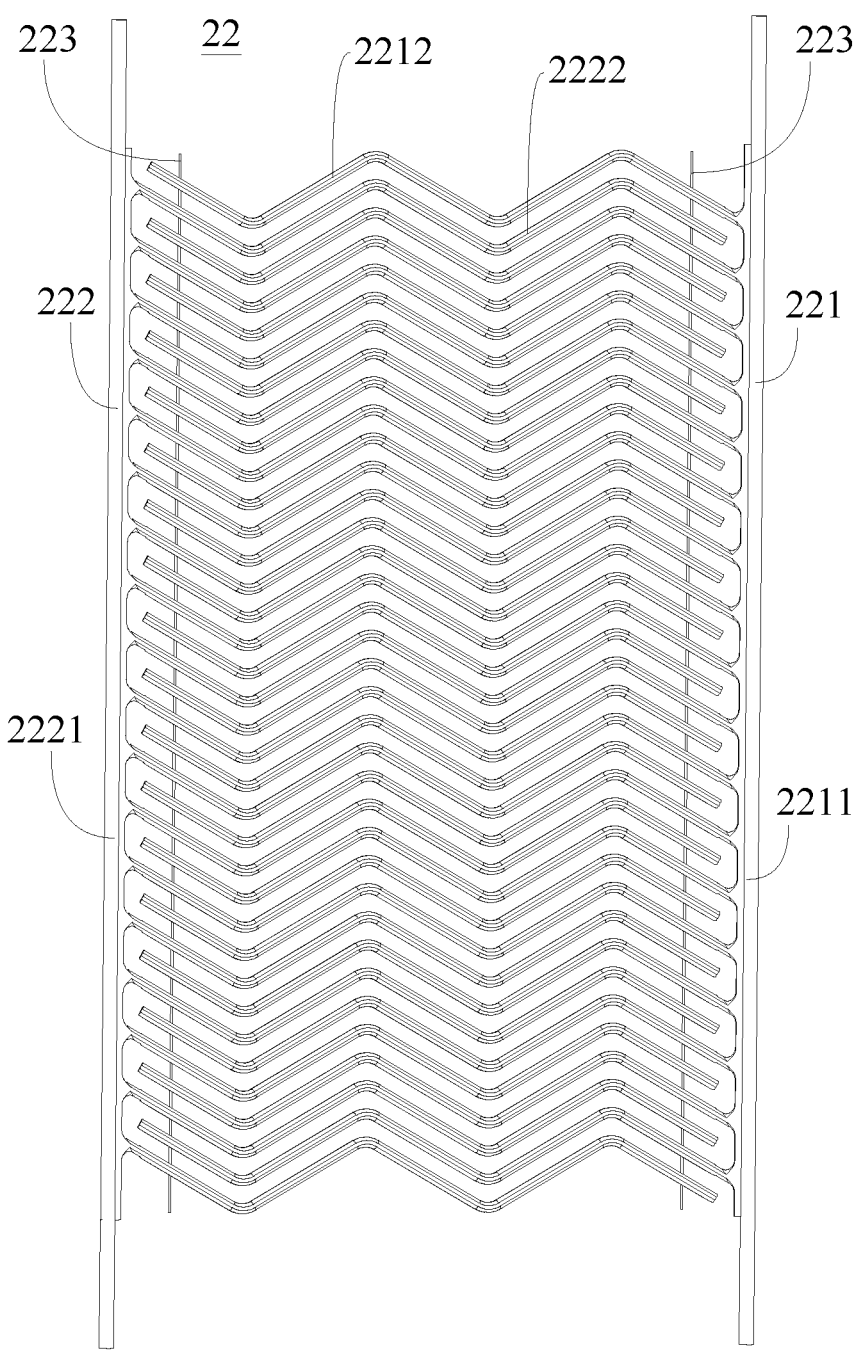
FIG. 25 shows another view of the electric grid of FIG. 24.
Figure 26:
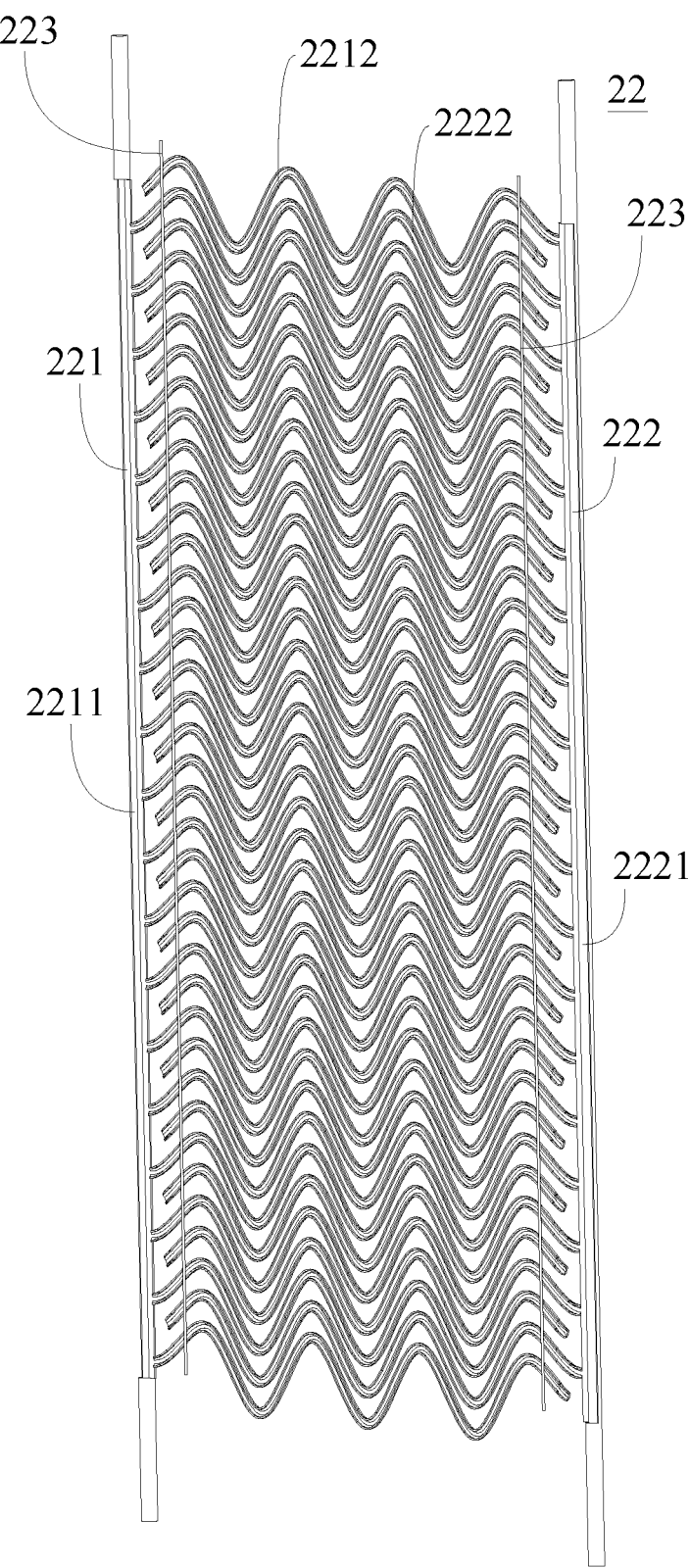
FIG. 26 is a ninth schematic view of the electric grid of the solar mosquito killer according to a first embodiment of present application.
Figure 27:
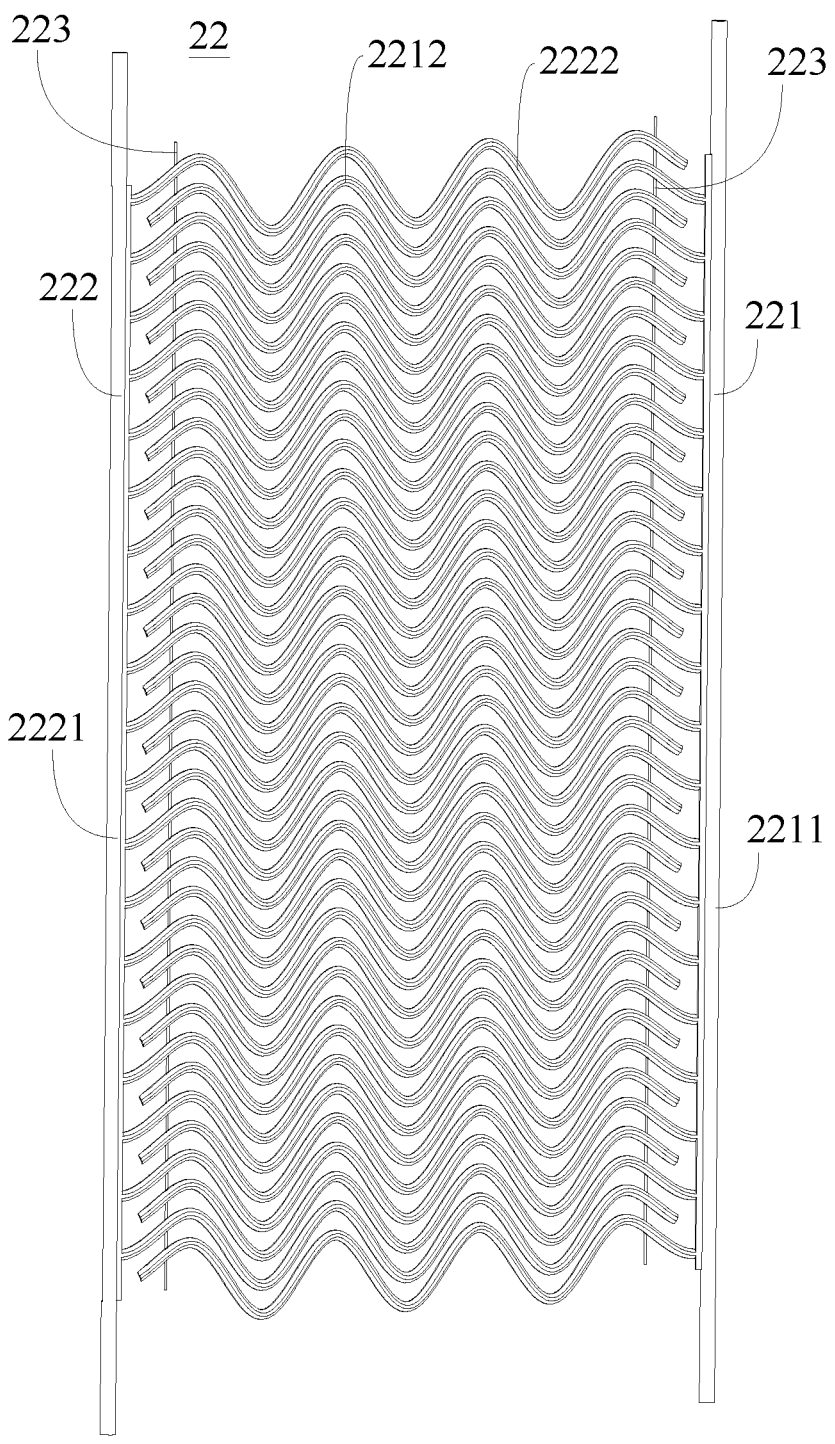
FIG. 27 shows another view of the electric grid of FIG. 26.

Furthermore, as shown in FIGS. 11 to 13, in order to achieve the connection between the connecting strip 223 and multiple positive electrode strips 2212 as well as multiple negative electrode connecting strips 2222, at least one first hook 2213 will be formed on each positive electrode strip 2212 during the manufacturing process of the positive electrode component 221, and at least one second hook 2223 will be formed on each negative electrode strip 2222 during the manufacturing process of the negative electrode component 222. The connecting strip 223 is fixed on the first hook 2213 and the second hook 2223, so that multiple positive electrode strips 2212 and multiple negative electrode strips 2222 can be connected together through the connecting strip 223, making the overall structure of the electric grid 22 more stable and effective, avoiding the phenomenon of bending caused by the arbitrary swinging of multiple positive electrode strips 2212 and multiple negative electrode strips 2222 under external forces such as wind.

It should be noted that the specific structure of the electric grid 22 in the first embodiment of the present application is not limited to the structures shown in FIGS. 9 to 13, for example, FIGS. 14 to 27 are perspective views of several other structural forms of the electric grid 22, designers can choose the appropriate structure of the electric grid 22 to install inside the frame component 21 according to actual needs, and from FIG. 14 to FIG. 27, it can be seen that there are differences in the shapes of the positive electrode connecting part 2211 and the positive electrode strip 2212 of the positive electrode component 221 for different structures of the electric grid 22, and there are differences in the shapes of the negative electrode connecting part 2221 and the negative electrode strip part 2222 of the negative electrode component 222.

In this embodiment, as shown in FIGS. 7, 28, 29, and 30, the solar mosquito killer further includes an electrical connection component 4, and the solar module 1 is electrically connected to the mosquito killing module 2 through the electrical connection component 4. The electrical connection component 4 includes a first electrical connector 41 and a second electrical connector 42, the first electrical connector 41 is connected to the solar module 1 through a first wire 41a, and the second electrical connector 42 is connected to the mosquito killing module 2 through a second wire 42a. The first electrical connector 41 and the second electrical connector 42 are detachably electrically connected, in this way, the solar module 1 is detachably connected to the mosquito killing module 2 through the second electrical connector 42 and the first electrical connector 41. The solar module 1, the mosquito killing module 2, and the electrical connection component 4 are designed to be independent of each other and modular, making it easy for users to disassemble, handle, and repair parts separately.

In this embodiment, as shown in FIGS. 7, 28, 29, and 30, one of the first electrical connector 41 and the second electrical connector 42 includes a hole end connector 401, and the other of the first electrical connector 41 and the second electrical connector 42 includes a pin end connector 402. A pin 4022 of the pin end connector 402 is used to be inserted into a hole 4012 of the hole end connector 401 to make contact and electrically connect with the pin in the hole end connector 401. The pin 4022 of the pin end connector 402 has a surrounding wall 4023, which wraps around the outer surface of the hole end connector 401, and a waterproof sealing ring 43 is also provided between the inner surface of the surrounding wall 4023 of the pin end connector 402 and the outer surface of the hole end connector 401, among them, the material of waterproof sealing ring 43 can be, but is not limited to, elastic materials such as rubber and silicone. When the pin end connector 402 is inserted into the hole end connector 401, the inner surface of the surrounding wall 4023 of the pin end connector 402 and the outer surface of the hole end connector 401 will press the waterproof sealing ring 43, and the waterproof sealing ring 43 is deformed under force to fit with the inner surface of the surrounding wall 4023 of the pin end connector 402 and the outer surface of the hole end connector 401, thereby achieving the function of waterproof sealing, this structure is simple and easy to implement.

Figure 28:
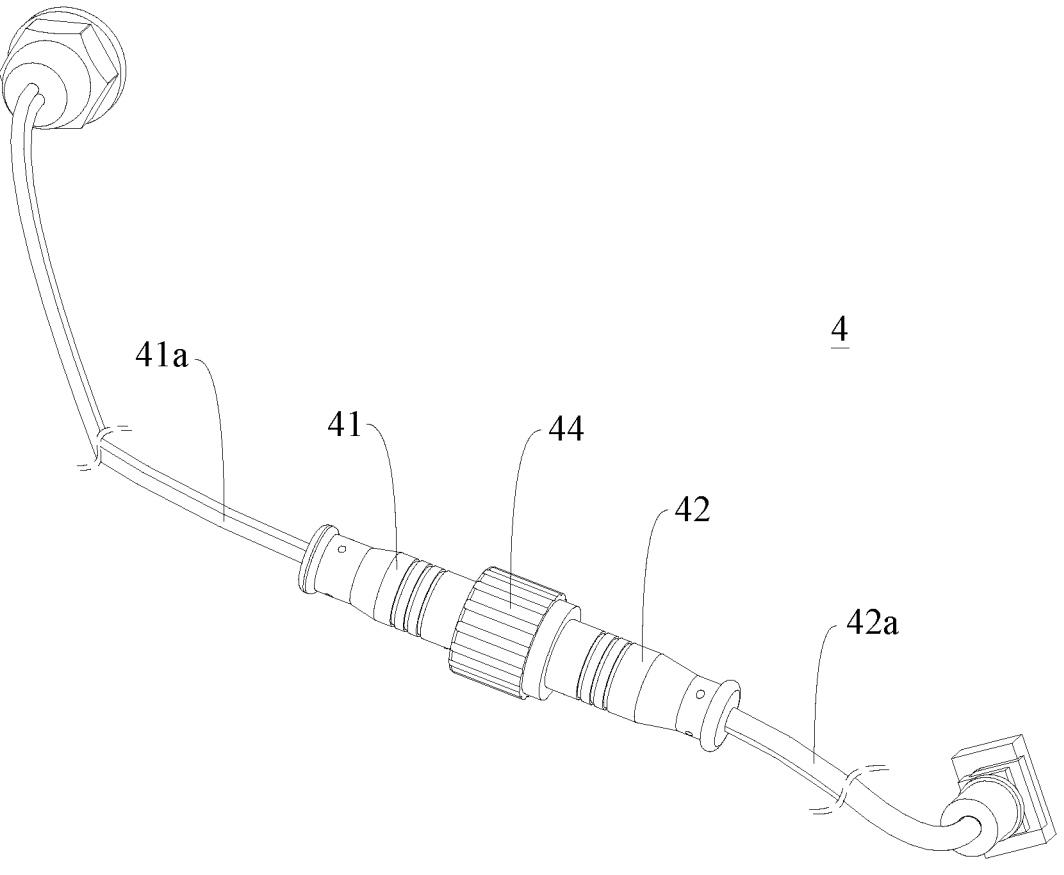
FIG. 28 is a schematic view of the electrical connection component of the solar mosquito killer according to a first embodiment of present application.
Figure 29:
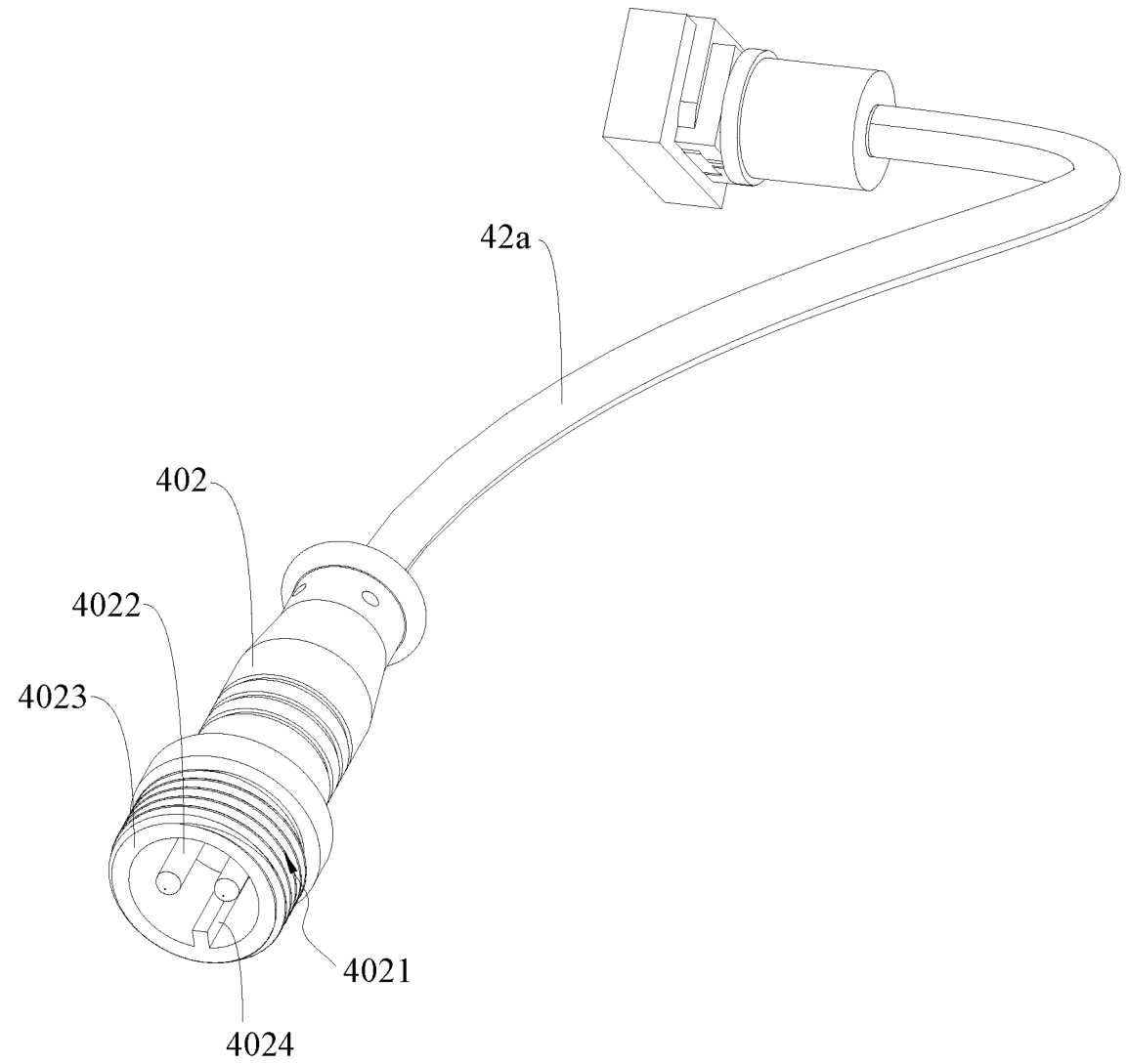
FIG. 29 is a schematic view of the pin end connector of the electrical connection component of FIG. 28.
Figure 30:
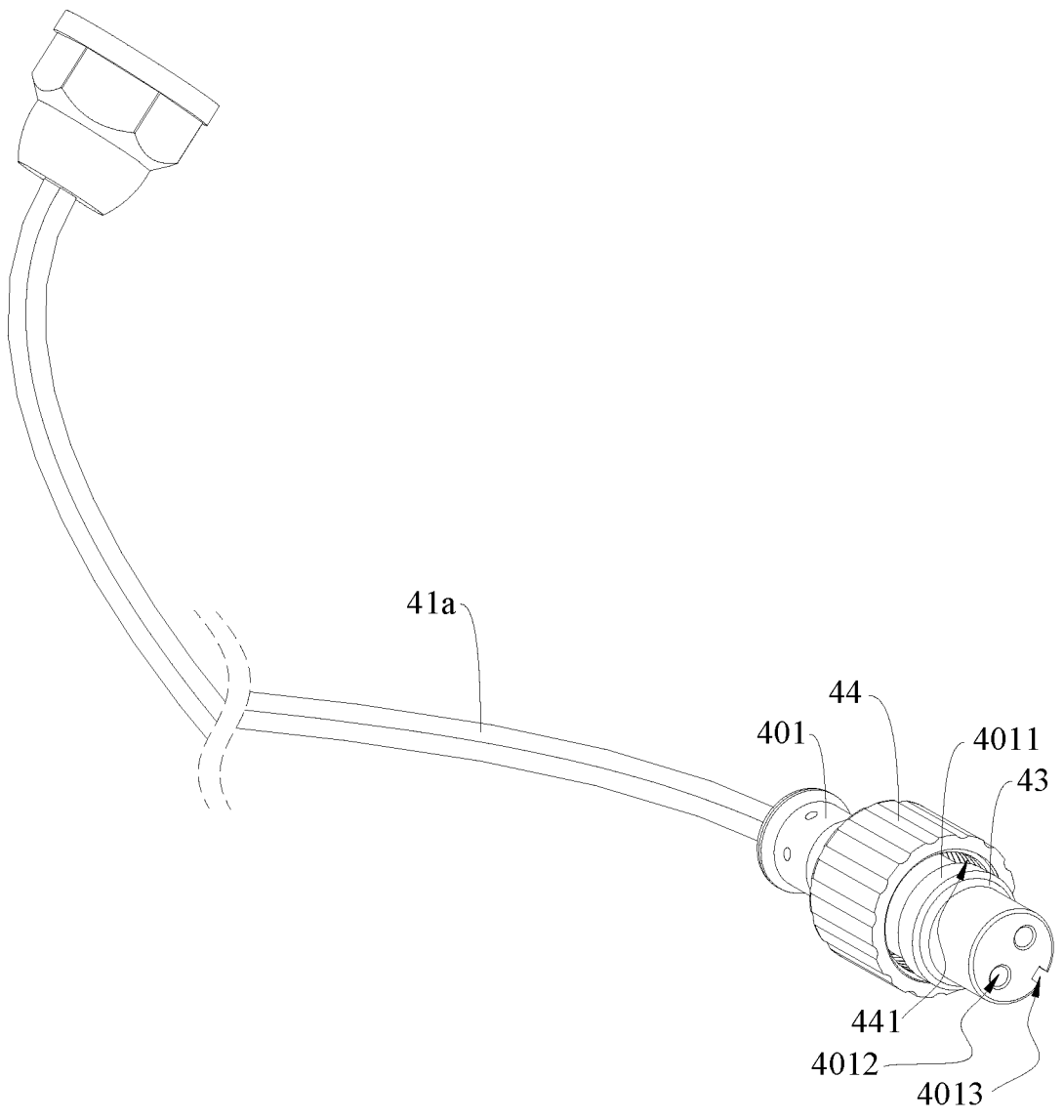
FIG. 30 is a schematic view of the hole end connector of the electrical connection component of FIG. 28.

In this embodiment, as shown in FIGS. 28 to 30, the outer surface of the surrounding wall 4023 of the pin end connector 402 is provided with external threads 4021, the electrical connection component 4 also includes a connecting cover 44, which is sleeved on a periphery of the hole end connector 401, and the inner wall surface of the connecting cover 44 is provided with internal threads 441. After the pin end connector 402 is inserted into the hole end connector 401, the internal threads 441 of the connecting cover 44 are used to connect with the external threads 4021 of the pin end connector 402 to fix the first electrical connector 41 and the second electrical connector 42. After the pin end connector 402 is inserted into the hole end connector 401, a user can rotate the connecting cover 44 fitted on the hole end connector 401 to connect the internal thread 441 on the inner wall surface of the connecting cover 44 with the external thread 4021 on the outer surface of the surrounding wall 4023 of the pin end connector 402, in this way, a threaded connection can be used to achieve relative fixation between the pin end connector 402 and the hole end connector 401. The structure is simple and the connection is firm, the operation is simple and easy for the user to use, in addition, the threaded connection of the connecting cover 44 is matched with the setting of the waterproof sealing ring 43, which not only enables stable electrical connection between the pin end connector 402 and the hole end connector 401, but also plays a good waterproof sealing role, effectively preventing liquid from penetrating into the pin 4022 of the pin end connector 402 and the hole 4012 of the hole end connector 401.

In this embodiment, as shown in FIGS. 28 to 30, a limiting protrusion 4011 is provided on the outer side of the hole end connector 401, and a waterproof sealing ring 43 is provided on the hole end connector 401 and near to the limiting protrusion 4011. When the pin end connector 402 is inserted into the hole end connector 401, the end face of the pin end connector 402 presses against the waterproof sealing ring 43, and the connecting cover 44 covers the waterproof sealing ring 43. By designing the limiting protrusion 4011, on one hand, it provides support for the waterproof sealing ring 43, when the pin end connector 402 is inserted into the hole end connector 401, the inner surface of the surrounding wall 4023 of the pin end connector 402 presses against the outer surface of the hole end connector 401, causing the waterproof sealing ring 43 to deform under force and come into contact with the limiting protrusion 4011; on the other hand, the limiting protrusion 4011 prevents the waterproof sealing ring 43 from loosening due to force compression, providing a good limiting effect on the waterproof sealing ring 43.

In this embodiment, as shown in FIGS. 28 to 30, a guide shaft 411 is provided on the pin end connector 402, and a guide groove 421 is provided on the hole end connector 401, and the guide shaft 411 is used for insertion into the guide groove 421. When the pin 4022 of the pin end connector 402 is inserted into the hole 4012 of the hole end connector 401 in a hurry by the user, if the pin 4022 of the pin end connector 402 is not correctly inserted into the hole 4012 of the hole end connector 401, and the pin end connector 402 includes the pin end connector body and the pin 4022, the end of the pin 4022 connected to the pin end connector body is prone to loosening, causing damage to the pin end connector 402. By setting the guide shaft 411 and the guide groove 421, the guide shaft 411 and the guide groove 421 play a role in calibration and positioning, after aligning the guide shaft 411 with the guide groove 421, the user inserts the pin end connector 402 to the hole end connector 401, which can protect the pin end connector 402 and extend its service life. Of course, it can also be that the pin end connector 402 is equipped with a guide groove 421, and the hole end connector 401 is equipped with a guide shaft 411, which is used to be inserted into the guide groove 421.

Figure 31:
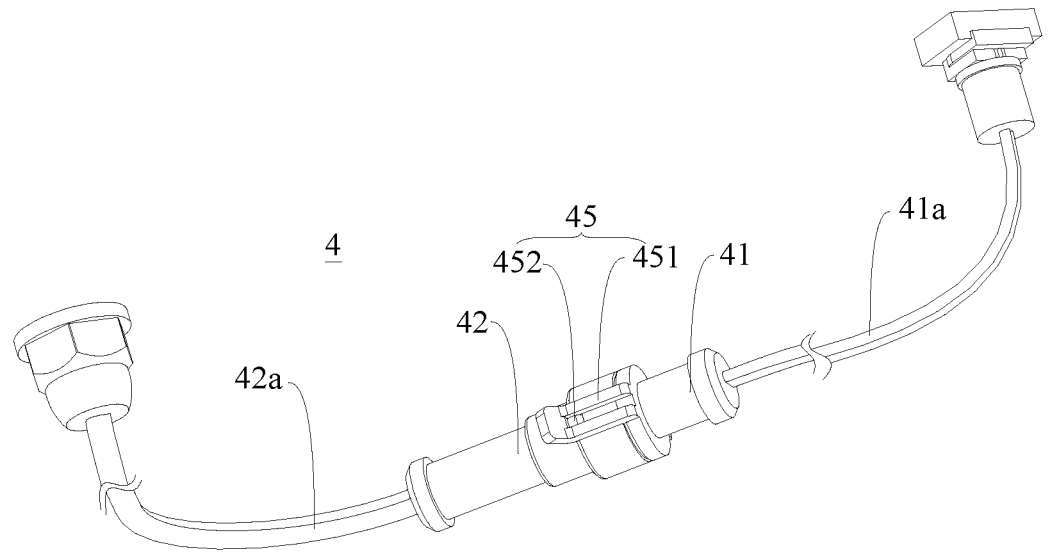
FIG. 31 shows the pin end connector and the hole end connector are connected by a buckle structure according to a first embodiment of present application.
Figure 32:
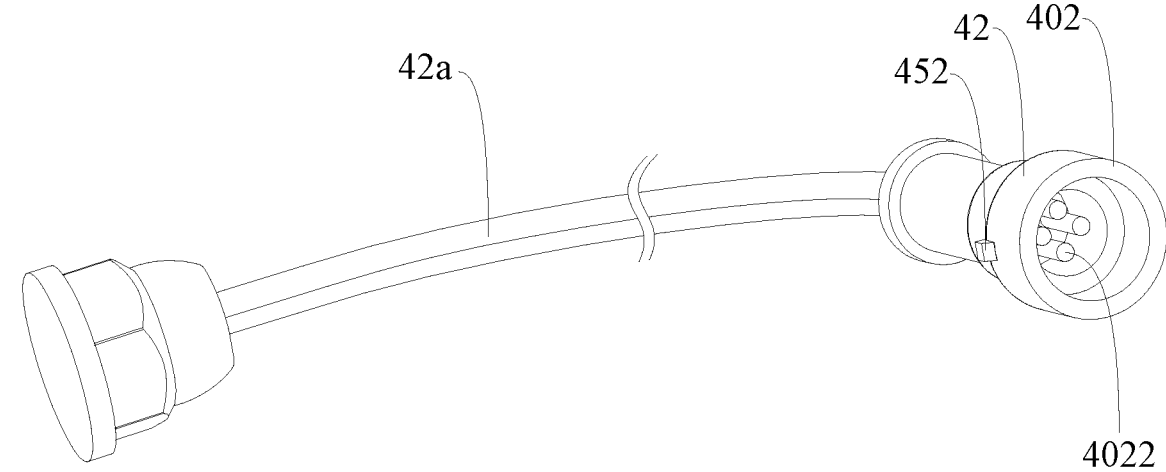
FIG. 32 is a schematic view of the pin end connector of the electrical connection component of FIG. 31.
Figure 33:
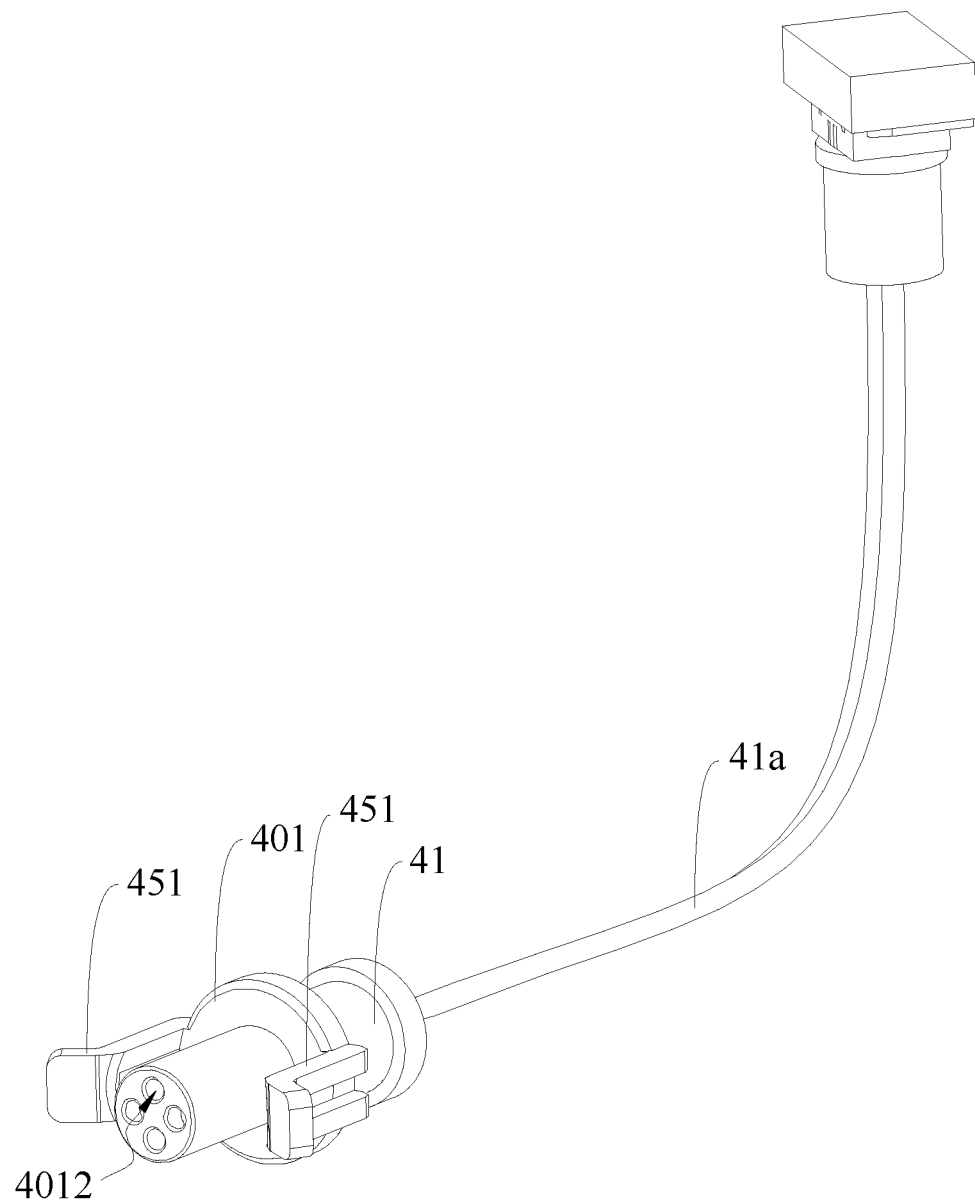
FIG. 33 is a schematic view of the hole end connector of the electrical connection component of FIG. 31.

Of course, in the embodiments shown in FIGS. 28-30, the electrical connection component 4 includes a connecting cover 44 for locking the connection between the hole end connector 401 and the pin end connector 40. Alternatively, in other embodiments, as shown in FIGS. 31 to 33, the electrical connection component 4 may not include the above-mentioned connecting cover 44, but may also include a buckle structure 45, which includes a buckle 451 and a hook 452. At least one of the buckle 451 and the hook 452 is provided on the pin end connector 402, and at least the other of the buckle 451 and the hook 452 is provided on the outer surface of the hole end connector 401. After inserting the pin end connector 402 into the hole end connector 401, the user connects the buckle 451 with the hook 452 to achieve relative fixation between the pin end connector 402 and the hole end connector 401 through the buckle connection method, the structure is simple and the connection is firm, and the operation is simple and easy for the user to use.

Figure 34:
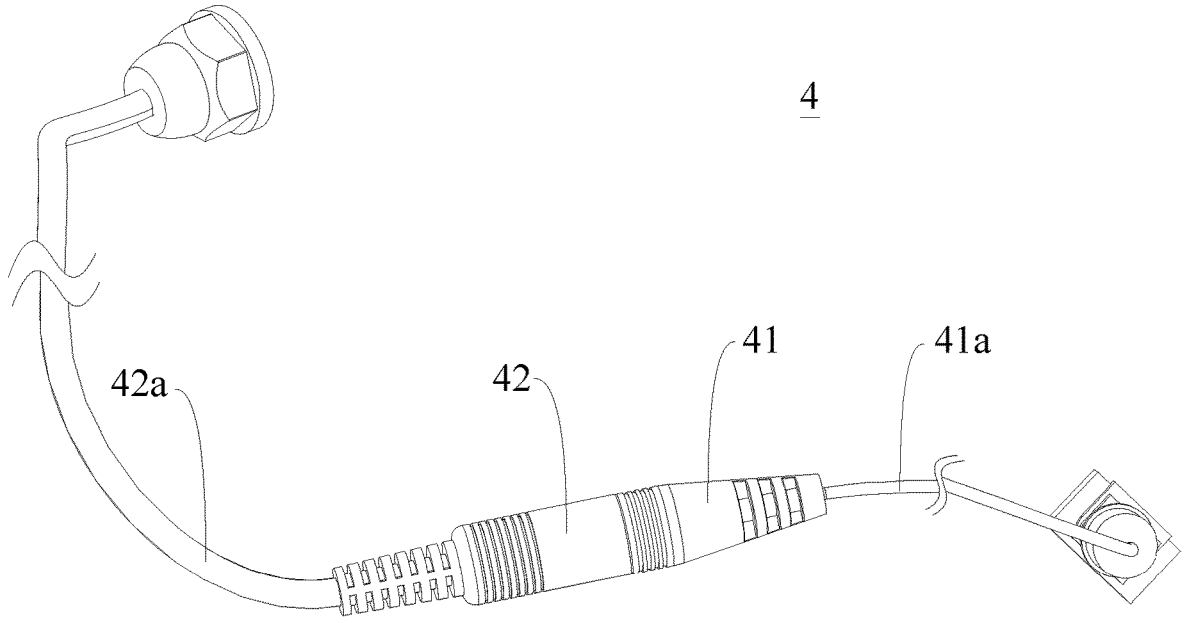
FIG. 34 shows the pin end connector and the hole end connector are connected by plug-in connection manner according to a first embodiment of present application.
Figure 35:
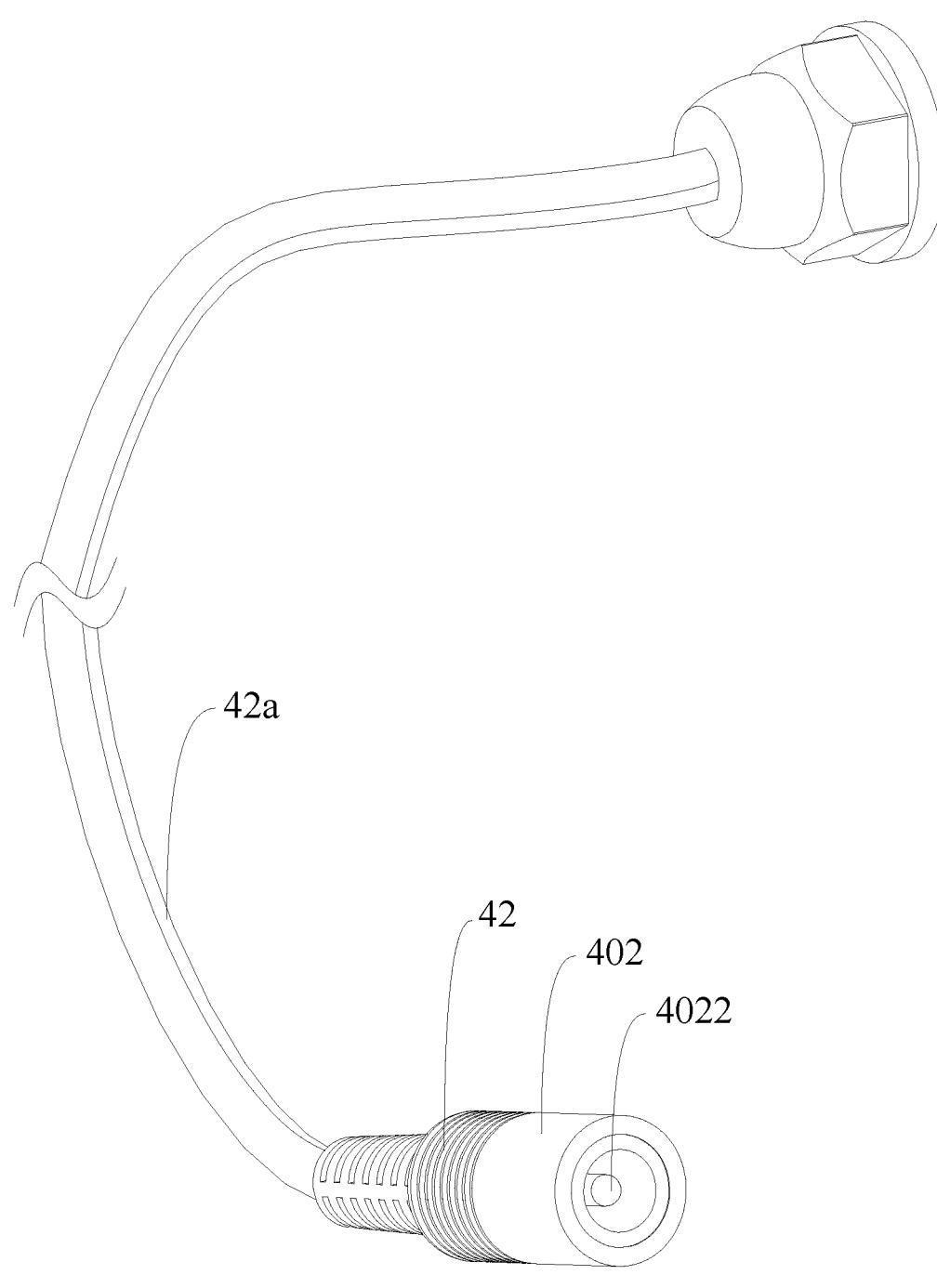
FIG. 35 is a schematic view of the pin end connector of the electrical connection component of FIG. 34.
Figure 36:
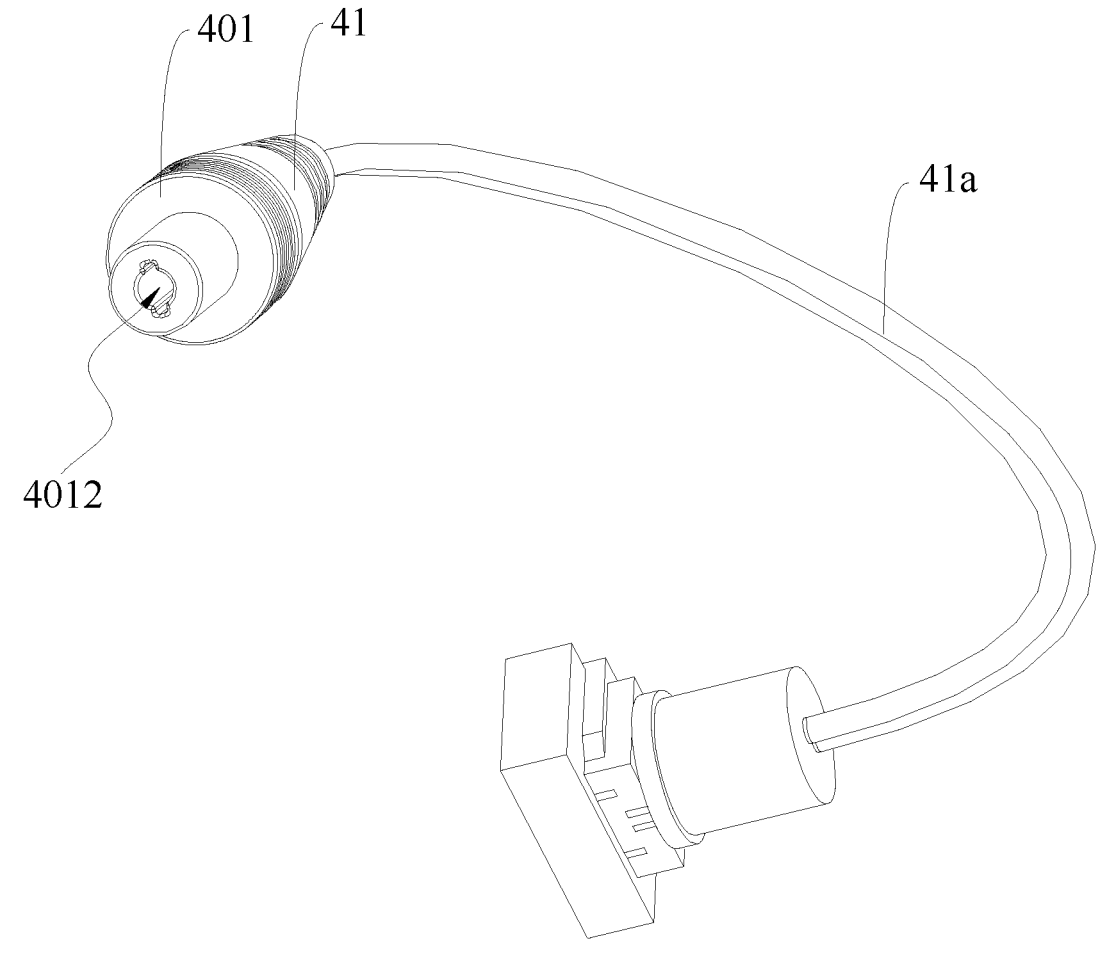
FIG. 36 is a schematic view of the hole end connector of the electrical connection component of FIG. 34.
Figure 37:
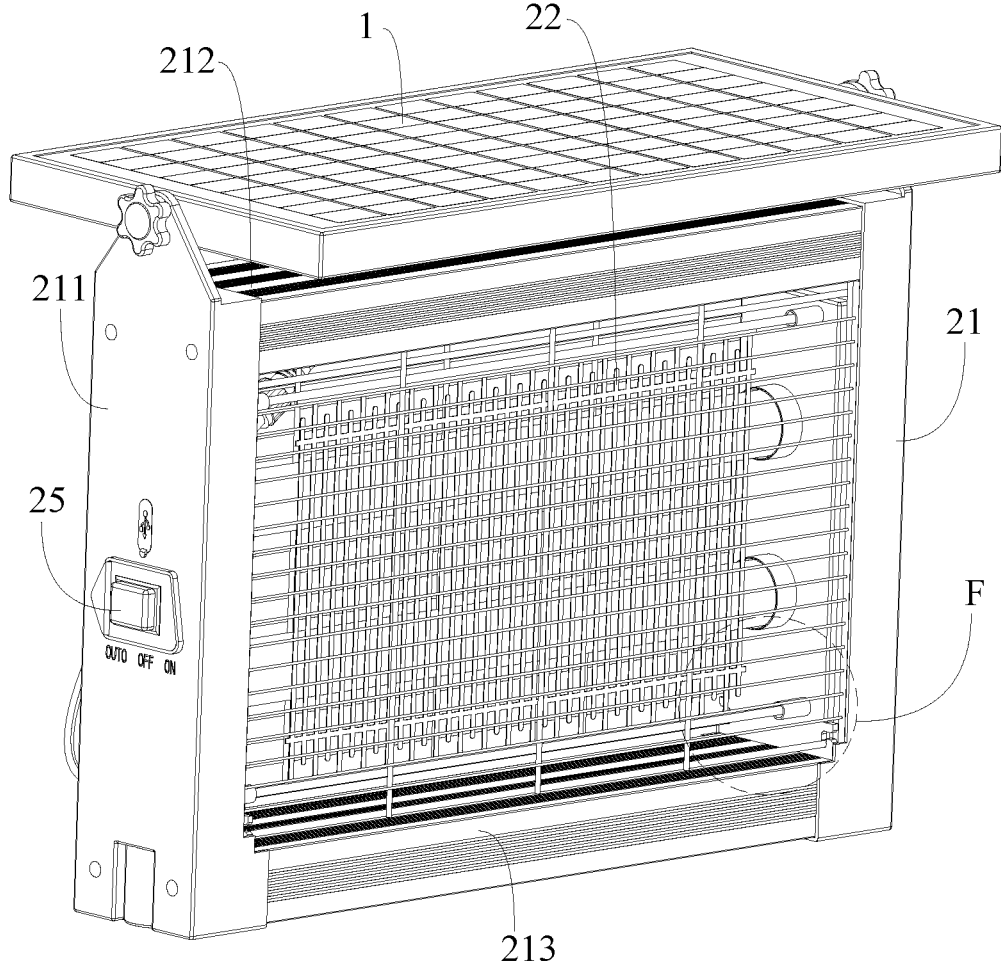
FIG. 37 is another schematic view of the electric grid of the solar mosquito killer according to a first embodiment of present application.

Of course, as shown in FIGS. 34 to 36, the pin end connector 402 and the hole end connector 401 can also be connected by plug-in connection to achieve relative fixation of their positions, the structure is simple, the connection is firm, the operation is simple, and it is easy for users to use.

In this embodiment, as shown in FIGS. 2, 3, and 37 to 40, the frame component 21 includes two mounting columns 211, a top beam 212, a bottom beam 213, and two protective nets 214. The two mounting columns 211, the top beam 212, the bottom beam 213, and the two protective nets 214 are connected to each other to form a frame, the two mounting columns 211 are arranged opposite to each other, the top beam 212 is arranged opposite to the bottom beam 213, and the two protective nets 214 are arranged opposite to each other. Both mounting columns 211 are equipped with first insertion holes 2111 for installation at both ends of the electric grid 22; the control component 23 and button 24 are both installed on one of the mounting pillars 211. By designing the mounting column 211, top beam 212, bottom beam 213, and protective nets 214, such the mounting column 211, the top beam 212, the bottom beam 213, and the protective nets 214 are assembled and connected to form a frame, which facilitates the installation and disassembly of various components in the frame assembly 21. By designing the first insertion holes 2111 at both ends of the electric grids 22 on the two mounting columns 211, the electric grids 22 can be fixed without the need for screws or other components, which facilitates the installation between the electric grids 22 and the frame component 21, making assembly more convenient and efficient, and saving processes.

In this embodiment, as shown in FIG. 2, FIG. 3, and FIGS. 37 to 40, the mosquito killing module 2 further comprises at least one mosquito trap lamp 26, which is electrically connected to the control component 23, and the mosquito trap lamp 26 introduces mosquitoes into the frame component 21 by emitting light; both mounting columns 211 are equipped with second insertion holes 2112 for installing at least one mosquito trap lamp 26 at both ends. Among them, the mosquito trap light 26 can be an LED light, and the button 24 mentioned above can also be the brightness adjustment button of the mosquito trap light 26. By setting a second insertion hole 2112 on the two mounting columns 211, the mosquito trap lamp 26 is installed between the mosquito trap lamp 26 and the two mounting columns 211 by inserting it into the second insertion hole 2112. This eliminates the need for screws or other components to fix the mosquito trap lamp 26, making assembly more convenient and efficient, and saving processes. Fixing slots 2113 are provided on both sides of the two mounting columns 211 near the protective net 214, and the two ends of the protective net 214 are installed in the fixing slots 2113. By designing a fixing groove 2113 on the mounting column 211, the protective net 214 can be installed between the protective net 214 and the mounting column 211 by inserting it into the fixing groove 2113, this eliminates the need for screws or other components to fix the protective net 214, making assembly more convenient and efficient, and saving process time.

Specifically, the fixing groove 2113 can have a semi-enclosed bent shape, such as an L-shaped C shape or a U-shaped shape, which can include a guide groove 2113a and a fixing groove 2113b connected to the guide groove 2113a. A bottom rod of the protective net 214 is inserted into the fixing groove 2113b through the guide groove 2113a.

Figure 38:
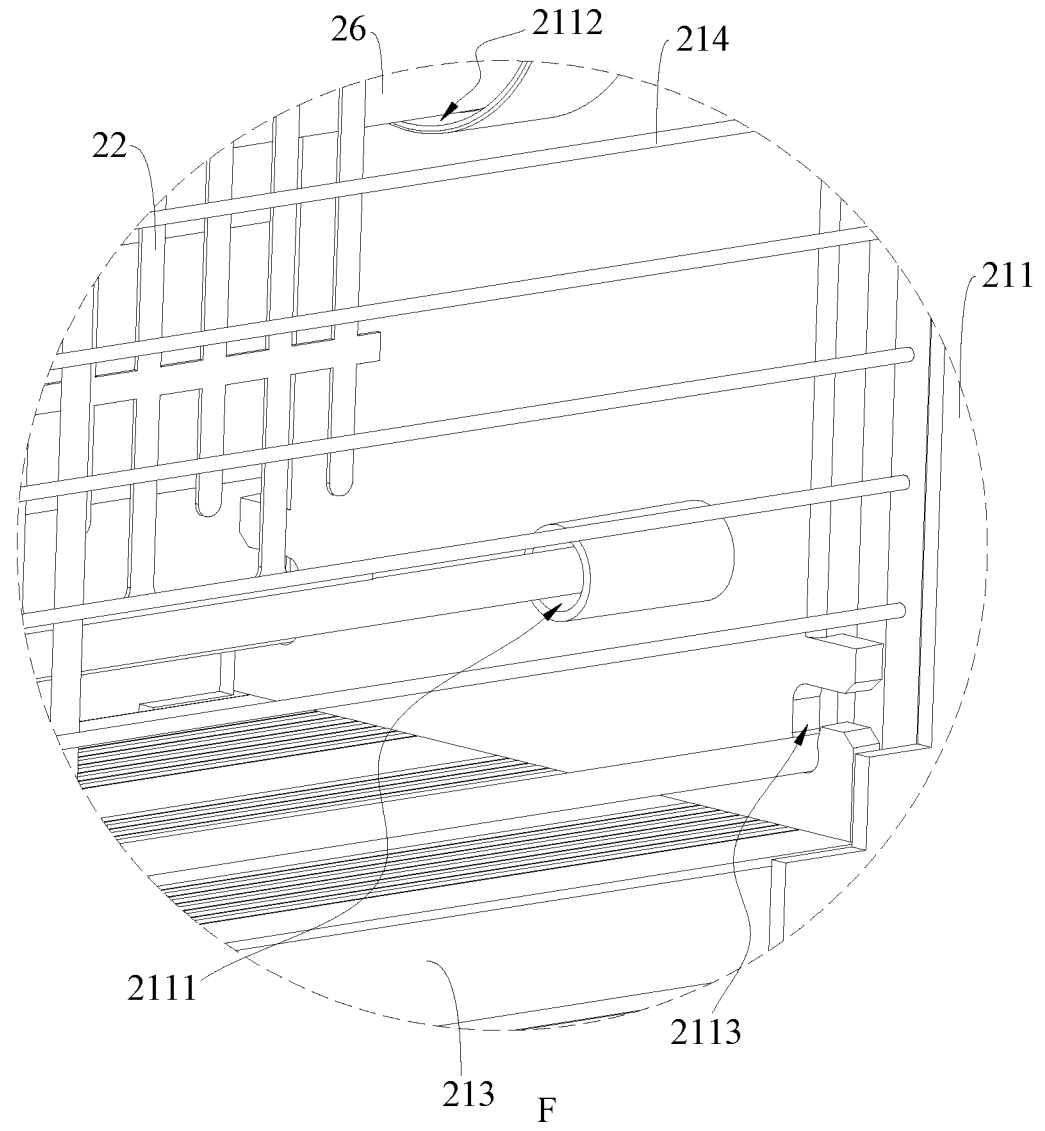
FIG. 38 shows an enlarged view of F part of FIG. 37.
Figure 39:
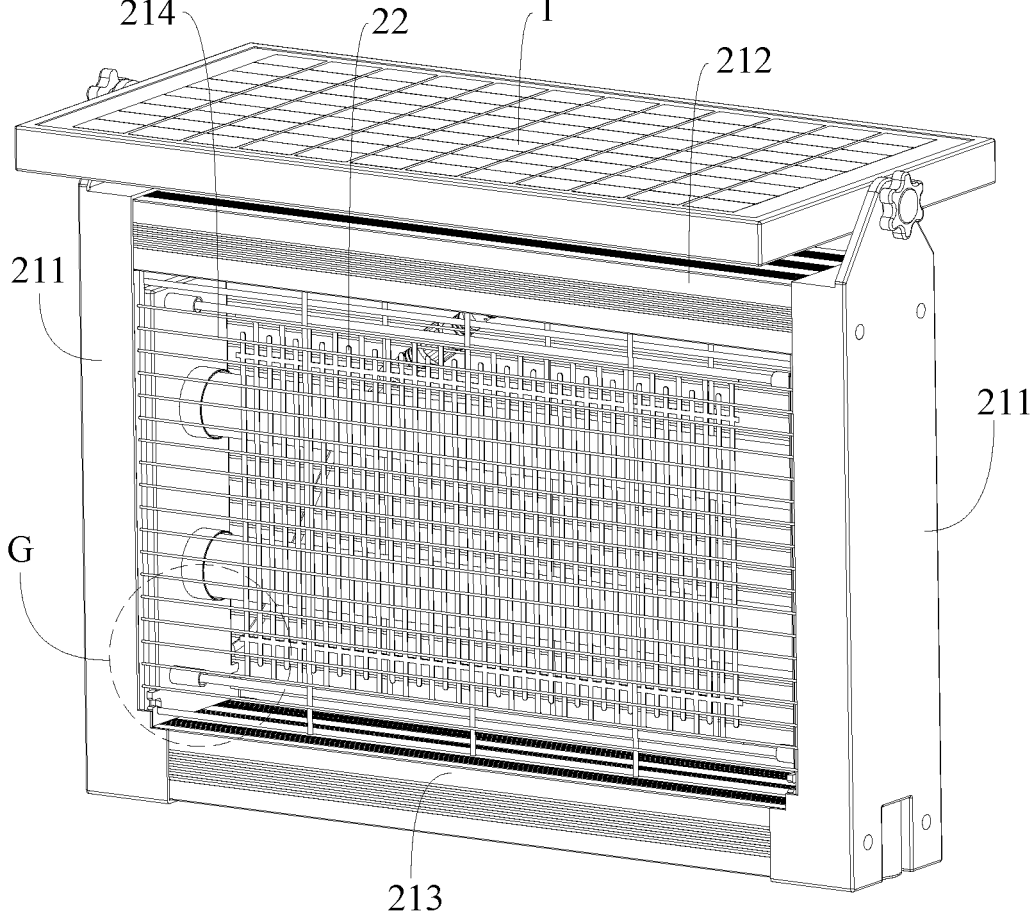
FIG. 39 is further another schematic view of the electric grid of the solar mosquito killer according to a first embodiment of present application.
Figure 40:
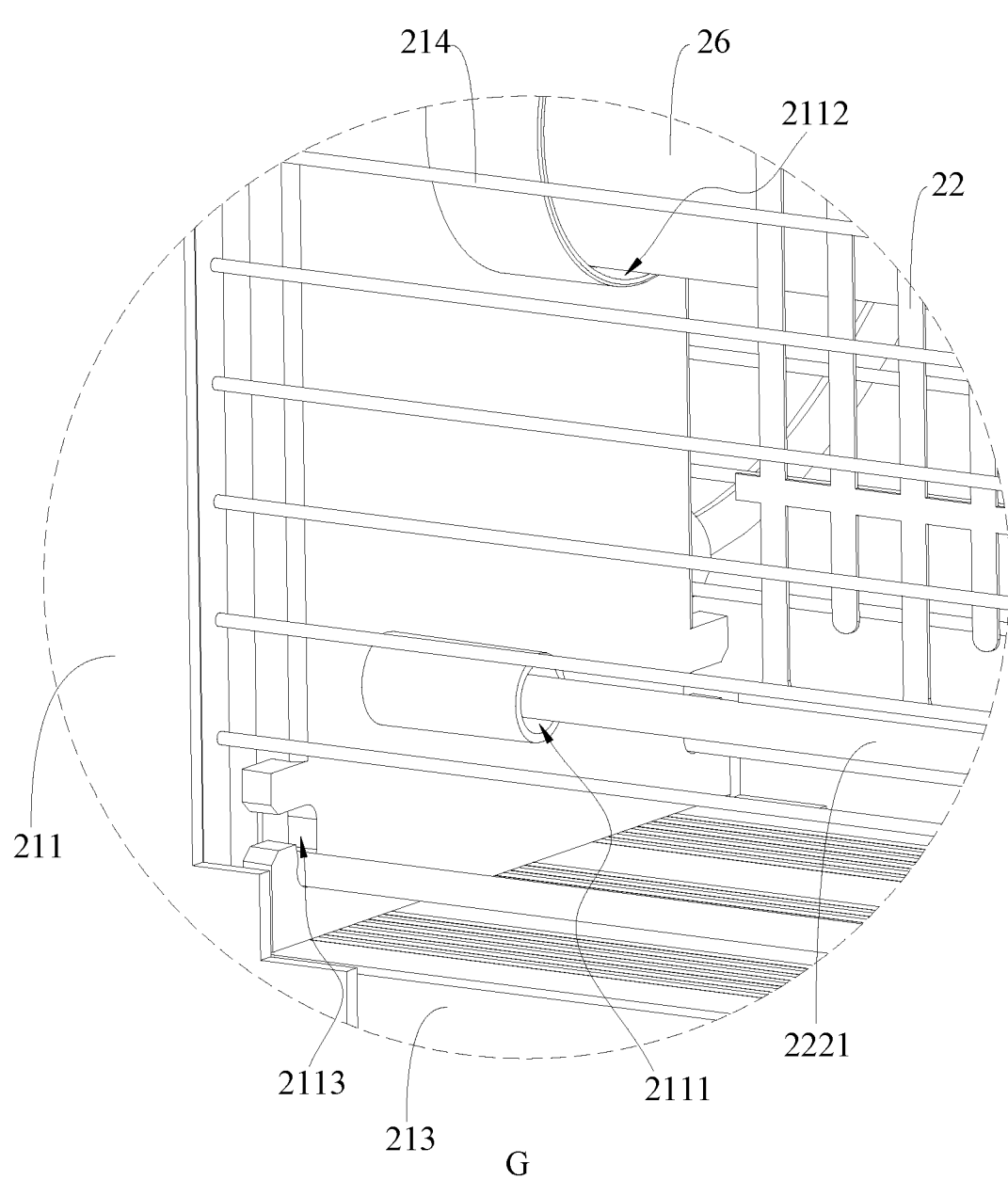
FIG. 40 shows an enlarged view of G part of FIG. 39.

Please refer to FIG. 2 and FIG. 38, a stopper 211f is provided on the cover 202 (as described below) adjacent to the fixing groove 2113b, after the assembly of the frame component 21 is completed, the stopper 211f covers and contacts at least part of the cover 202.

Figure 41:
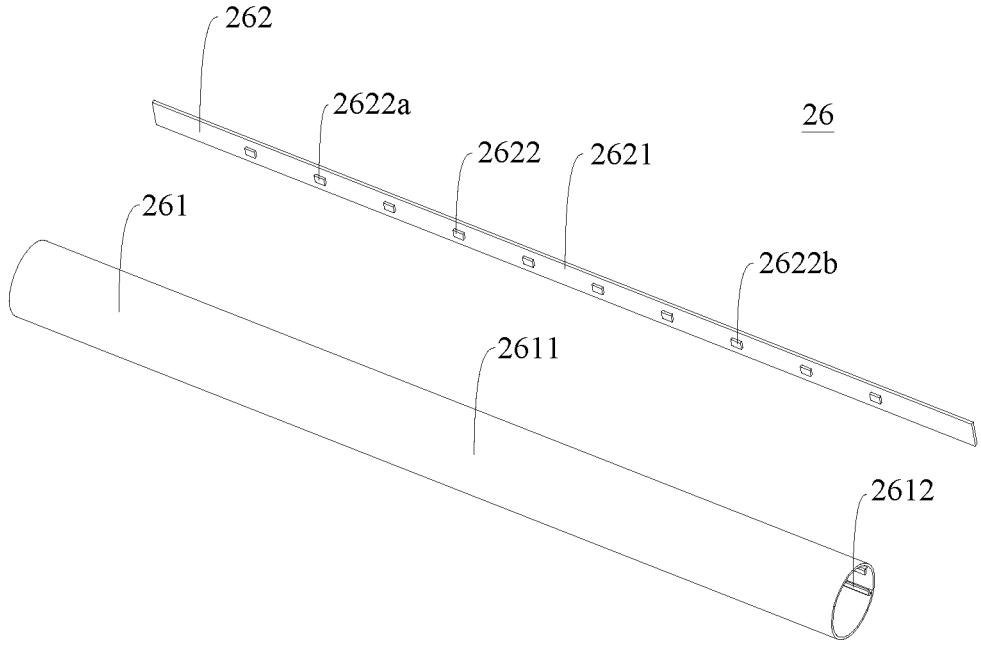
FIG. 41 is an exploded view of the mosquito trap lamp of the solar mosquito killer according to a first embodiment of present application.
Figure 42:
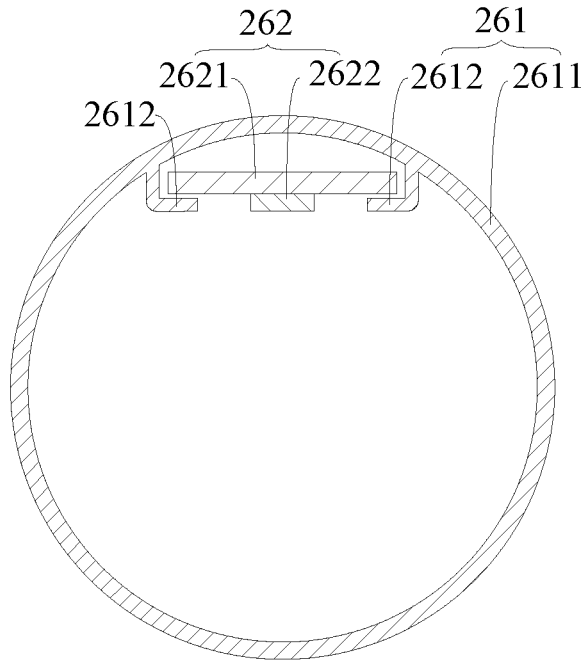
FIG. 42 is a cross sectional view of the mosquito trap lamp of the solar mosquito killer according to a first embodiment of present application.

Specifically, as shown in FIGS. 41 and 42, the mosquito trap lamp 26 includes a lampshade 261 and a circuit board assembly 262, the lampshade 261 includes a shade body 2611 and a fixing portion 2612. The end of the shade body 2611 is plugged into the second insertion hole 2112, and the fixing portion 2612 is fixedly connected to the inner surface of the shade body 2611, and the fixing portion 2612 and the shade body 2611 may be integrally formed structures made of the same material. The circuit board component 262 includes a circuit board 2621 and multiple light emitting elements 2622, and the circuit board 2621 is in the shape of a strip extending along the length direction of the mosquito killing module 2, and the circuit board 2621 is fixed to the fixing portion 2621, and multiple light emitting elements 2622 can be fixed to the circuit board 2621. Specifically, the fixing part 2612 may include two L-shaped fixing components arranged opposite to each other, so that the fixing part 2612 and the shade body 2611 can enclose a storage slot, and the circuit board component 262 can slide into the storage slot from one end of the lampshade 261 to be fixed on the fixing part 2621 and in the storage slot. The circuit board 2621 is electrically connected to the control component 23, and the light emitting element 2622 is mounted on and electrically connected to the circuit board 2621. The light emitting element 2622 can be an LED.

The light emitting element 2622 can be a UV LED, and the peak wavelengths of the light emitted can fall within the range of 360 nm to 405 um. In addition, the peak wavelengths of the light emitted by multiple light emitting elements 2622 can be slightly different, such as 365 nm, 370 nm, 395 nm, 397 um, 400 nm, etc.

In one embodiment, for multiple light emitting elements 2622, the difference in peak wavelength between the light emitting element 2622 with the highest peak wavelength and the light emitting element 2622 with the lowest peak wavelength is generally within 5 nm, specifically within the range of 3 nm (where the error value of the data endpoint in the data range does not exceed plus or minus 0.5 nm). It can be understood that the peak wavelength refers to the wavelength point at which the spectral radiation energy or intensity reaches its maximum value. In other words, it is the wavelength of the point with the highest light intensity on the spectral curve.

As shown in FIG. 43, in some embodiments, the peak wavelength range of multiple light emitting elements 2622 can be set according to actual needs, such as between 369 nm-372 nm for the first peak wavelength range, 395 nm-400 nm for the second peak wavelength range, 397 nm-400 nm for the third peak wavelength range, or 400 nm-403 nm for the fourth peak wavelength range (with an error value of no more than plus or minus 0.5 nm for each data endpoint), these peak wavelength settings can make the radiation energy of multiple light emitting elements 2622 more concentrated and have a good mosquito attraction effect.

Of course, in other embodiments, the multiple light emitting elements 2622 may also include multiple first light emitting elements 2622a and multiple second light emitting elements 2622b, which may be alternately arranged on the circuit board 2621. The peak wavelength range of the multiple first light emitting elements 2622a may be different from that of the multiple second light emitting elements 2622b, such as the peak wavelength range of the multiple first light emitting elements 2622a being between 369 nm and 372 nm, and the peak wavelength range of the multiple second light emitting elements 2622b being between 395 nm and 400 nm. Through the above settings, the mosquito lure lamp 26 can not only attract mosquitoes, but also moths, flies, and other insects, achieving better mosquito and fly killing effects.

Figure 44:
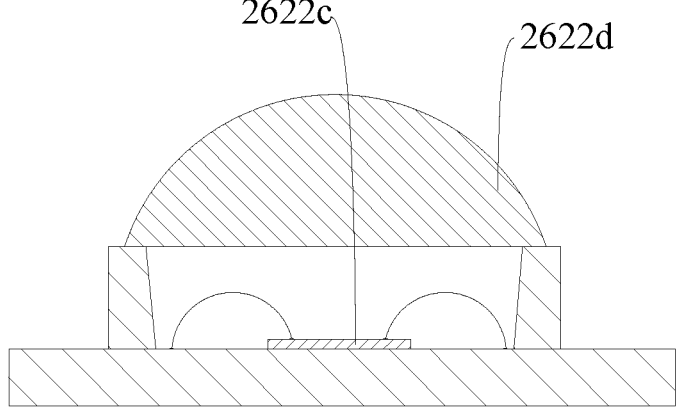
FIG. 44 is a cross sectional view of the light emitting elements of the mosquito trap lamp.
Figure 45:
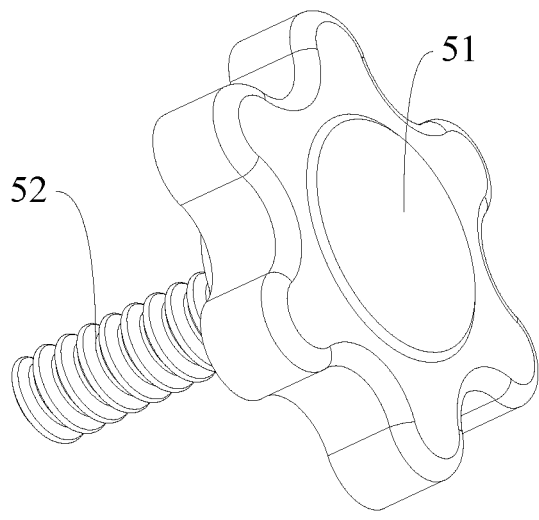
FIG. 45 is a first schematic view of the bolt of the solar mosquito killer according to a first embodiment of present application.
Figure 46:
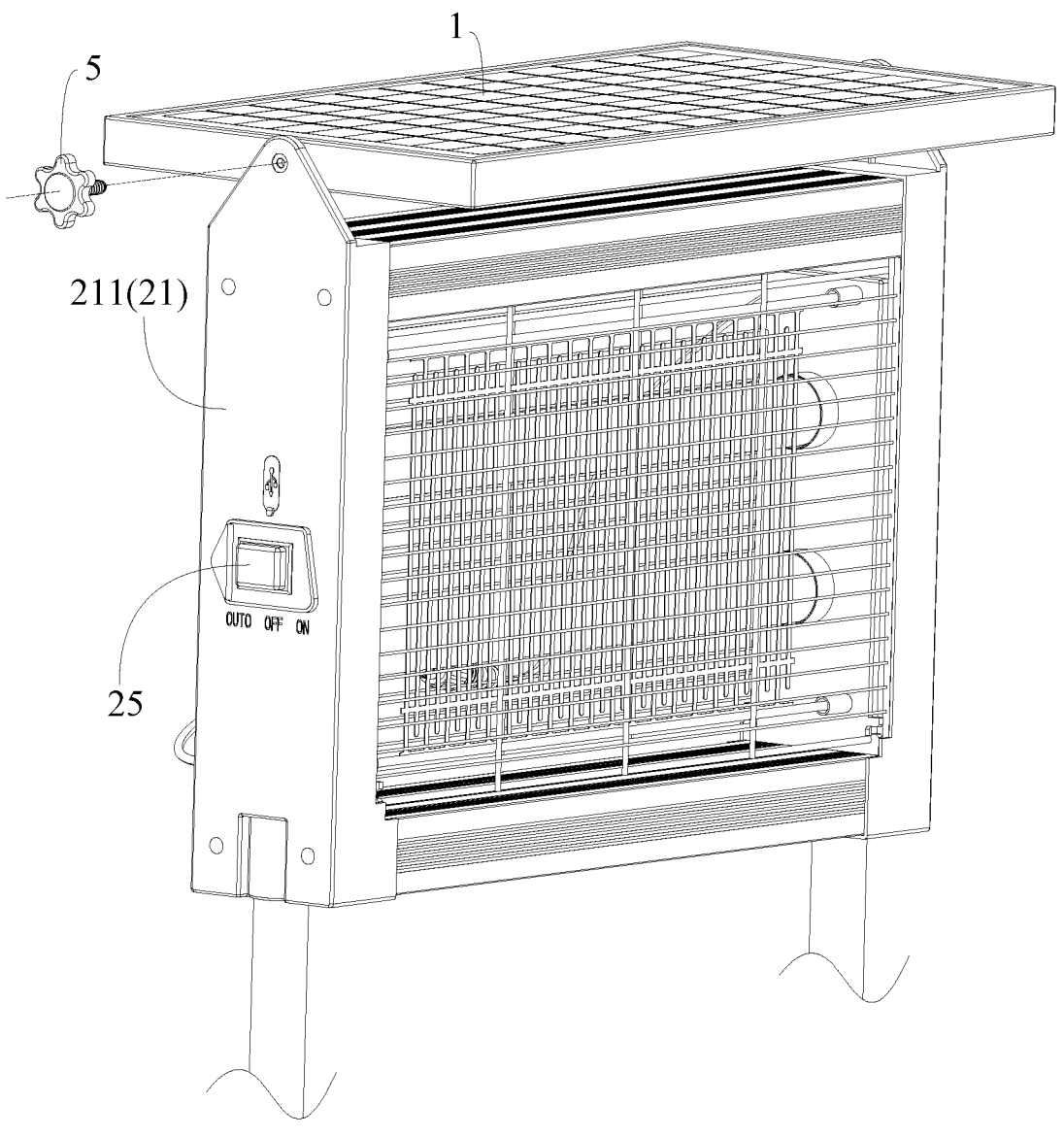
FIG. 46 shows the solar module is mounted to the frame component by the bolt of FIG. 45.
Figure 47:
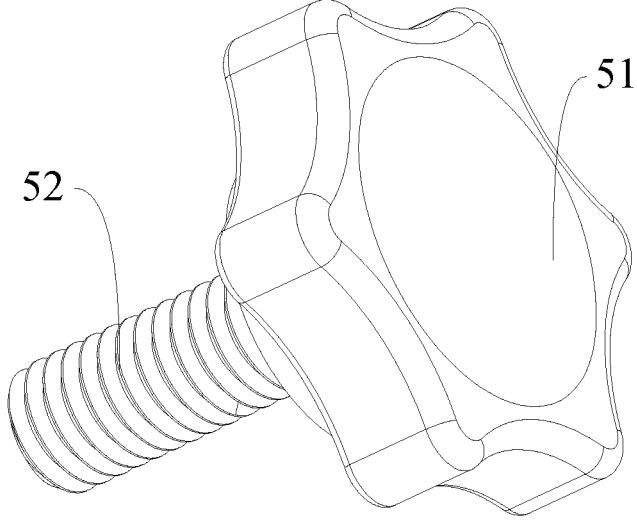
FIG. 47 is a second schematic view of the bolt of the solar mosquito killer according to a first embodiment of present application.
Figure 48:
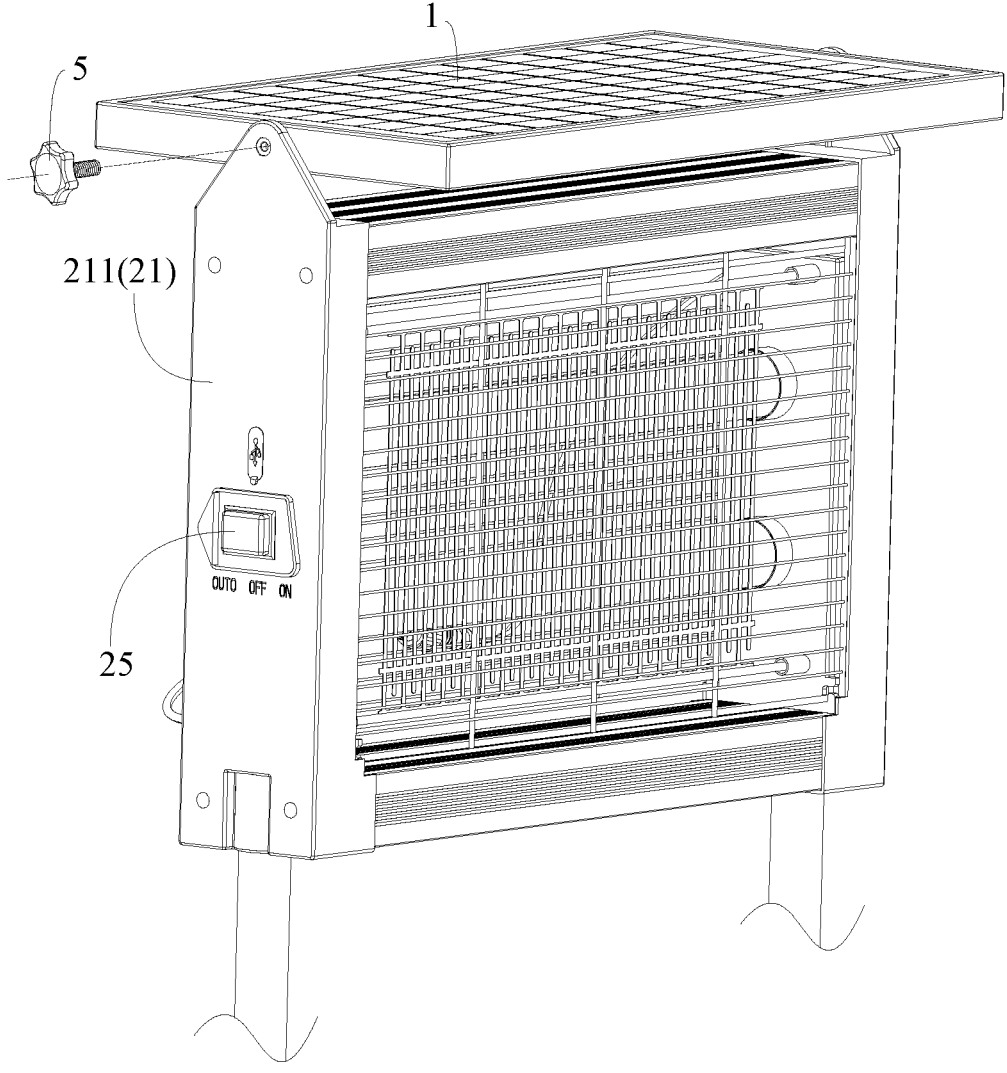
FIG. 48 shows the solar module is mounted to the frame component by the bolt of FIG. 47.
Figure 49:
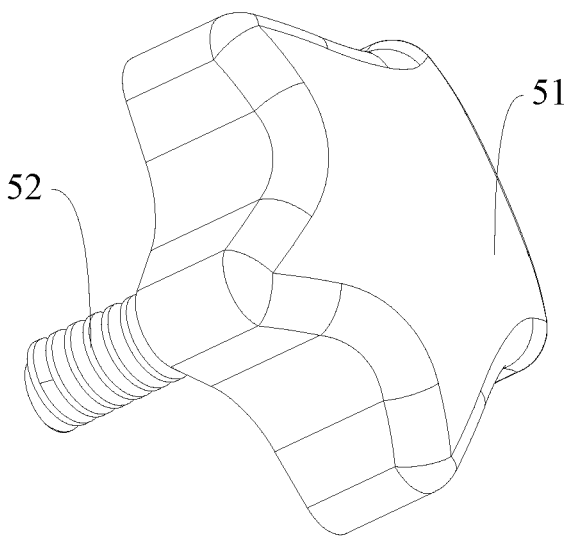
FIG. 49 is a third schematic view of the bolt of the solar mosquito killer according to a first embodiment of present application.
Figure 50:
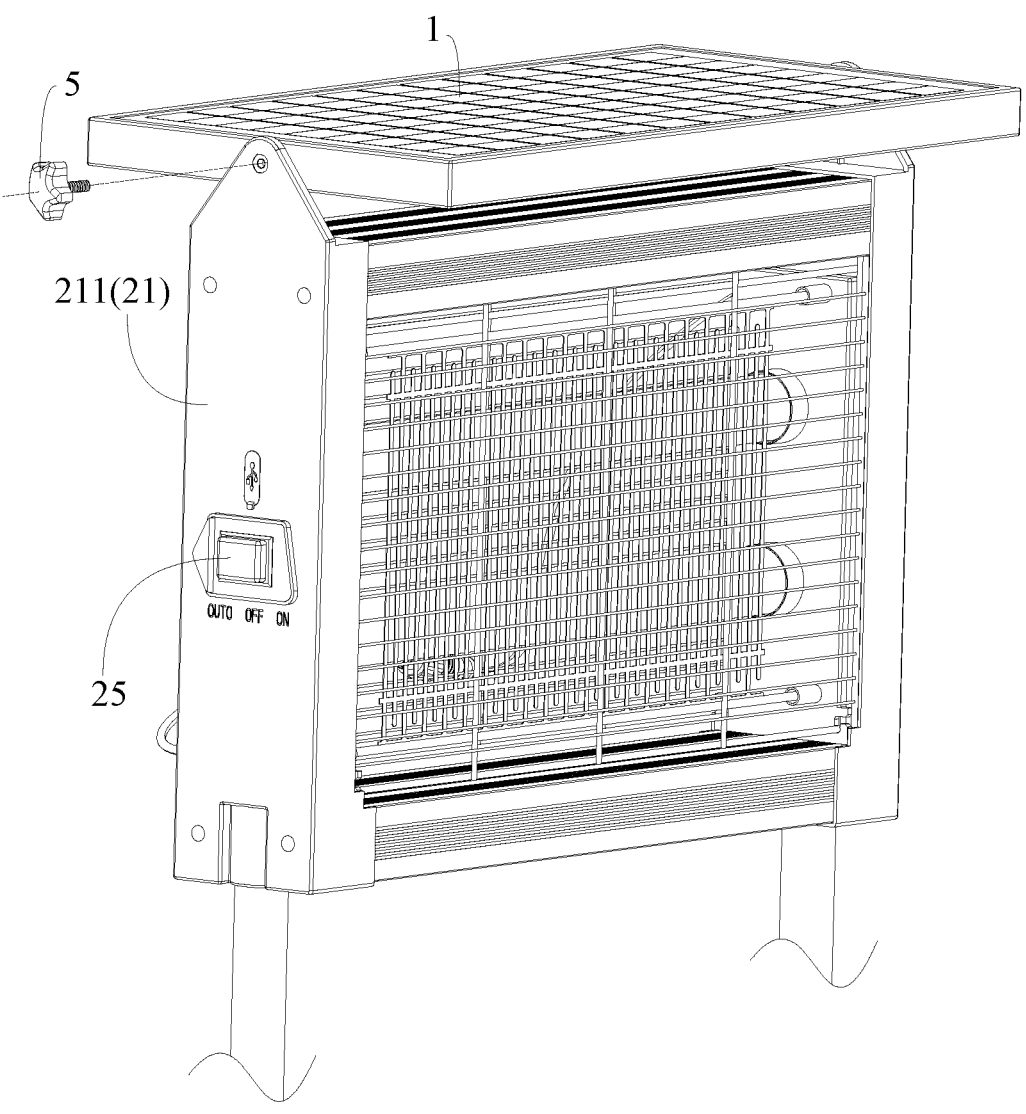
FIG. 50 shows the solar module is mounted to the frame component by the bolt of FIG. 49.
Figure 51:
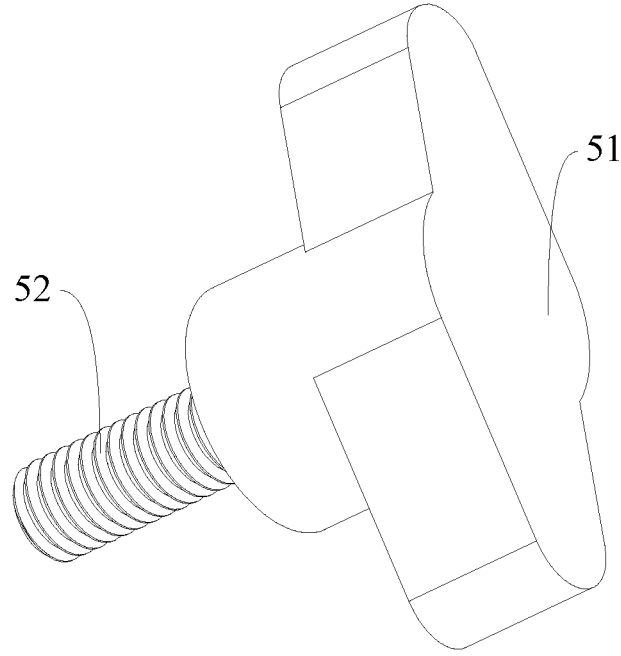
FIG. 51 is a fourth schematic view of the bolt of the solar mosquito killer according to a first embodiment of present application.
Figure 52:
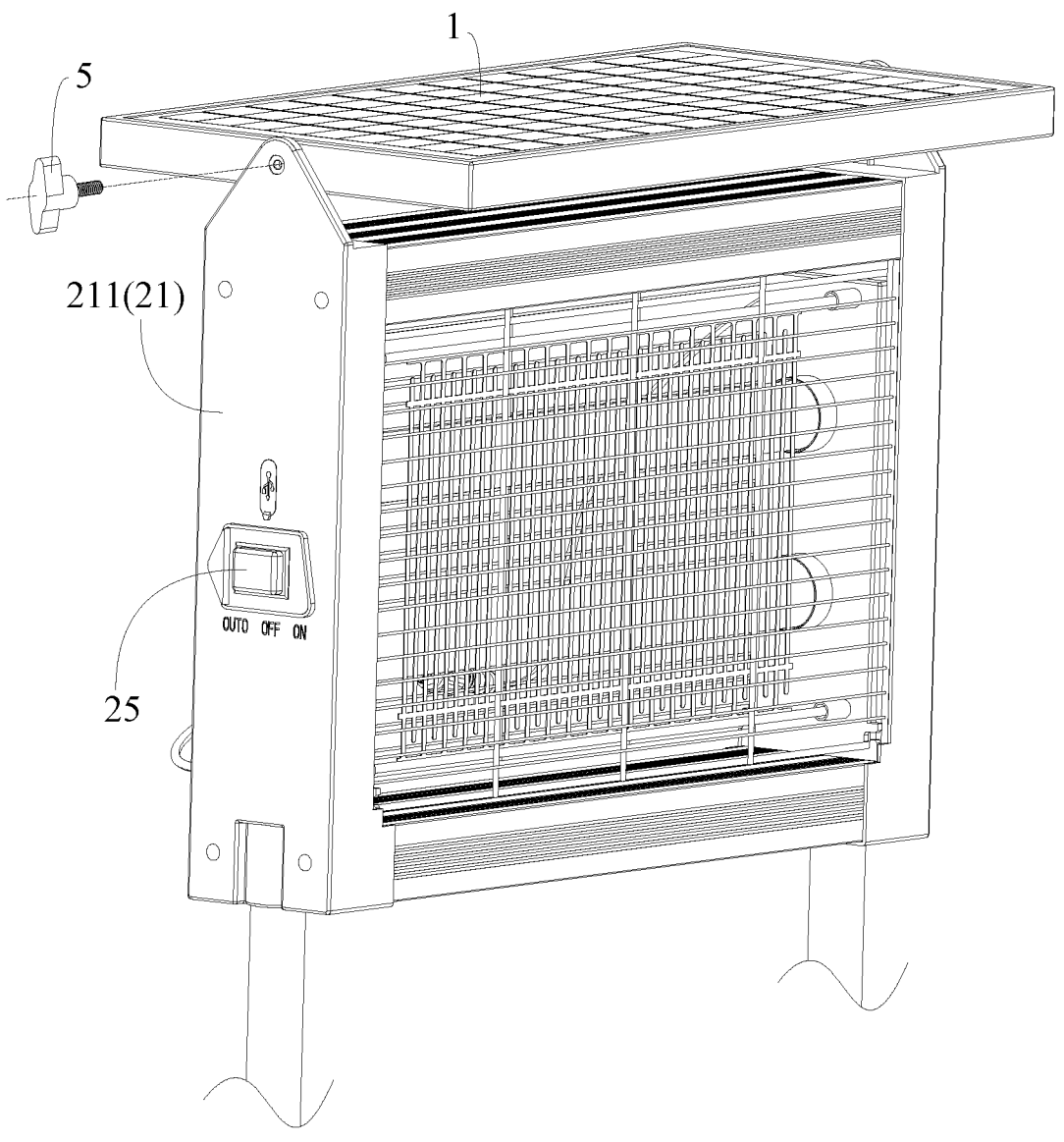
FIG. 52 shows the solar module is mounted to the frame component by the bolt of FIG. 51.
Figure 53:
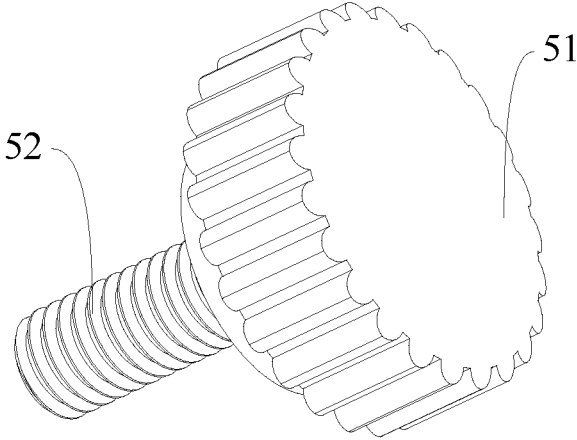
FIG. 53 is a fifth schematic view of the bolt of the solar mosquito killer according to a first embodiment of present application.
Figure 54:
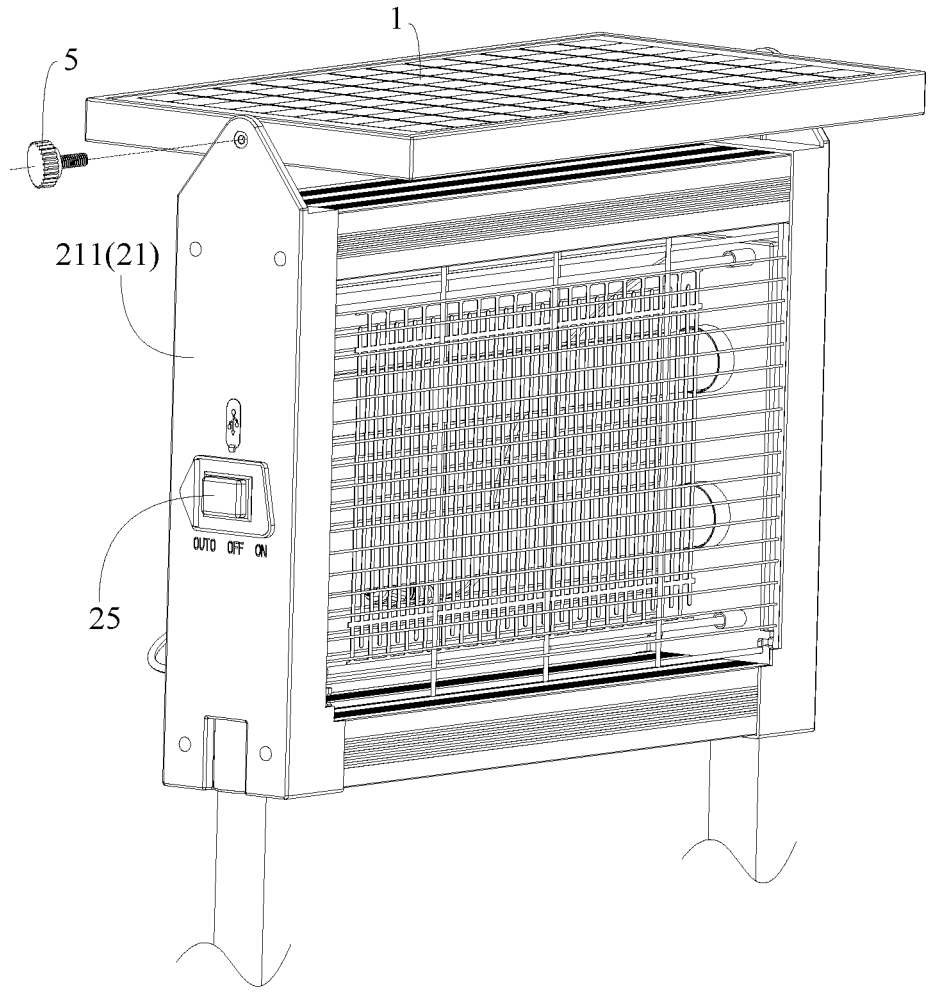
FIG. 54 shows the solar module is mounted to the frame component by the bolt of FIG. 53.
Figure 55:
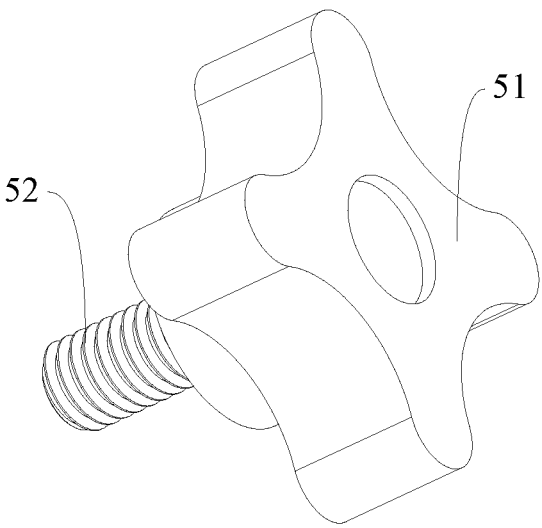
FIG. 55 is a sixth schematic view of the bolt of the solar mosquito killer according to a first embodiment of present application.
Figure 56:
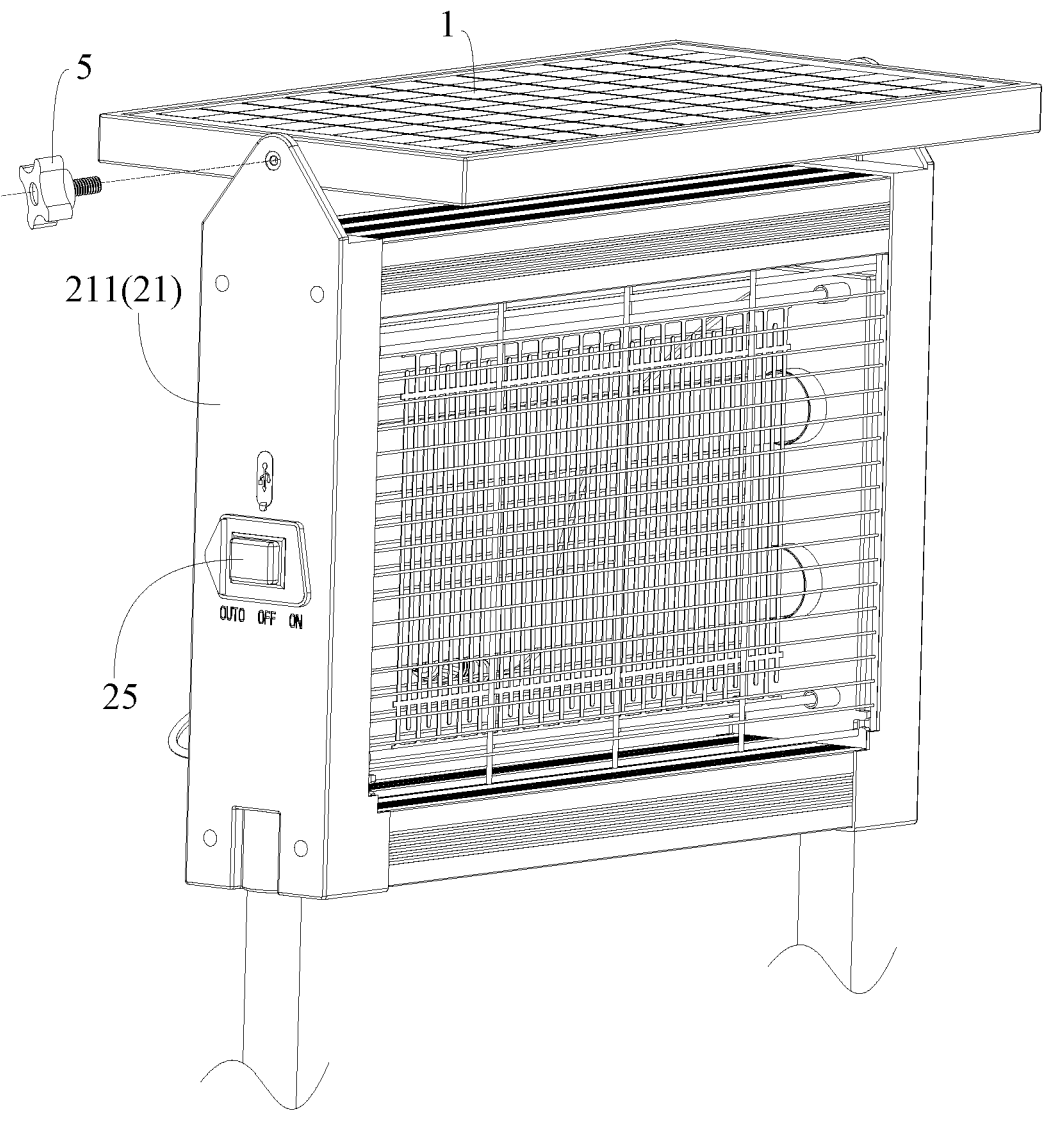
FIG. 56 shows the solar module is mounted to the frame component by the bolt of FIG. 55.

As shown in FIG. 44, in one embodiment, the light emitting element 2622 may further include a light emitting chip 2622c and a convex lens structure 2622d arranged above the light emitting chip 2622c. The convex lens structure 2622d is used to converge the light emitted by the light emitting chip 2622c, especially in conjunction with the light emitting element 2622 with a peak wavelength between 369 nm-372 nm, which can better converge the energy of low wavelength light and achieve better mosquito attraction effect.

In this embodiment, as shown in FIGS. 2, 3, and 37 to 40, the inner surfaces of the two mounting columns 211 are provided with first placement slots 2131 for placing two ends of the bottom beam 213 and second placement slots 2121 for placing two ends of the top beam 212. By setting a first placement slot 2131 at the bottom of the inner side of each of the two mounting columns 211, the two ends of the bottom beam 213 are respectively inserted into the first placement slots 2131 of the two mounting columns 211, and the bottom beam 213 is plugged into the first placement slots 2131 to achieve the installation between the bottom beam 213 and the two mounting columns 211, in this way, screws or other components are not required to fix the bottom beam 213, making assembly more convenient and efficient, and saving processes. By setting a second placement slot 2121 at the top of the inner side of each of the two mounting columns 211, the two ends of the top beam 212 are respectively inserted into the second placement slots 2121 of the two mounting columns 211, and the top beam 212 is plugged into the second placement slots 2121 to achieve the installation between the top beam 212 and the two mounting columns 211, in this way, screws or other components are not required to fix the top beam 212, making assembly more convenient and efficient, and saving processes.

In this embodiment, as shown in FIGS. 2 and 3, both mounting columns 211 are box bodies and each include a box body 201 and a cover 202, the cover 202 detachably covers the box body 201, and the control component 23 is located between the box body 201 and the cover 202. Among them, the cover 202 can be, but is not limited to, detachably connected to the box body 202 through at least one of screw connection, card connection, or plug-in connection. By designing both mounting columns 211 as detachable box bodies 201 and cover bodies 202, it facilitates later equipment maintenance personnel to inspect and repair control components 23 and other components installed inside the mounting column 211 by disassembling the cover 202.

In this embodiment, as shown in FIGS. 2 and 3, the extension direction of the top ends of the two mounting columns 211 is conical. The solar module 1 is installed on the mounting column 211 through bolt 5 and installed on the conical end 211a of the mounting column 211. The conical end 211a of the mounting column 211 is convenient for the installation of the solar module 1 and looks better externally. It is recommended to manually tighten bolt 5 for bolt 5, which is convenient for workers to install and for users to disassemble without tools. If the solar module 1 is not used indoors, it can be disassembled by rotating bolt 5, so that the solar mosquito killing device in this embodiment can be used in multiple scenarios.

It should be noted that bolt 5 includes a cap body 51 and a bolt body 52 fixedly connected to the cap body 51, the user can holds the cap body 51 and rotates it to drive the bolt body 52 to rotate, thereby achieving installation and removal between the solar module 1 and the tapered end 211a of the mounting column 211. As shown in FIGS. 45 to 56, the first embodiment of the present application illustrates several bolts 5 with different structures of the cap body 51, designers can choose at least one bolt 5 with a cap body 51 structure according to actual needs to lock and fix the solar module 1.

Figure 57:
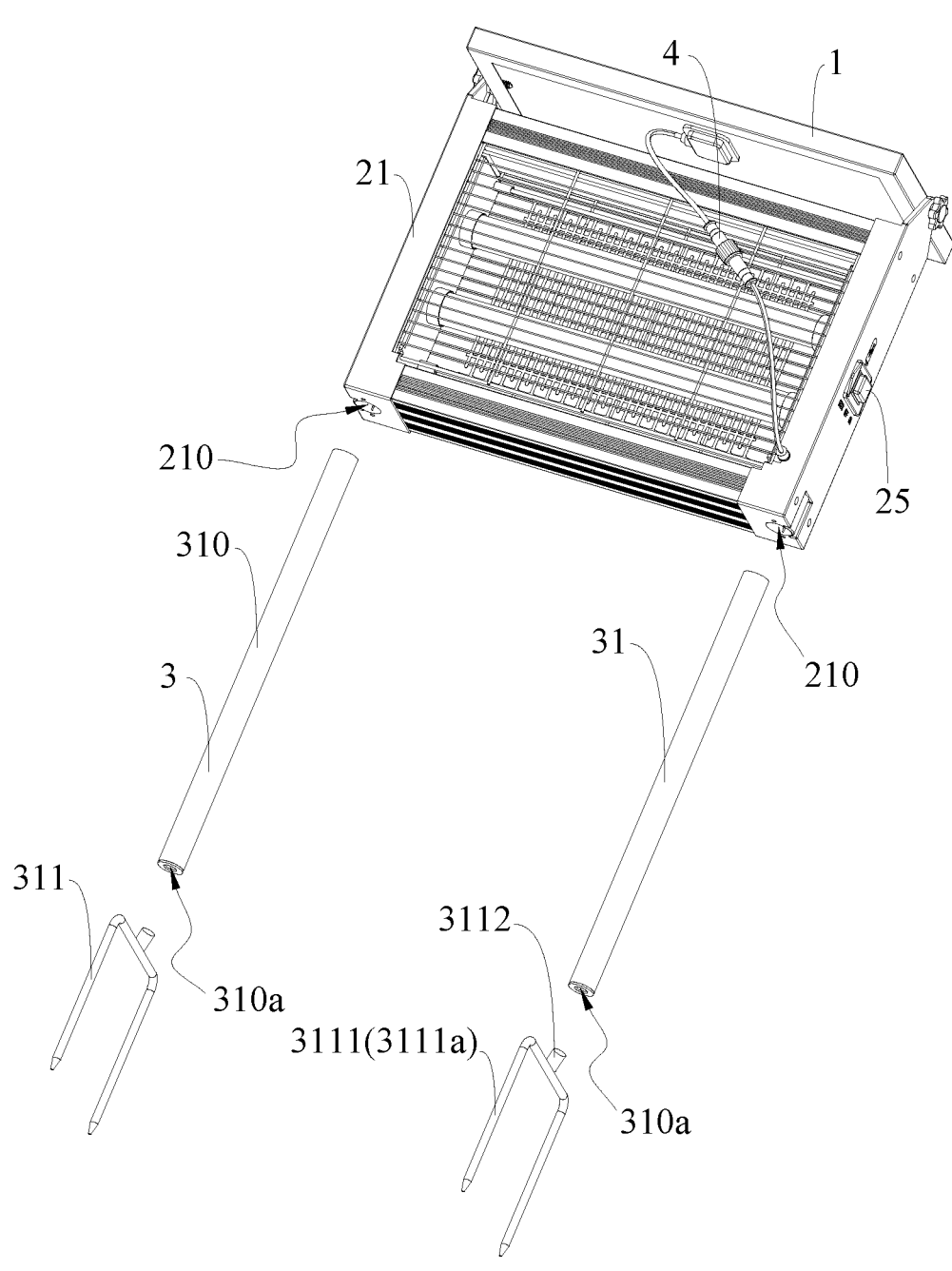
FIG. 57 is a partial exploded view of the solar mosquito killer according to a first embodiment of present application.

In this embodiment, as shown in FIG. 57, the bottom of the frame component 21 is provided with at least one mounting hole 210 for inserting one end of the supporting module 3, and the other end of the supporting module 3 is used to be set on an external carrier. Among them, external carriers can include but are not limited to soil or cement floors in outdoor environments. By designing at least one mounting hole 210 on the frame component 21 (specifically the bottom of the mounting column 211 introduced above) for inserting the supporting module 3, a detachable connection between the supporting module 3 and the frame component 21 can be achieved. When the solar mosquito killer is used in indoor environments, users can remove the supporting module 3 from the frame component 21 according to actual needs to reduce the overall space occupancy of the solar mosquito killer; when the solar mosquito killer is used in an outdoor environment, users can assemble the supporting module 3 onto the frame component 21 through the mounting hole 210 according to actual needs, so that the supporting module 3 can effectively support the mosquito killing module 2, thereby facilitating the fixation of the solar mosquito killer in outdoor environments.

In this embodiment, as shown in FIG. 57, the supporting module 3 includes multiple insert components 31 that can be stably inserted on the ground surface; the number of the at least one mounting hole 210 corresponds to the number of multiple insert components 31 (i.e., each mounting hole 210 is used for insertion with one insert component 31). Among them, the mounting hole 210 can be a threaded hole, and at this time, the insert component 31 (specifically the supporting column 310 described below) is connected to the threaded hole to achieve installation between the insert component 31 and the frame component 21. The mounting hole 210 can also be a card hole, at this time, the insert component 31 (specifically the supporting column 310 described below) is connected to the card hole to achieve the installation between the insert component 31 and the frame component 21.

Specifically, the insert component 31 includes a supporting column 310, a top insertion mounting hole 210 and a ground plug 311 set at the bottom of the supporting column 310; the ground plug 311 includes a grounding structure 3111 and a connecting column 3112 that extends into the opening 310a at the bottom of the supporting column 310. The connecting column 3112 is interference fit or threaded with the opening 310a at the bottom of the supporting column 310. Among them, the connecting column 3112 and the grounding structure 3111 can be detachable or non detachable connections; for example, when there is a detachable connection between the connecting column 3112 and the grounding structure 3111, the connecting column 3112 can be fixedly connected to the grounding structure 3111 through methods such as screwing, clamping, or plugging, but not limited to; for example, when the connecting column 3112 is non detachable from the grounding structure 3111, the connecting column 3112 can be fixedly connected to the grounding structure 3111 through but not limited to riveting or welding. When the connecting column 3112 is in interference fit with the opening 310*a* at the bottom of the supporting column 310, the opening 310*a* at the bottom of the supporting column 310 is a snap fit hole, at this time, the connecting column 3112 is a snap fit column, and the snap fit column is inserted into the snap fit hole at the bottom of the supporting column 310, the outer surface of the snap fit column is in interference fit with the wall surface of the snap fit hole, so that the ground plug 311 and the supporting column 310 are connected to each other through the snap fit column and the snap fit hole. When the connecting column 3112 is threaded with the opening 310*a* at the bottom of the supporting column 310, the opening 310*a* at the bottom of the supporting column 310 is a threaded hole, at this time, the connecting column 3112 is a threaded column, and the threaded column is connected to the threaded hole, so that the ground plug 311 and the supporting column 310 are connected to each other through the threaded fit between the threaded column and the threaded hole.

In this embodiment, as shown in FIG. 57, the grounding structure 3111 includes a U-shaped structure 3111*a*, by designing the grounding structure to include the U-shaped structure 3111*a* as shown in FIG. 57, it is easy to insert the grounding structure 3111 into the soil or cement ground in the outdoor environment, so that the supporting module 3 can effectively support the mosquito killing module 2, thereby facilitating the fixation of the solar mosquito killing device in the outdoor environment.

Figure 58:
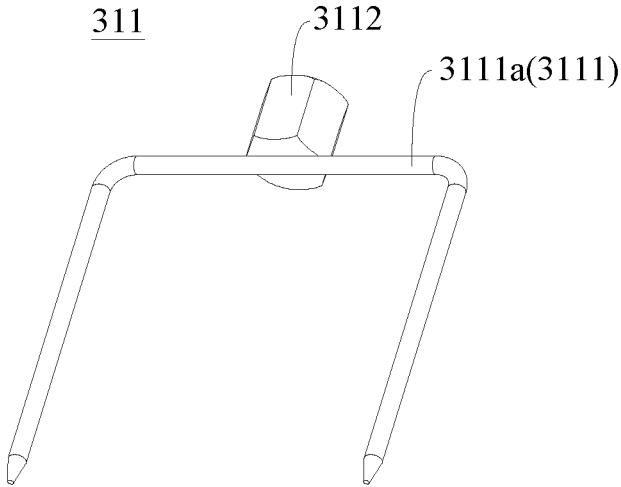
FIG. 58 is a first schematic view of grounding structure with the ground plug having U-shaped structure according to a first embodiment of present application.
Figure 59:
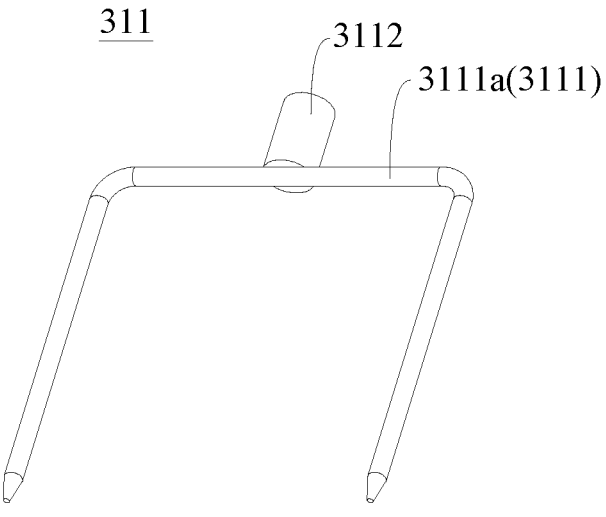
FIG. 59 is a second schematic view of grounding structure with the ground plug having U-shaped structure according to a first embodiment of present application.
Figure 60:
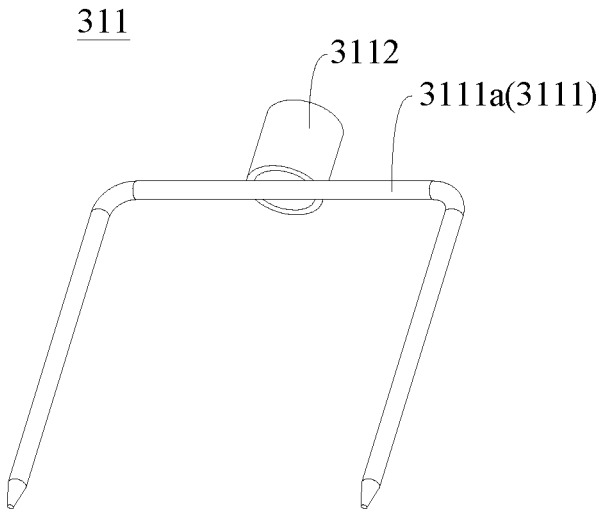
FIG. 60 is a third schematic view of grounding structure with the ground plug having U-shaped structure according to a first embodiment of present application.
Figure 61:
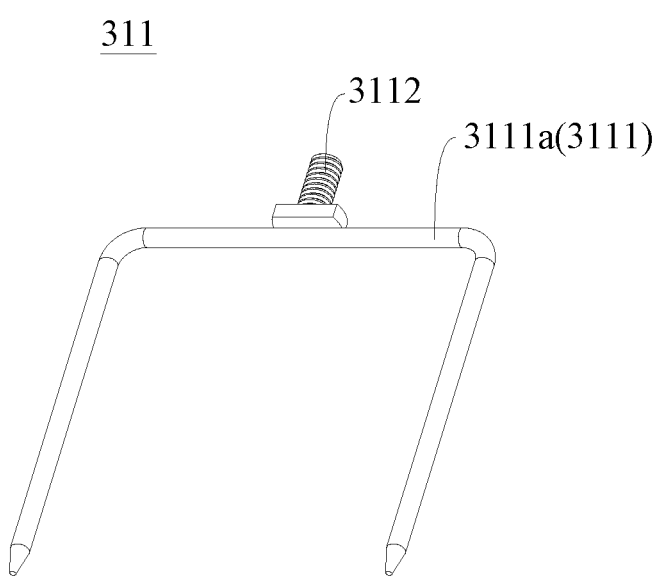
FIG. 61 is a fourth schematic view of grounding structure with the ground plug having U-shaped structure according to a first embodiment of present application.
Figure 62:
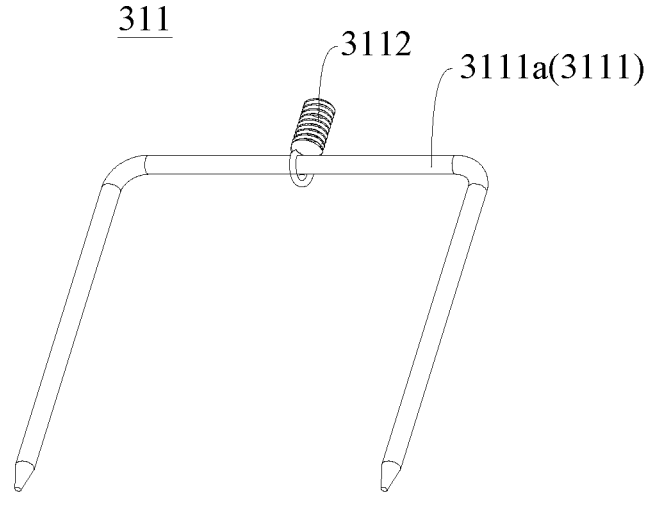
FIG. 62 is a fifth schematic view of grounding structure with the ground plug having U-shaped structure according to a first embodiment of present application.
Figure 63:
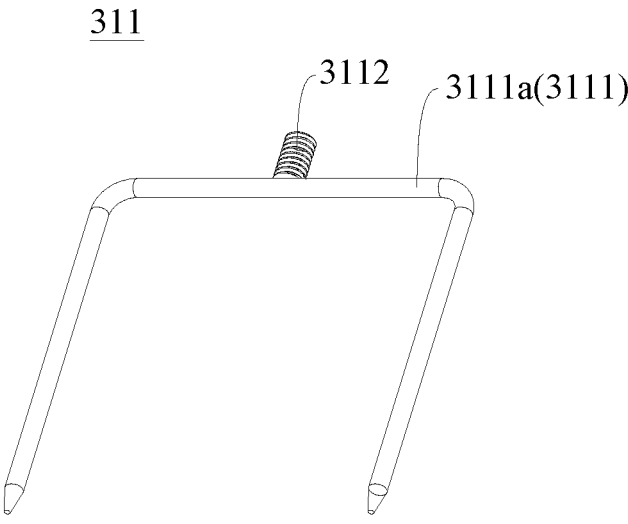
FIG. 63 is a sixth schematic view of grounding structure with the ground plug having U-shaped structure according to a first embodiment of present application.
Figure 64:
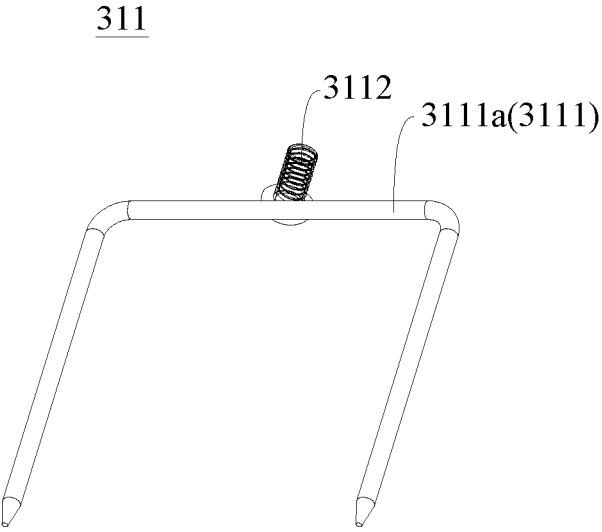
FIG. 64 is a seventh schematic view of grounding structure with the ground plug having U-shaped structure according to a first embodiment of present application.
Figure 65:
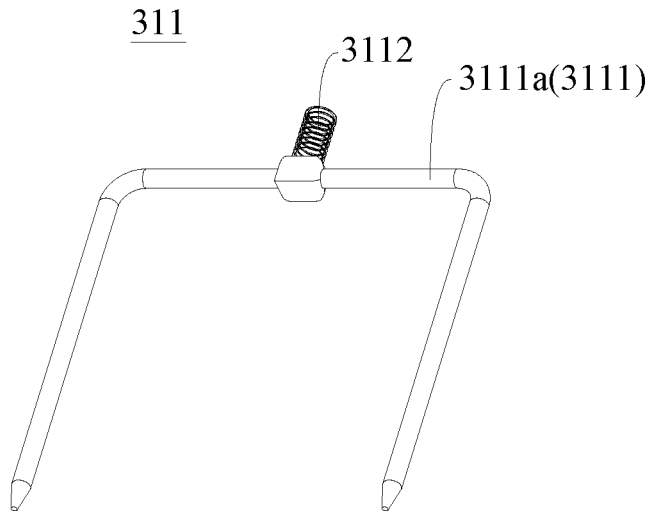
FIG. 65 is an eighth schematic view of grounding structure with the ground plug having U-shaped structure according to a first embodiment of present application.
Figure 66:
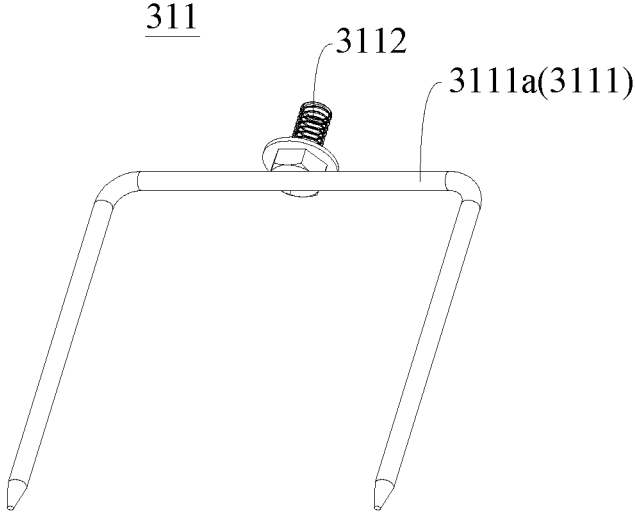
FIG. 66 is a ninth schematic view of grounding structure with the ground plug having U-shaped structure according to a first embodiment of present application.
Figure 67:
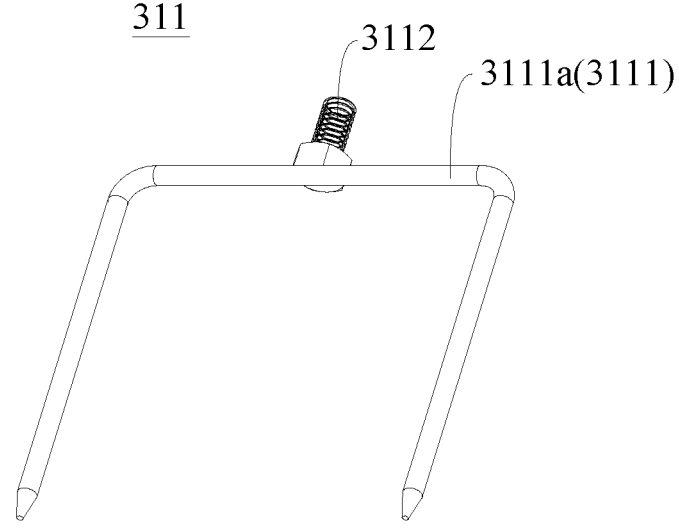
FIG. 67 is a tenth schematic view of grounding structure with the ground plug having U-shaped structure according to a first embodiment of present application.

It can be understood that when the grounding structure 3111 includes a U-shaped structure 3111*a*, the ground plug 311 can, but is not limited to, exist in several forms as shown in FIGS. 58 to 60, at this time, the bottom of the supporting column 310 is connected to the connecting column 3112 by interlocking, and the relative position between the ground plug 311 and the supporting column 310 is fixed through interference fit. Of course, when the grounding structure 3111 includes a U-shaped structure 3111*a*, the ground plug 311 can also, but is not limited to, exist in several forms as shown in FIGS. 61 to 67, at this time, the opening 310*a* at the bottom of the supporting column 310 is a threaded hole, the connecting column 3112 is a threaded column, and the threaded column is connected to the threaded hole. The ground plug 311 and the supporting column 310 are connected to each other through the threaded fit of the threaded column and the threaded hole.

Figure 68:
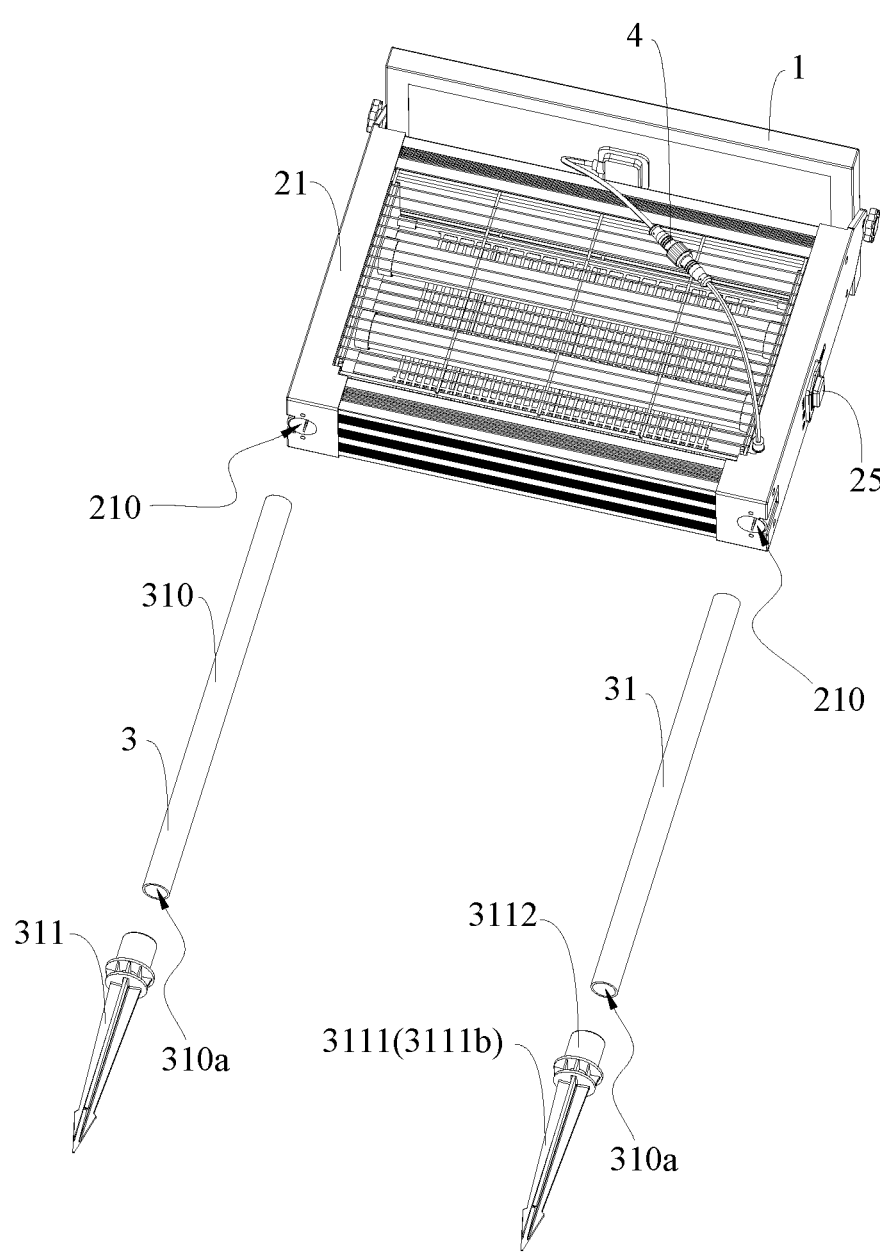
FIG. 68 is another exploded view of the of the solar mosquito killer according to a first embodiment of present application.

In this embodiment, as shown in FIG. 68, the grounding structure 3111 includes multiple grounding strips 3111*b* that are arranged in a periphery thereof, and each of the grounding strips 3111*b* has a reverse hook structure at a distal end thereof. By designing the grounding structure 3111 to include the grounding strips 3111*b* with a reverse hook structure as shown in FIG. 68, it is convenient for the grounding structure 3111 to be inserted into the soil or cement ground in the outdoor environment, so that the supporting module 3 can effectively support the mosquito killing module 2, thereby facilitating the fixation of the solar mosquito killing device in the outdoor environment.

Figure 69:
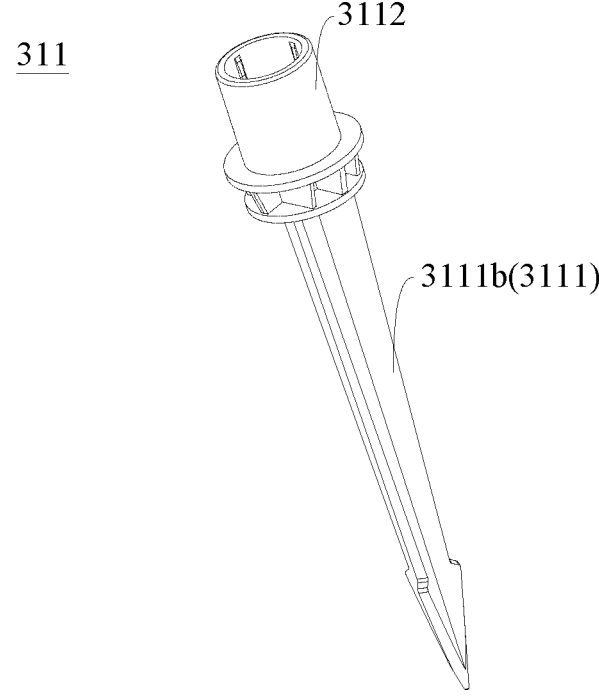
FIG. 69 is a first schematic view of grounding structure with the ground plug having grounding strip according to a first embodiment of present application.
Figure 70:
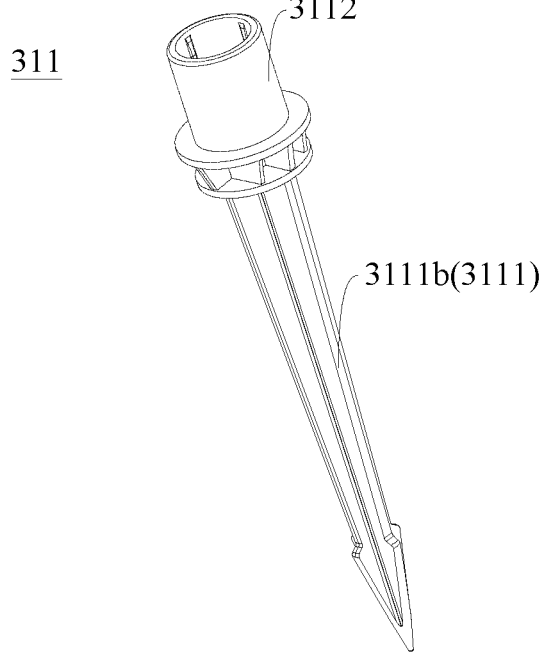
FIG. 70 is a second schematic view of grounding structure with the ground plug having grounding strip according to a first embodiment of present application.
Figure 71:
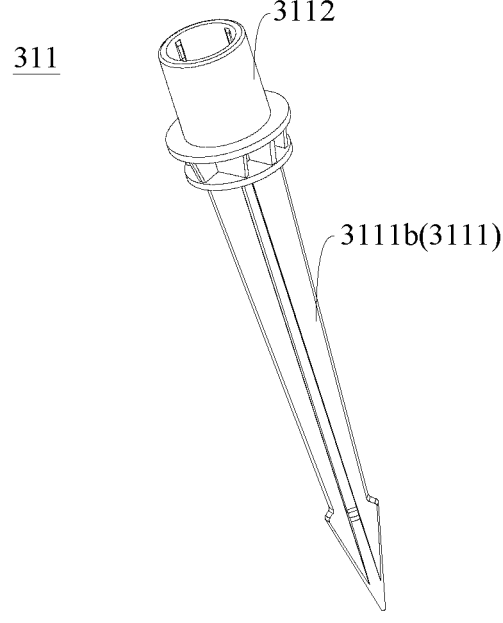
FIG. 71 is a third schematic view of grounding structure with the ground plug having grounding strip according to a first embodiment of present application.

It can be understood that when the grounding structure 3111 includes a grounding strip 3111*b*, the ground plug 311 can exist in several forms as shown in FIGS. 69 to 71, but not limited to. In FIG. 69, the number of grounding strip 3111*b* is three, and the three grounding strip 3111*b* are spaced 120 degrees apart; in FIG. 70, the number of grounding strip 3111*b* is four, and the four grounding strip 3111*b* are spaced 90 degrees apart; in FIG. 71, the number of grounding strip 3111*b* is five, and the five grounding strip 3111*b* are spaced 60 degrees apart.

It can be understood that more grounding strips 3111*b* can increase the stability of the fixation.

Furthermore, as shown in FIG. 4, the button 24 can have multiple gears, which correspond to different states of the mosquito killing module 2, specifically, the multiple gears can be AUTO, OFF, and ON, respectively corresponding to the automatic working state, normally closed state, and normally open state.

In the automatic working state, the mosquito killing module 2 can automatically enter the off mosquito killing state or on mosquito killing state according to the working state of the solar module 1. Specifically, during the day, when the solar module 1 receives light and converts it into electrical energy (i.e., the solar module 1 is in normal working state), the mosquito killing module 2 can obtain a detection signal to determine that the solar module 1 is in normal working state based on the detection signal, at this time, the mosquito killing module 2 enters the off mosquito killing state, that is, the mosquito killing module 2 does not turn on the mosquito trap lamp 26 and the electric grid 22, but can receive electrical energy to charge the internal battery 8. When it is evening or night, the solar module 1 cannot obtain enough light and enters an abnormal working state, at this time, the mosquito killing module 2 detects that the solar module 1 is in an abnormal working state based on the detection signal, and enters the on mosquito killing state, and at this time, the battery 8 supplies power to the mosquito trap lamp 26 and the electric grid 22, and the mosquito trap lamp 26 and the electric grid 22 are turned on to carry out mosquito killing.

Furthermore, as shown in FIG. 2, the mosquito control module 2 can also have a power supply interface component 29, which is electrically connected to the main circuit board 28 of the control component 23. The power supply interface component 29 can be placed above the button 24 and can be a USB interface, and the power supply interface component 29 can be exposed through another opening 292 on the housing component 21 to connect to an external power source. A protective cap 291 can also be detachably connected to the power supply interface component 29, which can have an identification pattern on it to display the type of power supply interface component, such as a USB type interface component, such as a Type-C interface component.

Figure 72:
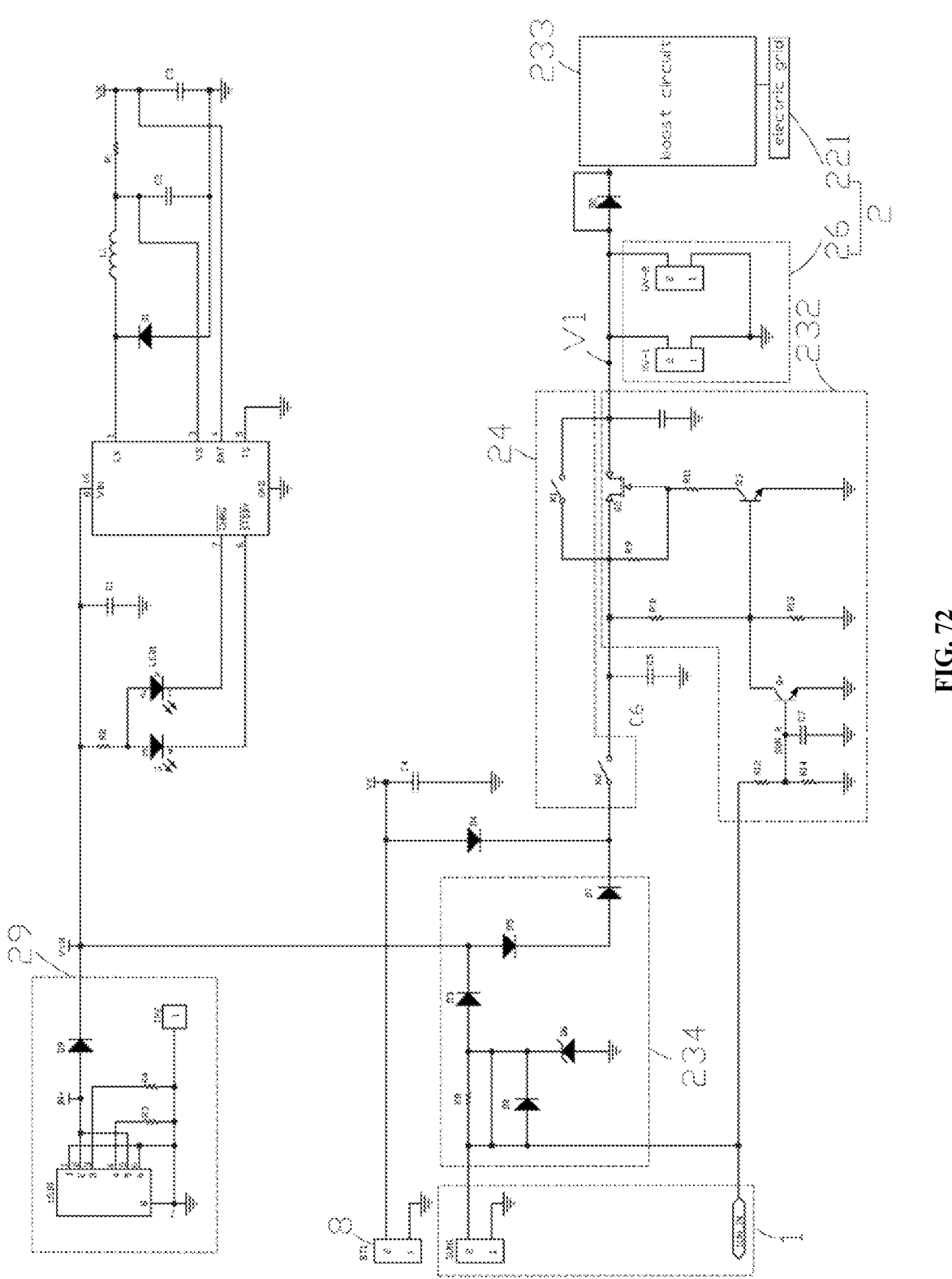
FIG. 72 shows electrical working principle of the solar mosquito killer according to a first embodiment of present application.

As shown in FIG. 72, the control component 23 of the mosquito killing module 2 may include a control chip U1, and a power supply terminal VIN of the control chip U1 is electrically connected to the power supply interface 29 and the solar module 1 through node VYH. The output terminal LX of the control chip U1 is electrically connected to the battery 8 through node VK, specifically, the control chip U1 obtains electrical energy from at least one of the power supply interface 29 and the solar module 1 to work and charge the battery 8.

In one embodiment, the output terminal LX of the control chip U1 can provide charging voltage to the battery 8, and at this time, the supply current of the battery 8 is preferably less than the predetermined value (such as 1A). In another embodiment, an output terminal LX of control chip U1 provides charging voltage to battery 8 through inductor L1, and the oscillation of inductor L1 can improve the charging and heating situation of control chip U1. In addition, the control chip U1 can also control the charging signal output by the output terminal LX based on the real-time voltage of the battery 8. For example, during an initial charging stage of the battery 8, if the voltage of the battery 8 is within a first voltage range (such as less than 2.5V), the control chip U1 can control the charging signal of the output terminal LX to charge the battery 8 at a first working current; if during the middle charging stage of battery 8, the voltage of battery 8 is within a second voltage range (such as greater than or equal to 2.5V and less than or equal to 4.1V), the control chip U1 can control the charging signal of output terminal LX to charge battery 8 at a second working current (such as greater than the first working current); if in the later charging stage of battery 8, the voltage of battery 8 is within a third voltage range (such as greater than 4.1V), the control chip U1 can control the charging signal of output terminal LX to charge battery 8 at a preset working voltage (such as 4.2V).

Figure 73:
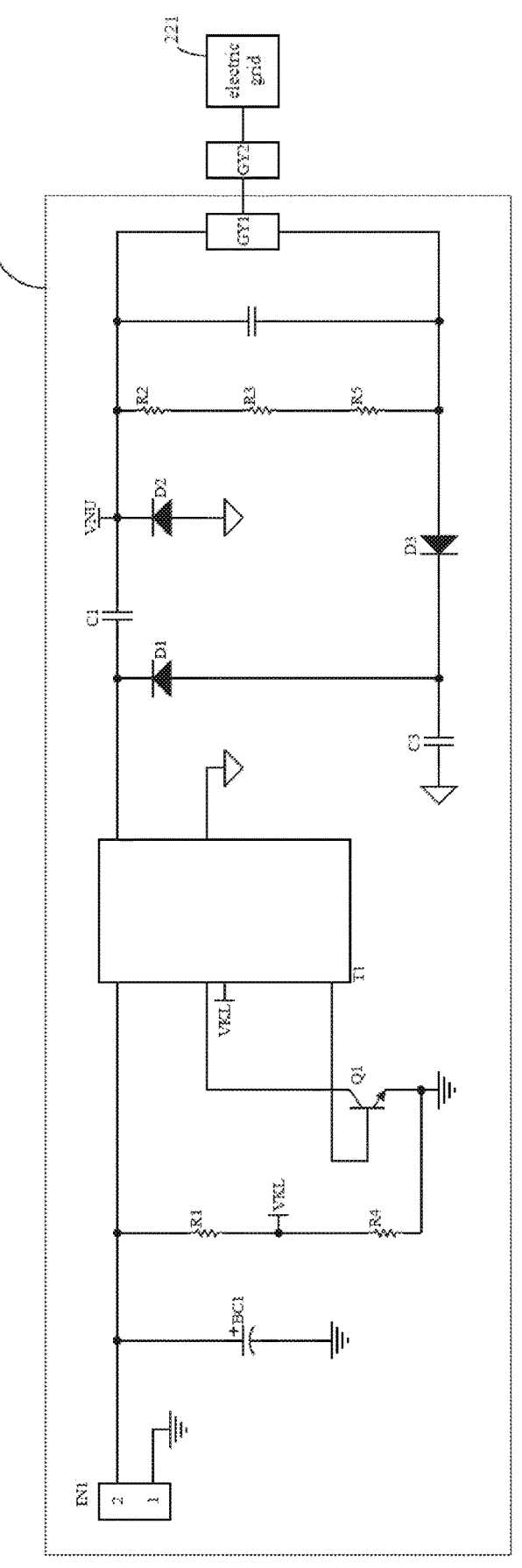
FIG. 73 shows a boost circuit of the solar mosquito killer according to a first embodiment of present application.
Figure 74:
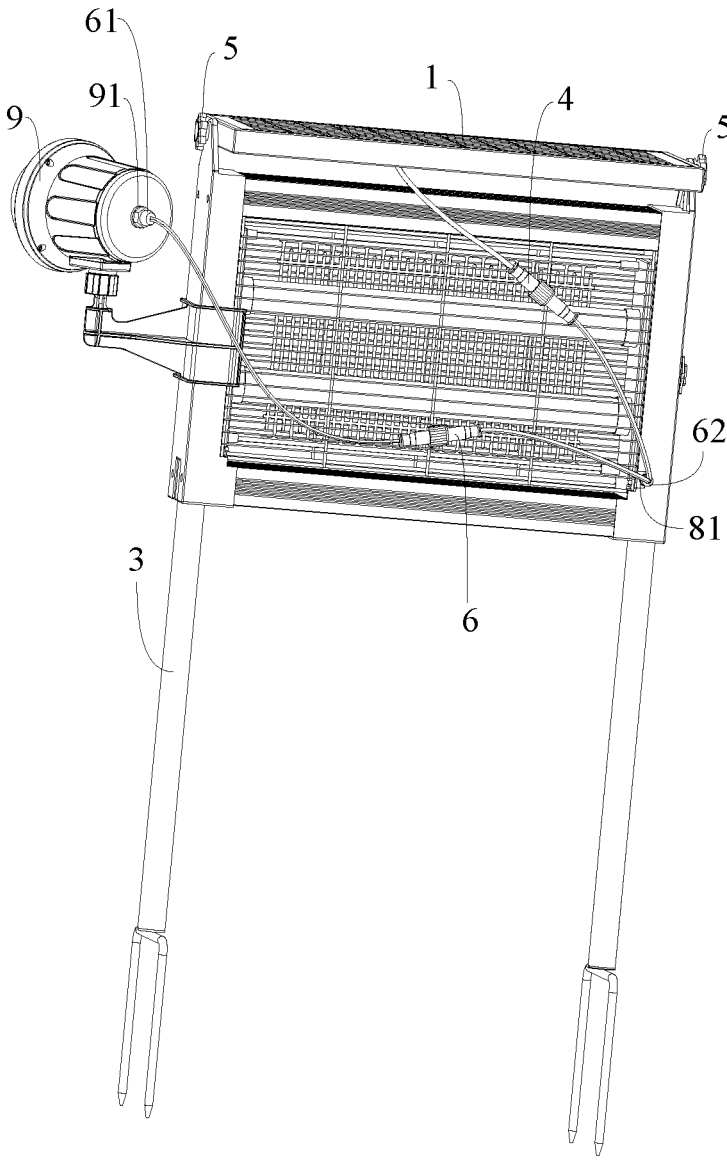
FIG. 74 is a first schematic view of the solar mosquito killer according to a second embodiment of present application.
Figure 75:
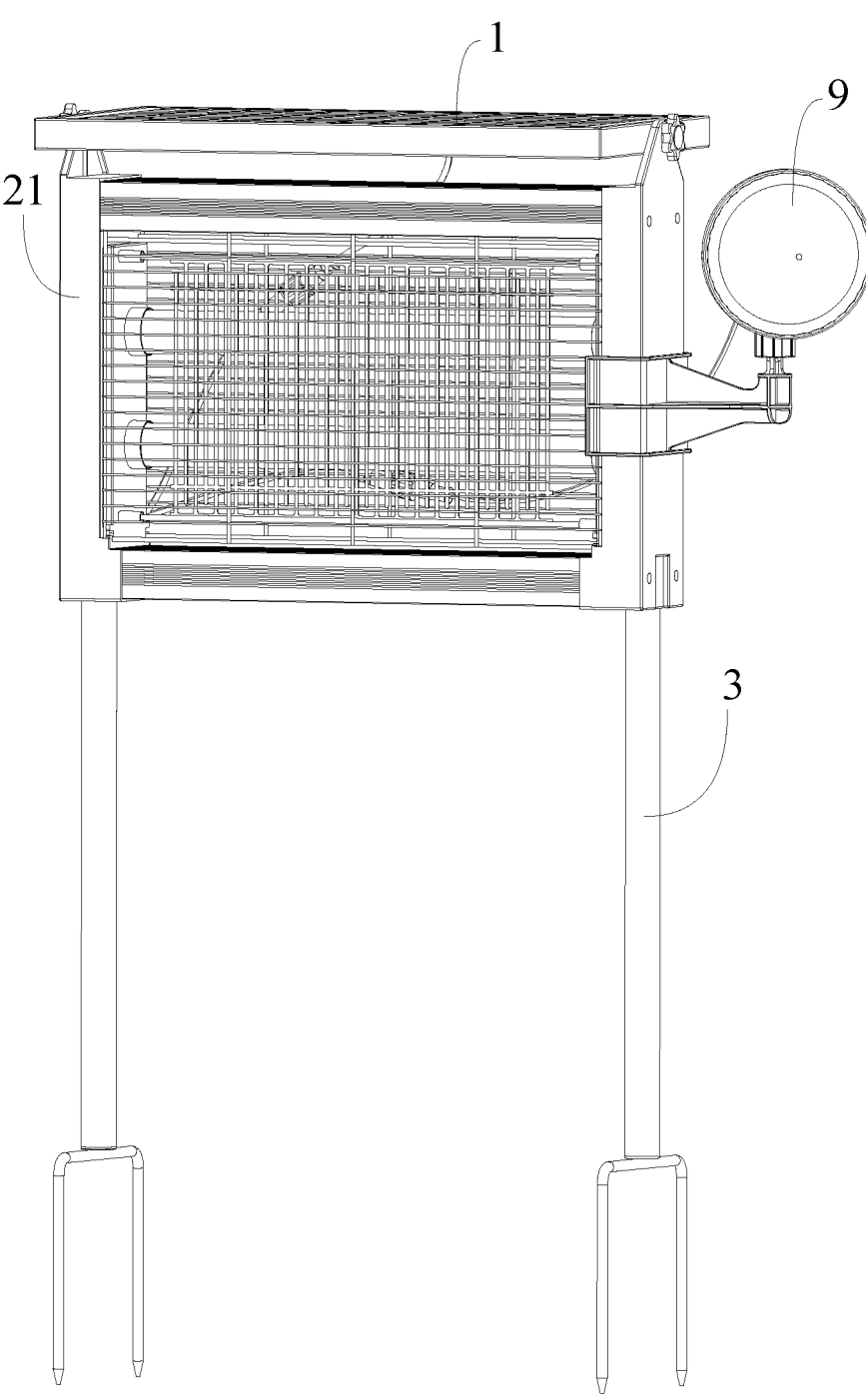
FIG. 75 shows another view of the solar mosquito killer of FIG. 74.
Figure 76:
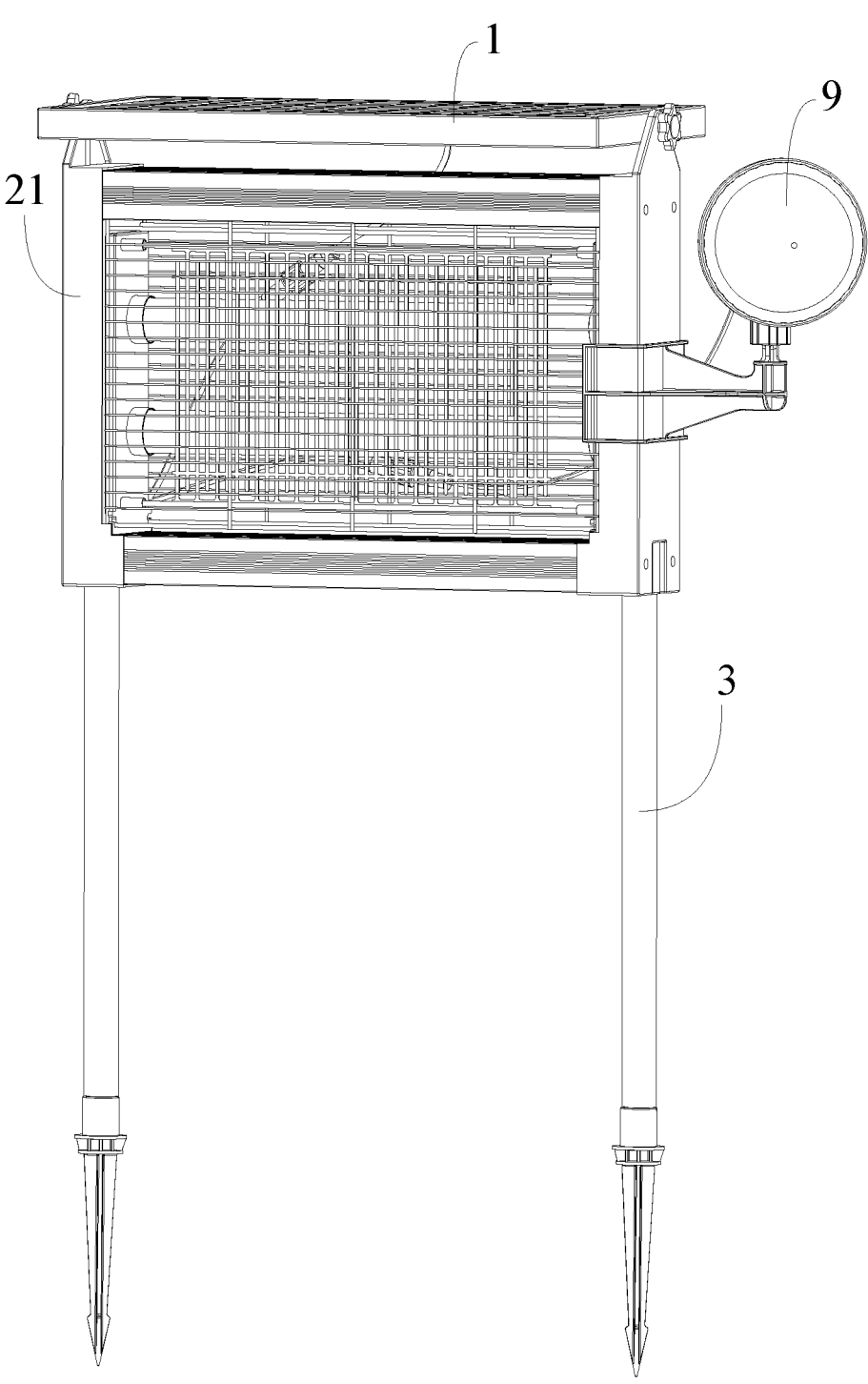
FIG. 76 is a second schematic view of the solar mosquito killer according to a second embodiment of present application.

As shown in the circuit schematic in FIG. 73, button 24 can include (or be equivalent to) a first switch K1 and a second switch K2, through the first switch K1 and the second switch K2, as well as the switch control circuit 232, it is possible to switch the mosquito killing module 1 between the automatic working state, the normally off state, and the normally on state (i.e., working state), and control the mosquito killing module 2 to automatically enter the turning off mosquito killing state or turning on mosquito killing state according to the working state of the solar module 1 during the automatic working state.

Specifically, the second switch K2 is connected between solar module 1 and switch Q2 (as well as battery 8 and switch Q2), and the first switch K1 is connected in parallel with switch Q2.

It can be understood that the switch control circuit 232 is electrically connected to the solar module 1, and is electrically connected between the battery 8 and the electric grid 22 and/or the mosquito trap lamp 26 of the mosquito killing module [[1]] 2. Under the control of the switch control circuit 232, the mosquito killing module 2 can automatically enter the turning off mosquito killing state or turning on mosquito killing state according to the working state of the solar module 1. Specifically, the switch control circuit 232 may include switch Q2, switch Q3, and switch Q4, and the two conducting terminals of the switch Q2 are respectively connected between button 24 and mosquito killing module 2. The control terminal of the switch Q2 is grounded through the two conducting terminals of the switch Q3, and the control terminal of the switch Q3 is grounded through the two conducting terminals of the switch Q4, and the control terminal of the switch Q4 is electrically connected to the solar module 1. The switch Q2 can be a field-effect transistor, while the switches Q3 and Q4 can be bipolar transistors.

In the normally off state, the second switch K2 is disconnected, the first switch K1 is disconnected, the solar module 1 and battery 8 cannot supply power to the mosquito killing module 2, and the mosquito killing module 2 is in the off state. In the normally on state, the second switch K2 is conductive, the first switch K1 is conductive, and at least one of the solar module 1 and the battery 8 supplies power to the mosquito killing module 2, which is in the on state.

In the automatic working state, the second switch K2 is turned on and the first switch K1 is turned off, the voltage of the output terminal SUN IN of the solar module 1 controls the switches Q4, Q3, and Q2, thereby further controlling the conduction and turning off the switch Q2. During the day, when the output terminal SUN IN of solar module 1 has sufficient voltage to control switch Q2 to be turned off through switches Q4 and Q3 (at this time, switch Q4 is conductive, switch Q3 is turned off, and switch Q2 is turned off), the solar module 1 supplies power to mosquito control module 2 through the first switch K1; in the evening or at night, the output terminal SUN IN of solar module 1 does not have enough voltage to control switch Q4 to be turned off, causing switch Q3 to conduct and switch Q2 to conduct, and the battery 8 supplies power to mosquito control module 2 through switch Q2.

In addition, the power supply voltage V1 output by solar module 1 or battery 8 can be a DC low voltage, such as a DC voltage between 3V-4.2V. An isolation circuit 234 can also be installed between solar module 1 and button 24, which can include multiple unidirectional conducting diodes (such as D3, D5, and D7). A unidirectional component D4 can also be set between battery 8 and button 24.

As shown in FIGS. 72 and 73, the control component 23 may further include a boost circuit 233, and the supply voltage V1 may be further provided to the input terminal IN of the boost circuit 233. The boost circuit 233 includes a boost device T1 (such as a winding) to boost the supply voltage V1, and outputs a driving voltage from the first output terminal VNU and the second output terminal VU1. The two ends of the first output terminal VNU and the second output terminal VU1 are respectively used to connect the positive component 221 and the negative component 222 of the electric grid 22. Specifically, the first output terminal VNU and the second output terminal VU1 can be connected to a first connector joint, and the positive component 221 and the negative component 222 of the electric grid 22 can be connected to a second connector joint, and the first connector joint and the second connector joint are plugged together to achieve electrical connection between the first output terminal VNU and the second output terminal VU1 and the electric grid 22.

Embodiment 2

Please refer to FIGS. 74 to 87, the second embodiment of the present application provides a solar mosquito killer, it should be noted that the solar mosquito killer in the second embodiment of the present application is structurally similar to the solar mosquito killer in the first embodiment of the present application (and can refer to the introduction in the first embodiment), and the following only focuses on the differences between the solar mosquito killer in the second embodiment and the solar mosquito killer in the first embodiment.

In this embodiment, as shown in FIGS. 74 to 87, the solar mosquito killer further includes an installation member 6 that connects the frame component 21. The installation member 6 is electrically connected to the control component 23 and has an electrical connection installation part 61, and the electrical connection installation part 61 is used to detachably connect the lighting lamp 9 of the solar mosquito killing device, so that the control component 23 supplies power to the lighting lamp 9.

It can be understood that the solar mosquito killer also includes a battery 8 electrically connected to the control component 23. The solar module 1 converts solar energy into electrical energy and stores excess electrical energy in the battery 8, and the battery 8 can be placed inside the frame module 21 or on the solar module 1.

When the battery 8 is set on the frame component 21, as shown in FIGS. 74 to 77, one end of the electrical connection component 4 is connected to the solar module 1, the other end of the electrical connection component 4 is connected to the first connector 81 of the battery 8, the electrical connection installation part 61 of the installation member 6 is connected to the second connector 91 of the lighting lamp 9, and the other electrical connection installation part 62 of the installation member 6 is connected to the first connector 81 of the battery 8. When the electrical connection installation part 61 of the installation member 6 is removed from the second connector 91 of the lighting lamp 9 and/or the other electrical connection installation part 62 of the installation member 6 is removed from the first connector 81 of the battery 8, the power circuit between the battery 8 and the lighting lamp 9 is disconnected, and the control component 23 cannot control the battery 8 to supply power to the lighting lamp 9. When the electrical connection installation part 61 of the installation member 6 is installed on the second connector 91 of the lighting lamp 9, and the other electrical connection installation part 62 of the installation member 6 is installed on the first connector 81 of the battery 8, the electrical circuit between the battery 8 and the lighting lamp 9 is conductive, and the control component 23 can control the battery 8 to supply power to the lighting lamp 9.

Figure 77:
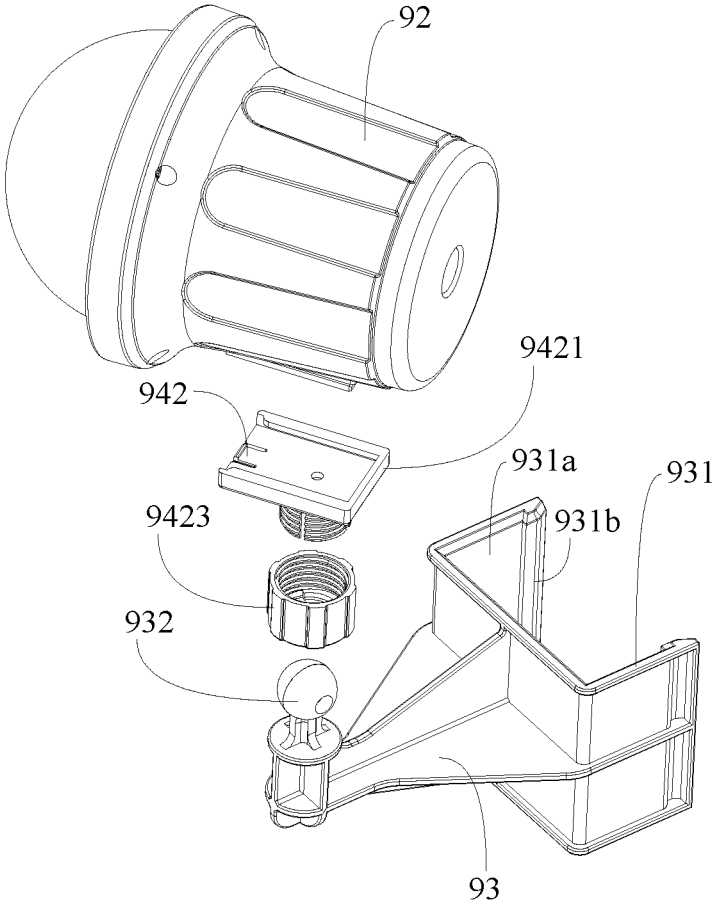
FIG. 77 shows a first exploded view of the solar mosquito killer of FIG. 74.
Figure 78:
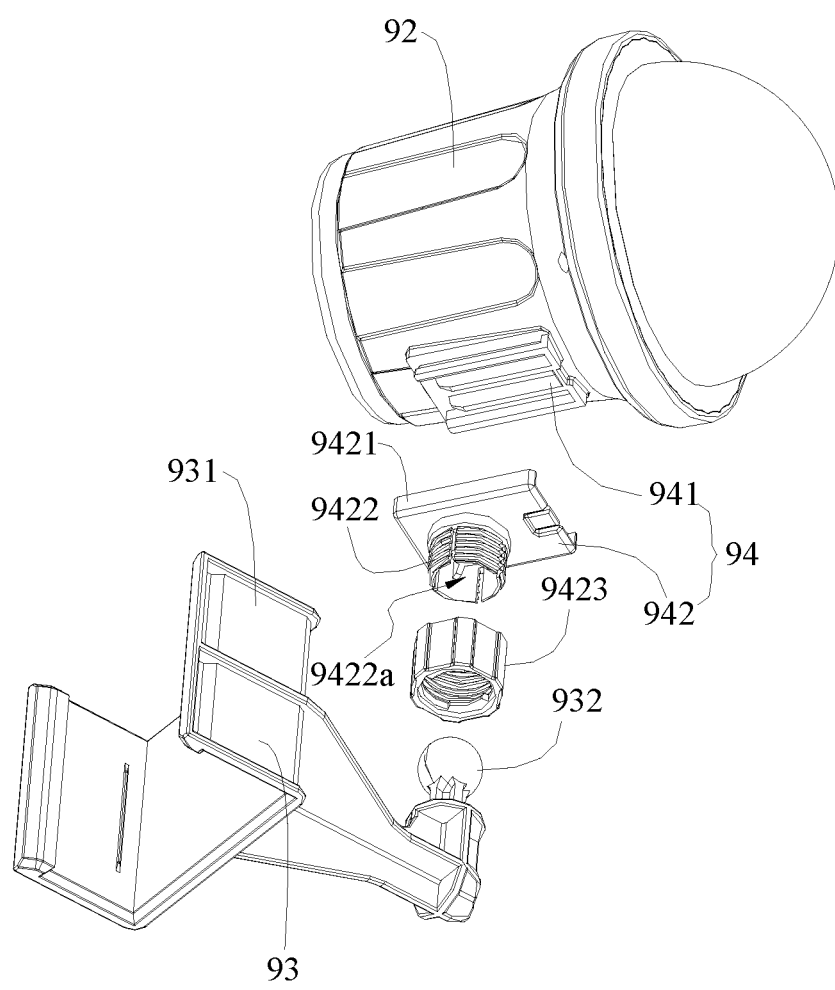
FIG. 78 shows a second exploded view of the solar mosquito killer of FIG. 74.

In this embodiment, as shown in FIGS. 77 and 78, the lighting lamp 9 includes a lamp body 92, a bracket 93, and a connecting structure 94. The lamp body 92 is connected to the bracket 93 through the connecting structure 94, and the bracket 93 is connected to the frame component 21 (specifically the mounting column 211 mentioned above). The bracket 93 includes a frame body 931 and a connecting ball head 932, one end of the frame body 931 is in a U-shaped structure for clamping and connecting with the mounting column 211 of the frame component 21, and the other end of the frame body 931 is fixedly connected with the connecting ball head 932. The frame 931 has a groove 931a, and the mounting column 211 of the frame component 21 can slide and connect with the groove 931a. When the bolt 5 separates the solar module 1 from the frame component 21, the mounting column 211 of the frame component 21 can also slide and assemble or detach from the frame 931. Both free ends of the frame 931 are provided with limiting protrusions 931b, which are used to contact a side of the mounting column 211 near the protective net 214.

The connecting structure 94 includes a first connecting seat 941 and a second connecting seat 942; the first connecting seat 941 is fixedly connected to the bottom of the lamp body 92; the second connecting seat 942 includes a seat body 9421, a connecting wall 9422, and a locking sleeve 9423. The seat body 9421 is fixedly connected to the first connecting seat 941 through a clamping method, and the seat body 9421 can be disassembled from the first connecting seat 941. There are multiple (two or more) connecting walls 9422, which are arranged in a cantilever shape and fixedly connected to the seat body 9421. The multiple connecting walls 9422 together enclose a cavity 9422a for inserting the connecting ball head 932, the outer surfaces of the multiple connecting walls 9422 are provided with external threads; the locking sleeve 9423 is set on the periphery of multiple connecting walls 9422, and the inner surface of the locking sleeve 9423 is provided with internal threads. By rotating the locking sleeve 9423, the locking sleeve 9423 is connected to the threads of multiple connecting walls 9422, the multiple connecting walls 9422 deform and converge inward to clamp the connecting ball head 932, thus achieving the installation between the lamp body 92 and the bracket 93.

Figure 79:
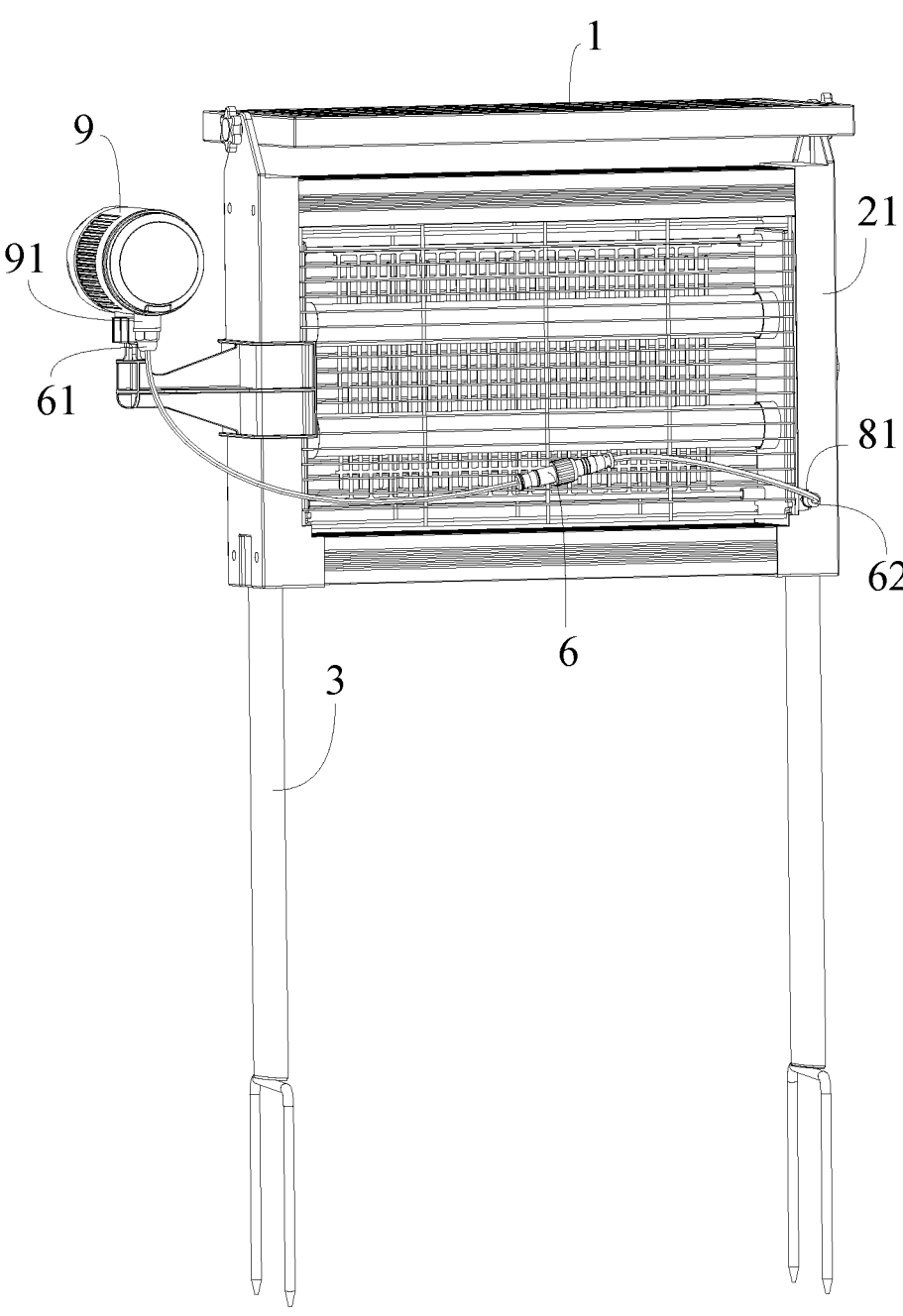
FIG. 79 is a third schematic view of the solar mosquito killer according to a second embodiment of present application.
Figure 80:
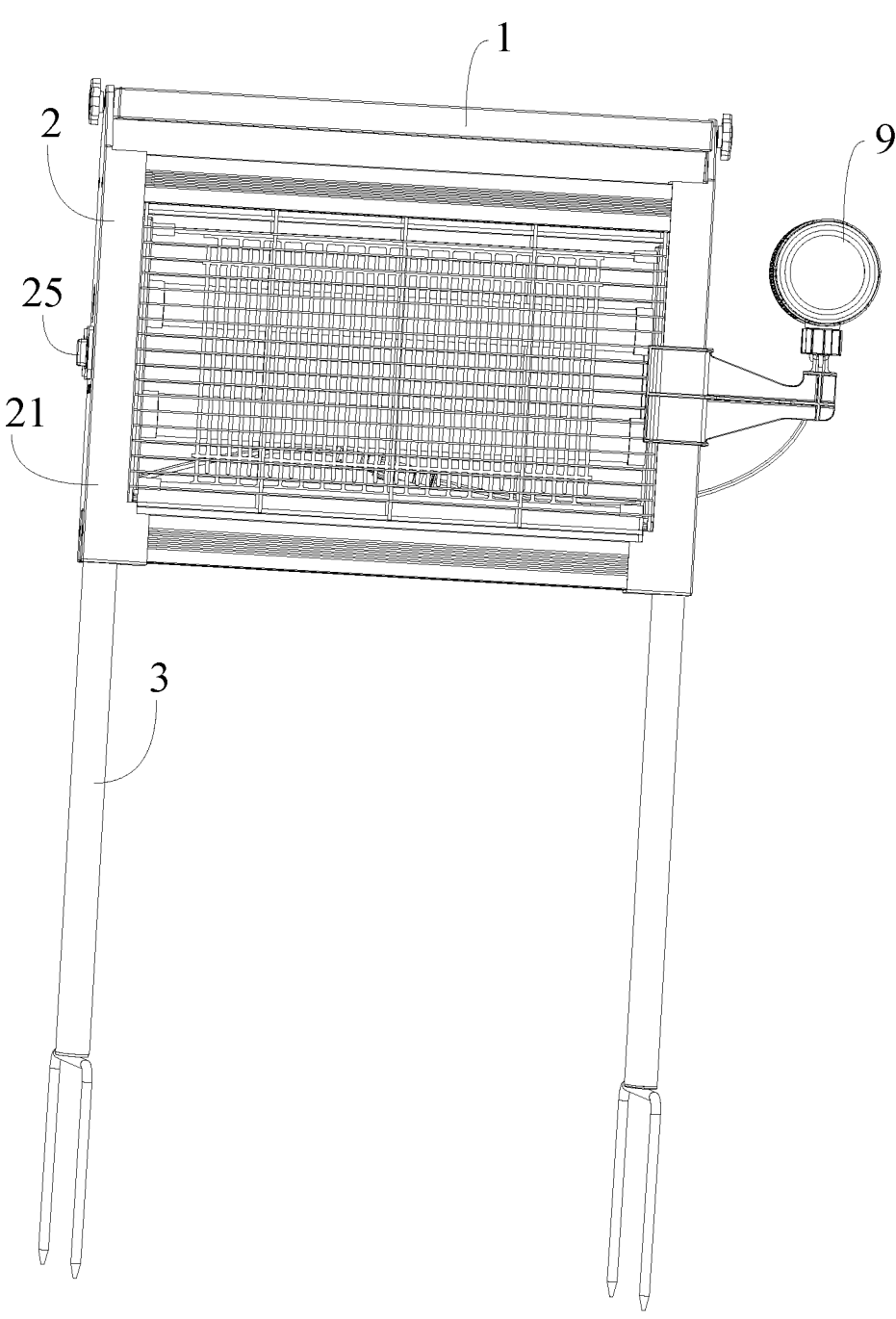
FIG. 80 shows another view of the solar mosquito killer of FIG. 79.
Figure 81:
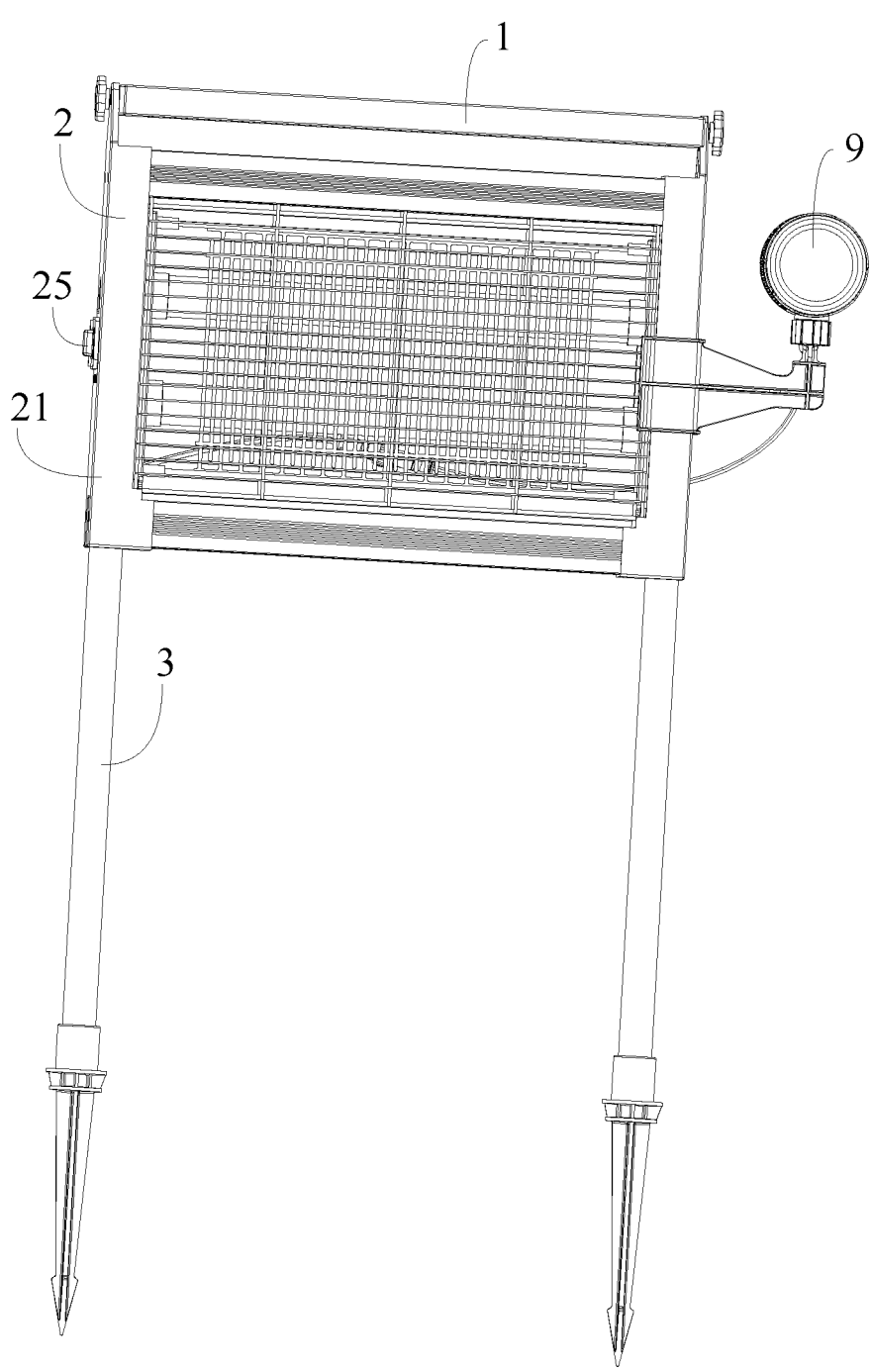
FIG. 81 is a fourth schematic view of the solar mosquito killer according to a second embodiment of present application.

As shown in FIGS. 79 to 81, other different structural lighting fixtures 9 are shown, and the electrical connection components 4 mentioned above are not illustrated in the figures.

Figure 82:
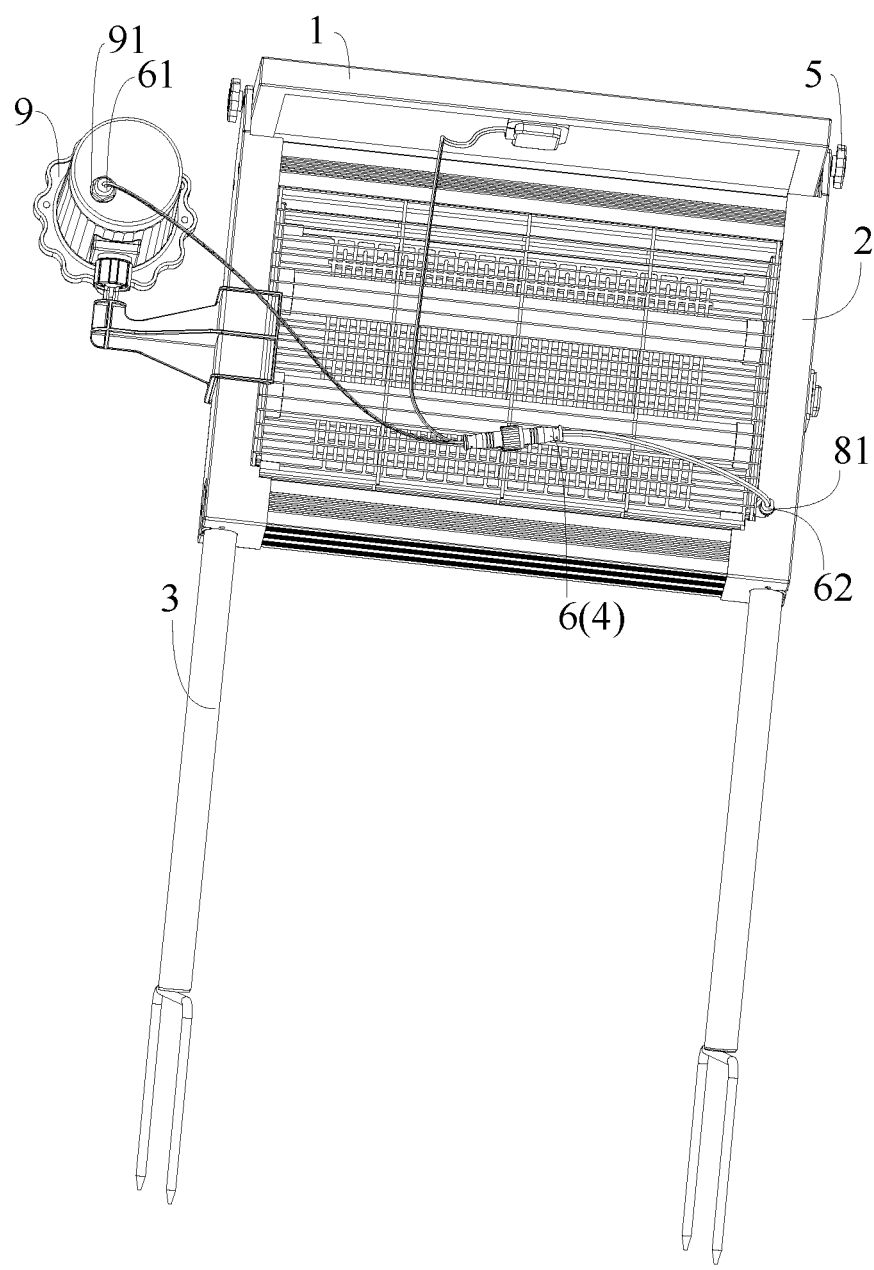
FIG. 82 is a fifth schematic view of the solar mosquito killer according to a second embodiment of present application.
Figure 83:
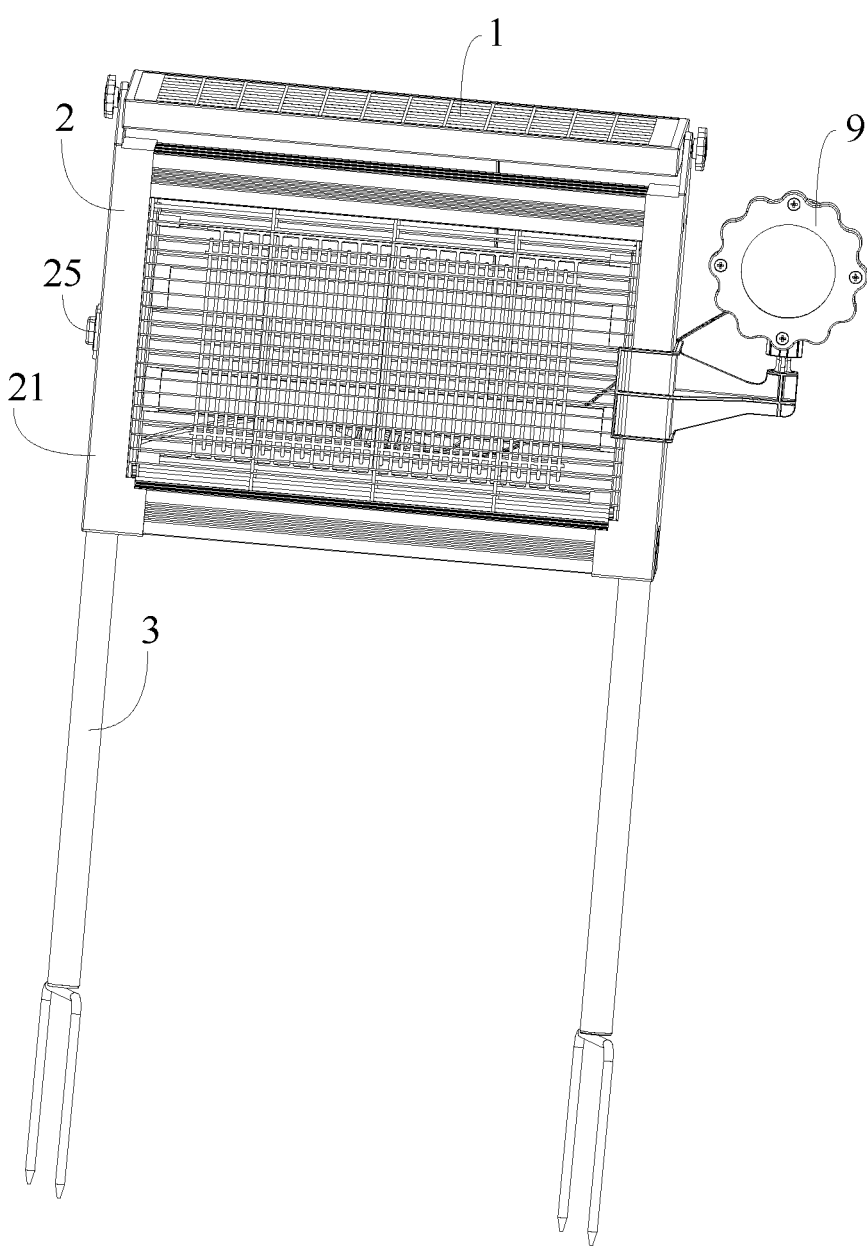
FIG. 83 shows another view of the solar mosquito killer of FIG. 82.
Figure 84:
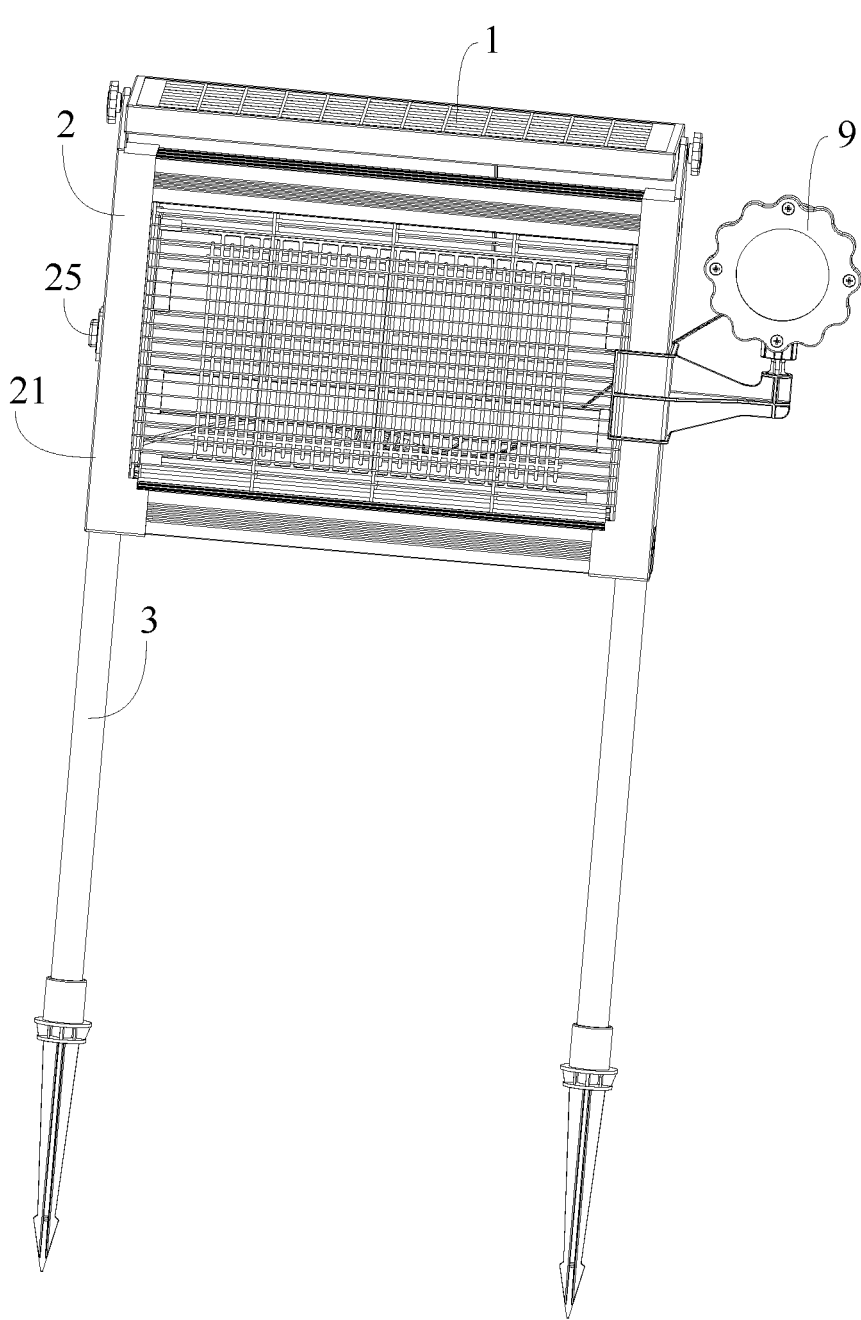
FIG. 84 is a sixth schematic view of the solar mosquito killer according to a second embodiment of present application.

Of course, as shown in FIGS. 82 to 84, the installation member 6 and the aforementioned electrical connection assembly 4 can also be assembled together.

Figure 85:
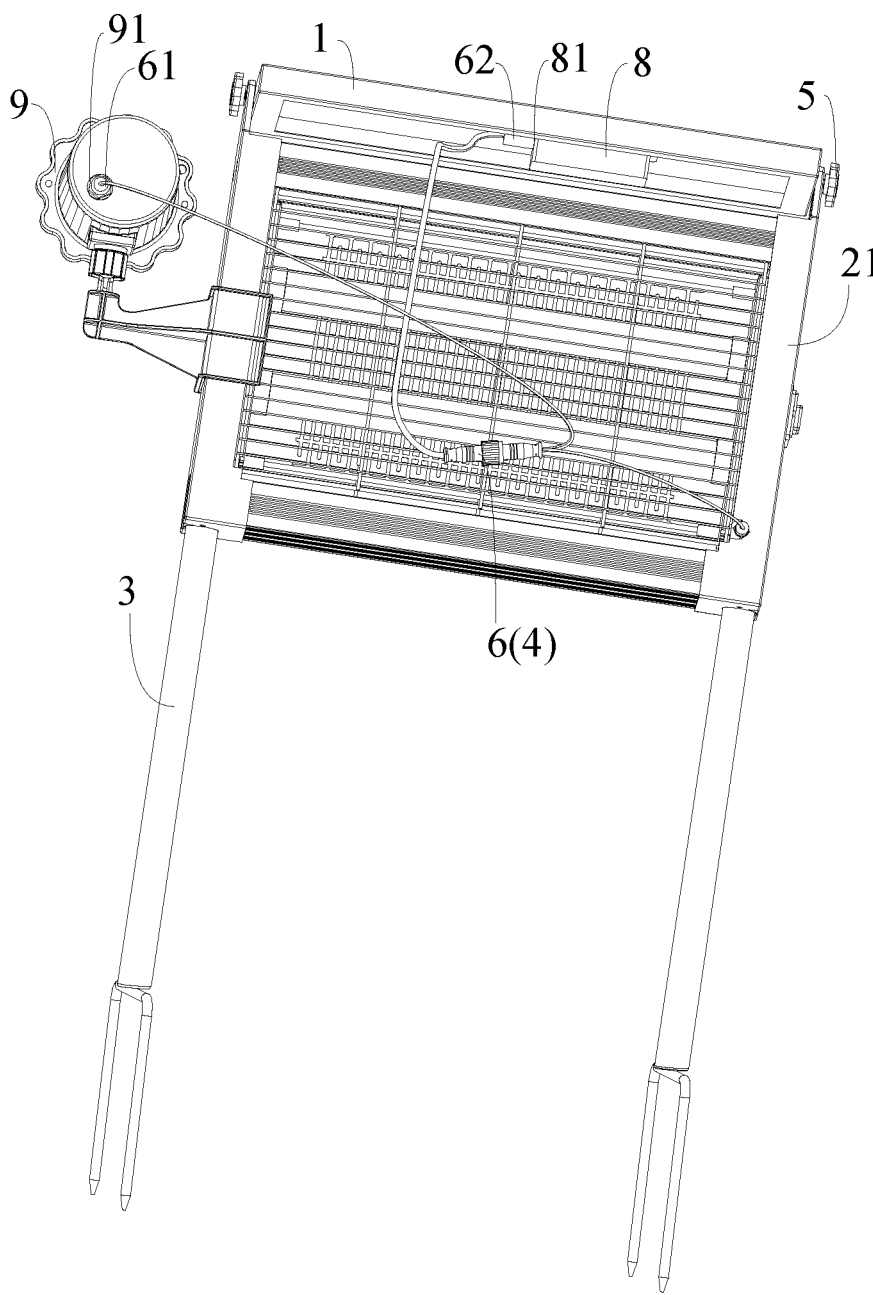
FIG. 85 is a seventh schematic view of the solar mosquito killer according to a second embodiment of present application.
Figure 86:
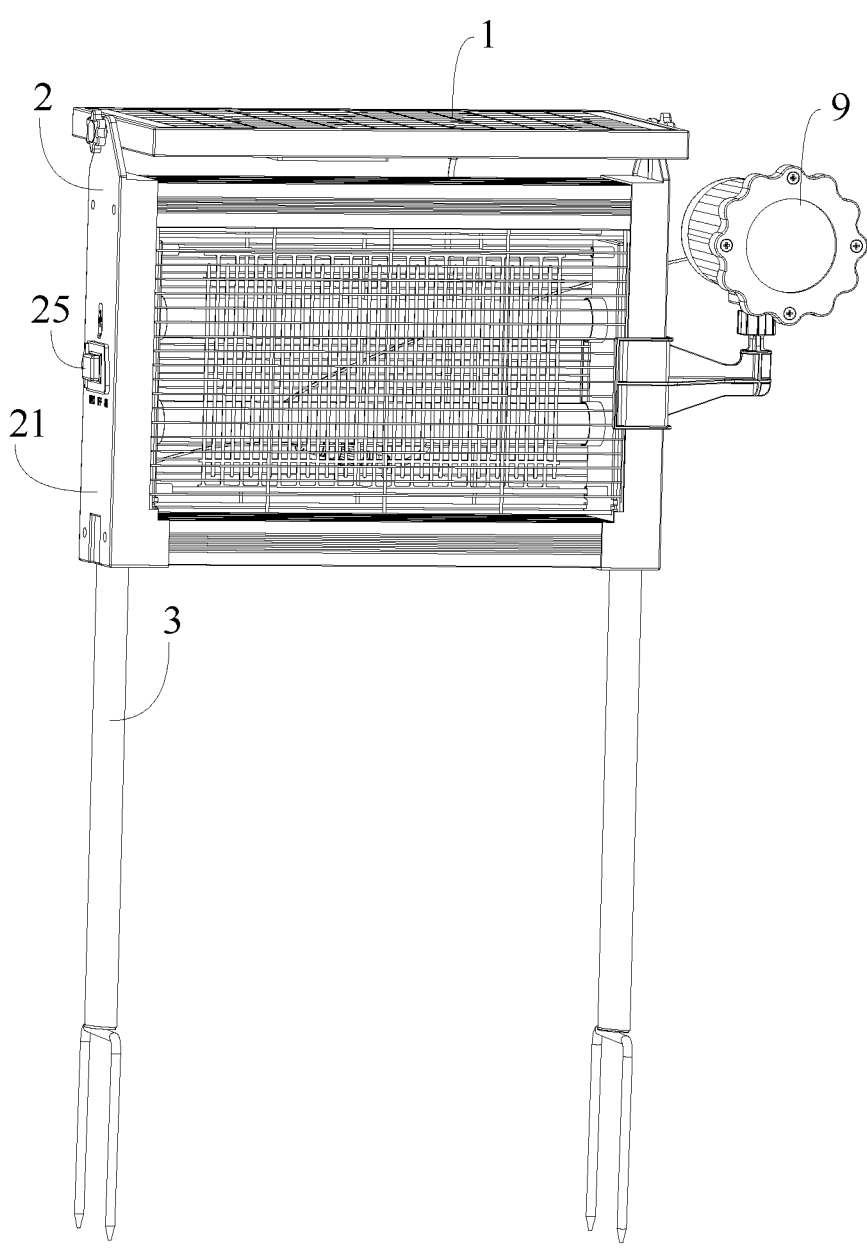
FIG. 86 shows another view of the solar mosquito killer of FIG. 85.
Figure 87:
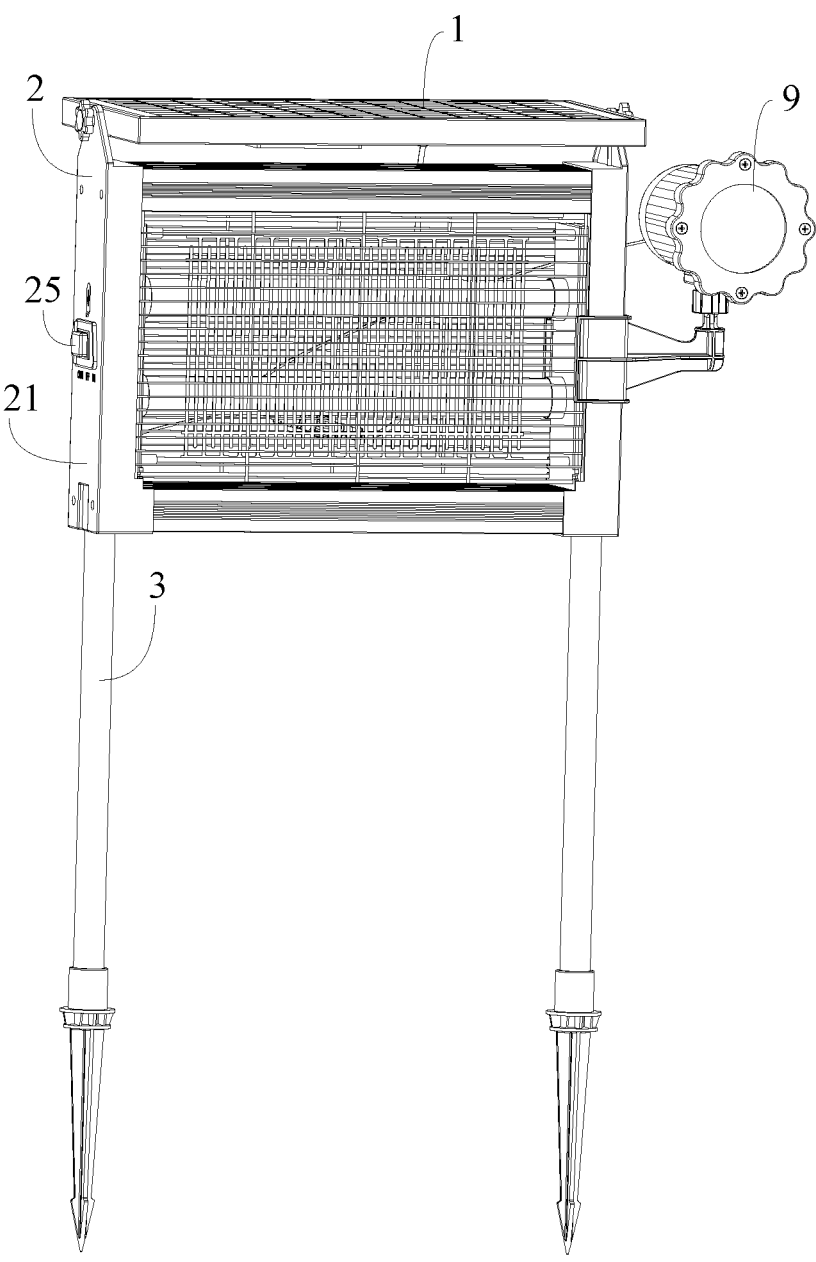
FIG. 87 is a eighth schematic view of the solar mosquito killer according to a second embodiment of present application.

When the battery 8 is set on the solar module 1, as shown in FIGS. 85 to 87, one end of the electrical connection component 4 is connected to the first connector 81 of the battery 8, the other end of the electrical connection component 4 is connected to the control component 23, the electrical connection installation part 61 of the mounting component 6 is connected to the second connector 91 of the lighting lamp 9, and the other electrical connection installation part 62 of the mounting component 6 is connected to the first connector 81 of the battery 8 (at this time, the mounting component 6 and the aforementioned electrical connection component 4 can also be assembled together). When the electrical connection installation part 61 of the installation member 6 is removed from the second connector 91 of the lighting lamp 9 and/or the other electrical connection installation part 62 of the installation member 6 is removed from the first connector 81 of the battery 8, the power circuit between the battery 8 and the lighting lamp 9 is disconnected, and the control component 23 cannot control the battery 8 to supply power to the lighting lamp 9; when the electrical connection installation part 61 of the installation member 6 is installed on the second connector 91 of the lighting lamp 9 and the other electrical connection installation part 62 of the installation member 6 is installed on the first connector 81 of the battery 8, the electrical circuit between the battery 8 and the lighting lamp 9 is conductive, and the control component 23 can control the battery 8 to directly supply power to the lighting lamp 9.

Embodiment 3

Figure 88:
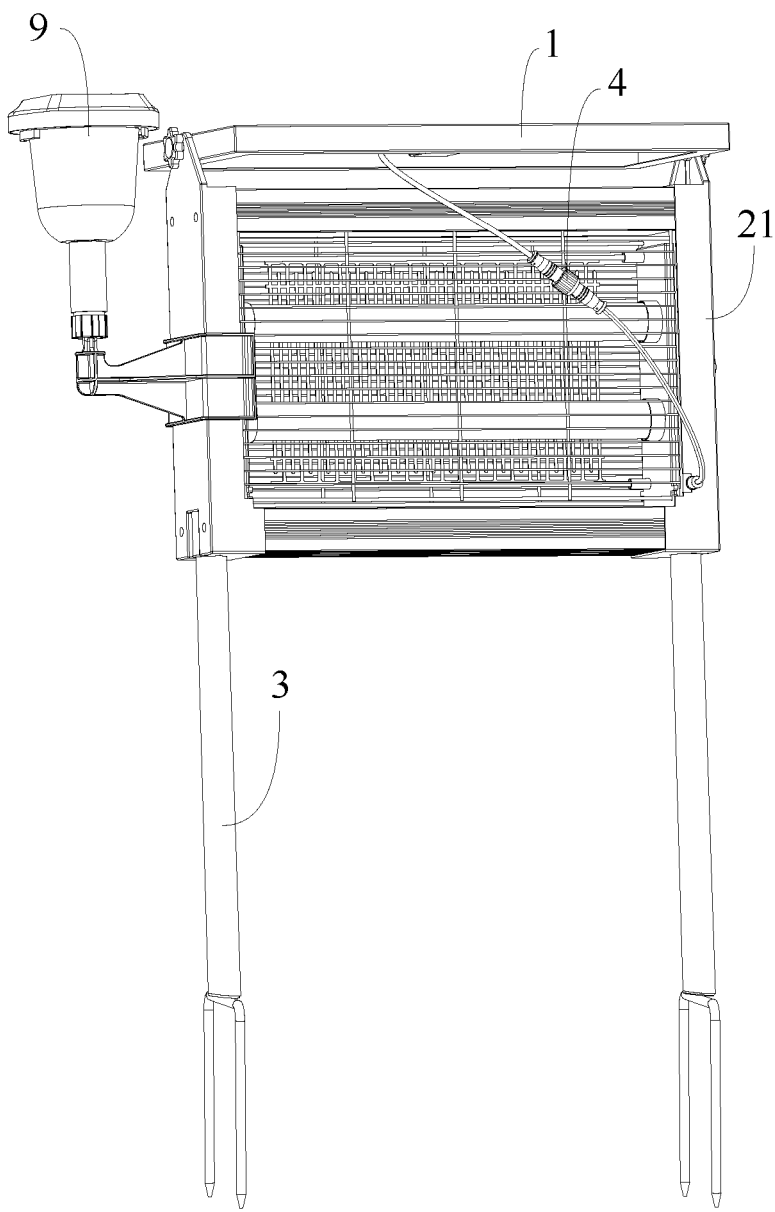
FIG. 88 is a first schematic view of the solar mosquito killer according to a third embodiment of present application.
Figure 89:
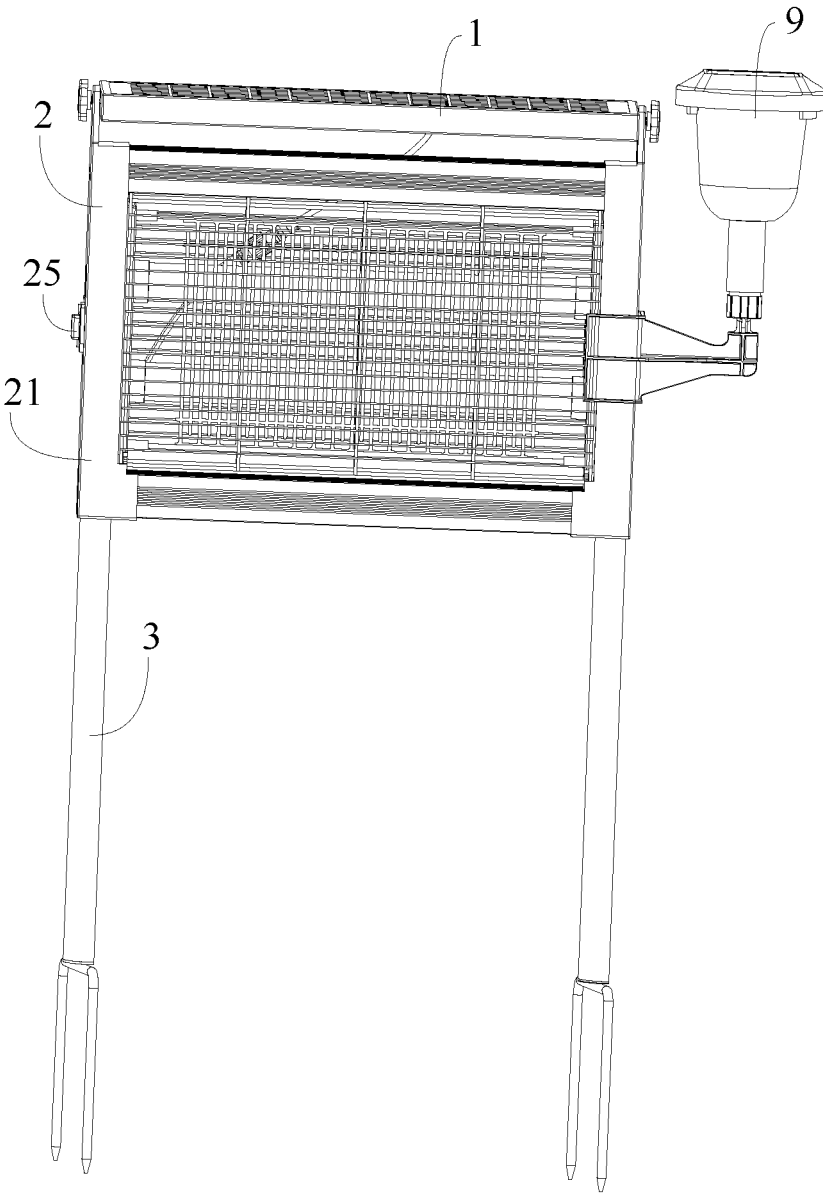
FIG. 89 is another schematic view of the solar mosquito killer of FIG. 88.
Figure 90:
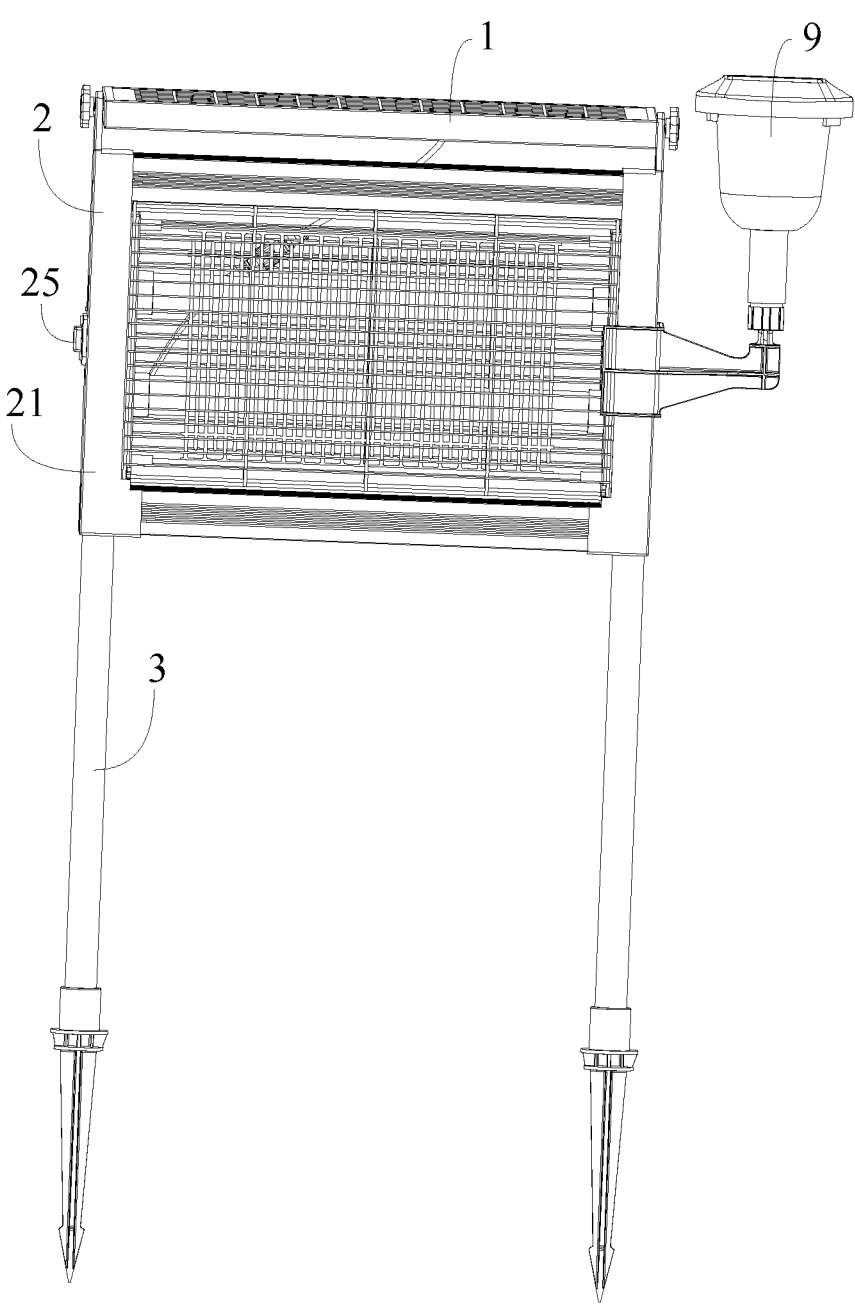
FIG. 90 is a second schematic view of the solar mosquito killer according to a third embodiment of present application.

Please refer to FIGS. 88 to 90, the third embodiment of the present application provides a solar powered mosquito killing device. It should be noted that the solar powered mosquito killing device in the third embodiment of the present application is structurally similar to the solar powered mosquito killing device in the first embodiment of the present application (and can refer to the introduction in the first embodiment). The following only focuses on the differences between the solar powered mosquito killing device in the third embodiment and the solar powered mosquito killing device in the first embodiment.

In this embodiment, as shown in FIGS. 88 to 90, the solar mosquito killer further includes a lighting lamp 9, which is installed on the frame component 21 (specifically the mounting column 211 introduced in the first embodiment above). The lighting lamp 9 is a solar lamp that can convert solar energy into electrical energy for its own illumination.

Embodiment 4

Figure 91:
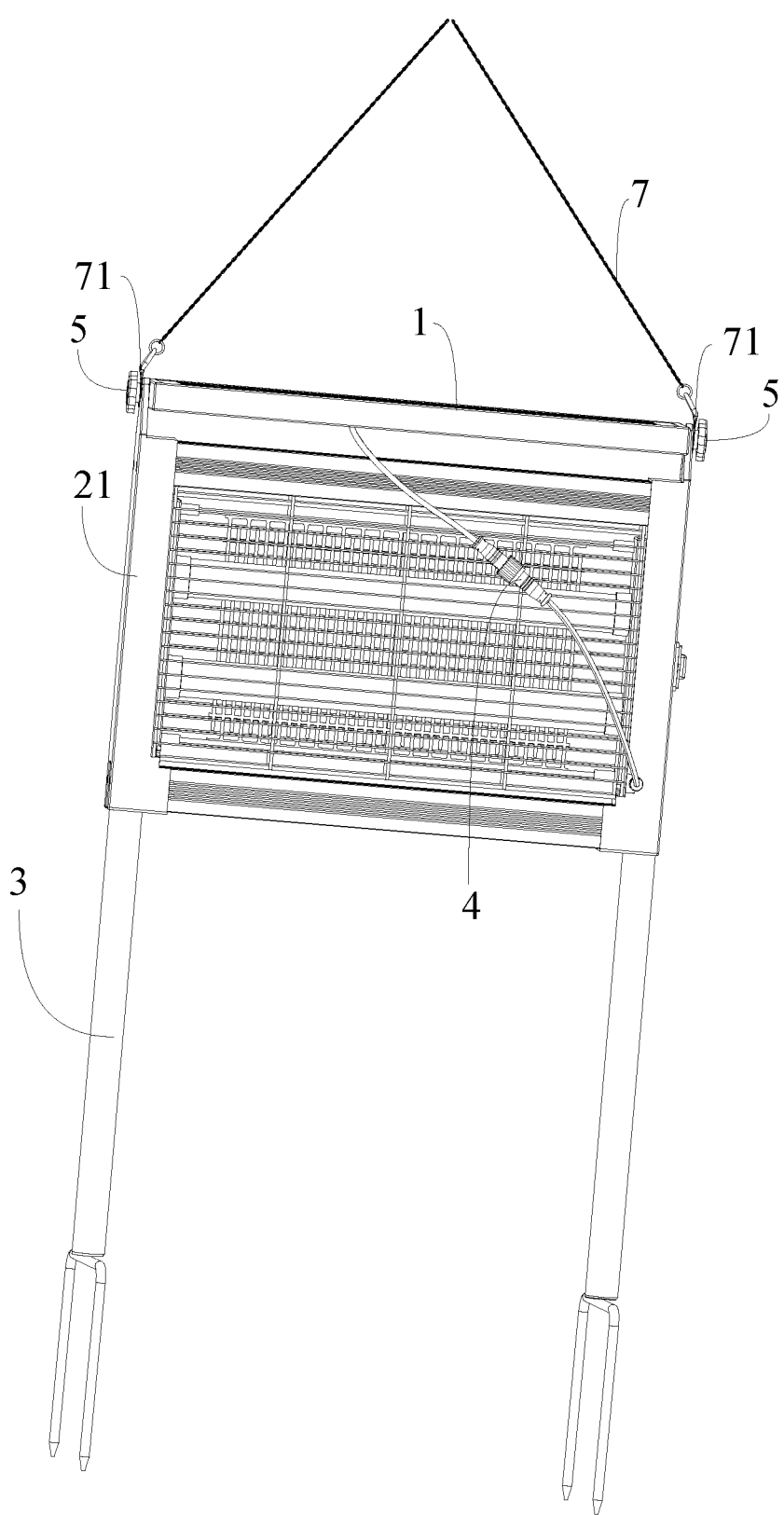
FIG. 91 is a first schematic view of the solar mosquito killer according to a fourth embodiment of present application.
Figure 92:
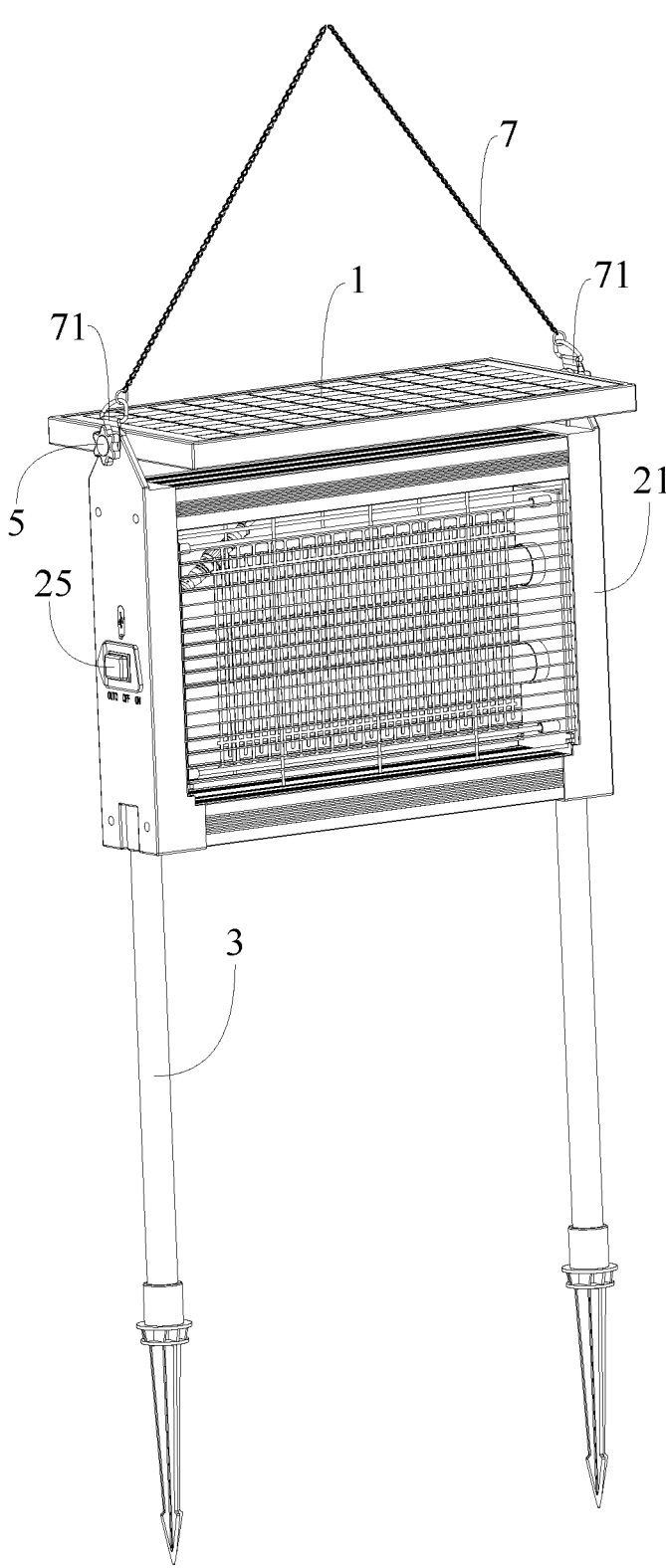
FIG. 92 is a second schematic view of the solar mosquito killer according to a fourth embodiment of present application.
Figure 93:
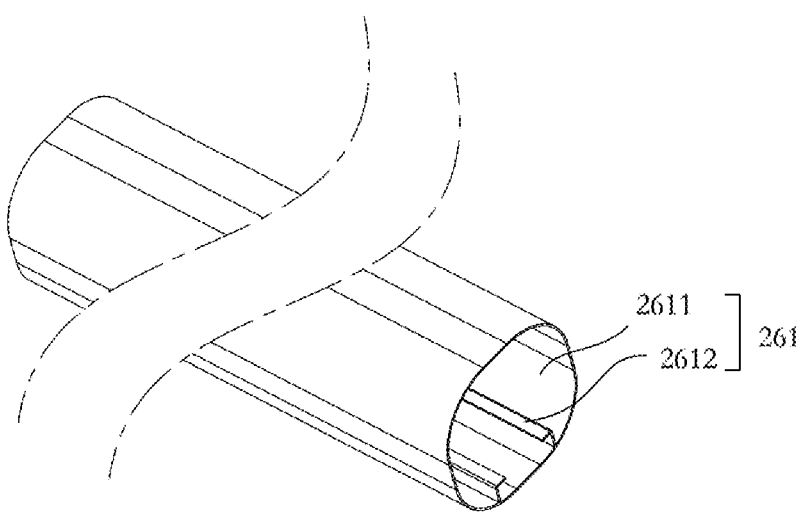
FIG. 93 is schematic view of the lampshade of the mosquito trap lamp of the solar mosquito killer according to a fifth embodiment of present application.
Figure 94:
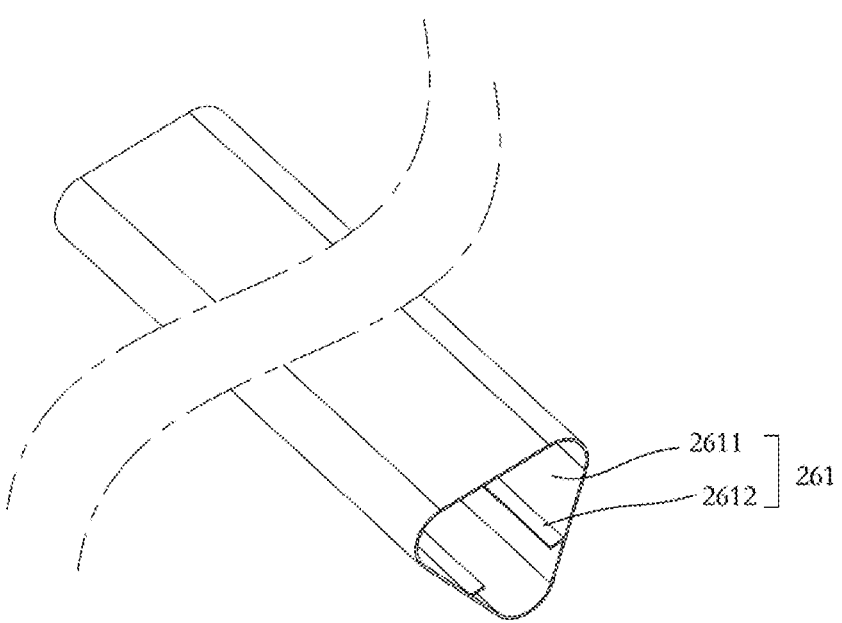
FIG. 94 is schematic view of the lampshade of the mosquito trap lamp of the solar mosquito killer according to a sixth embodiment of present application.
Figure 95:
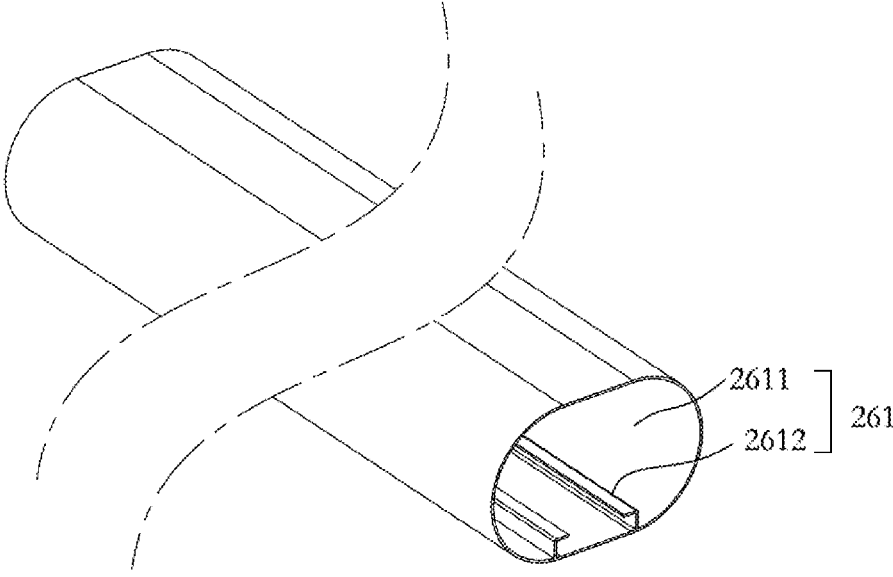
FIG. 95 is schematic view of the lampshade of the mosquito trap lamp of the solar mosquito killer according to a seventh embodiment of present application.
Figure 96:
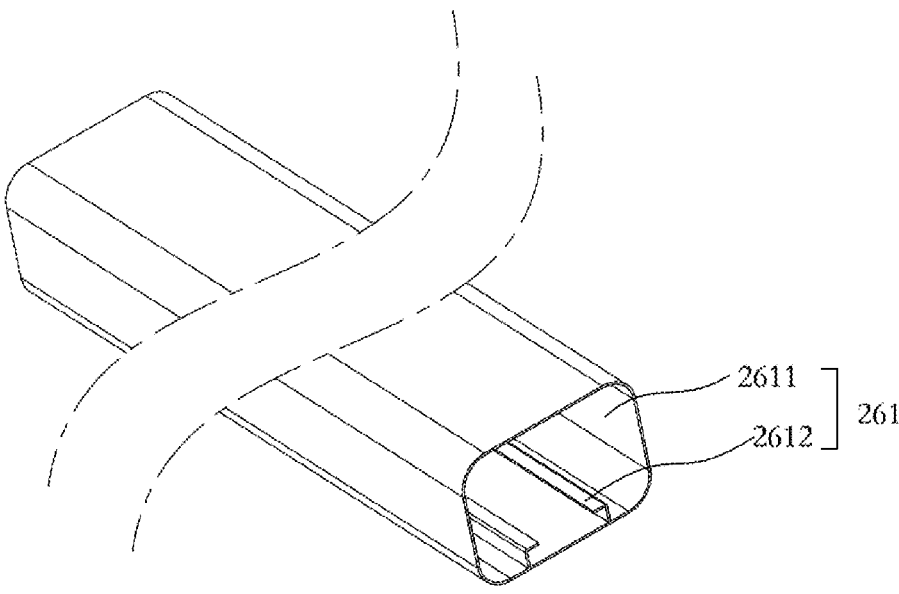
FIG. 96 is schematic view of the lampshade of the mosquito trap lamp of the solar mosquito killer according to an eighth embodiment of present application.
Figure 97:
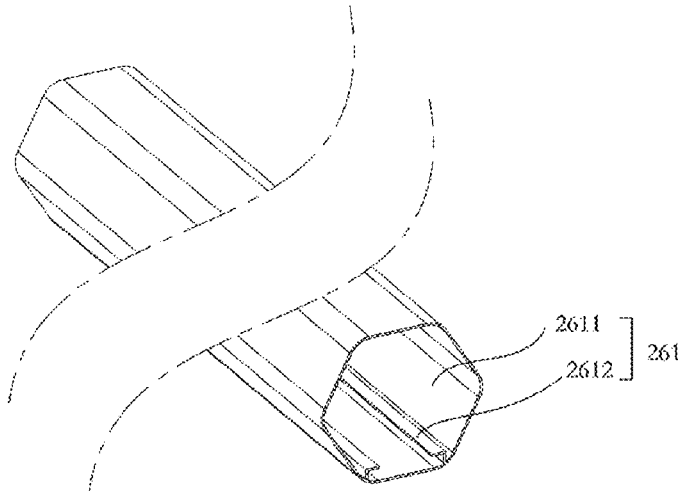
FIG. 97 is schematic view of the lampshade of the mosquito trap lamp of the solar mosquito killer according to a ninth embodiment of present application.

Please refer to FIG. 91 and FIG. 92, the fourth embodiment of the present application provides a solar powered mosquito killing device. It should be noted that the solar powered mosquito killing device in the fourth embodiment of the present application is structurally similar to the solar mosquito killer in the first embodiment of the present application (and can refer to the introduction in the first embodiment). The following only focuses on the differences between the solar mosquito killer in the fourth embodiment and the solar mosquito killer in the first embodiment.

In this embodiment, as shown in FIGS. 91 and 92, the solar mosquito killer further comprises a hanging chain 7, and hanging chain connectors 71 are respectively provided on the opposite sides of the frame component 21 (specifically the two mounting columns 211 introduced above). The two ends of the hanging chain 7 are used for detachable connection with the two hanging chain connectors 71, and the hanging chain 7 is used to hang the mosquito killing module 2 on an external object. Among them, the hanging chain 7 can be detachably connected to the hanging chain connector 71 through at least one of hooking, screwing, clamping, or plugging methods. By designing the hanging chain 7, when the supporting module 3 is removed from the mosquito killing module 2, the mosquito killing module 2 can be hooked onto objects such as tree branches or hooks through the hanging chain 7, achieving the multi scenario use of the solar mosquito killing device in this application.

Embodiments 5-9

In this embodiment, the shape of the lampshade 261 of the mosquito trap lamp 26 can be different from the circular shape in embodiment one. Specifically, it can be set as a quadrilateral with chamfers, a triangle with chamfers, an ellipse, an edgeless shape with chamfers, and a hexagonal shape with chamfers. However, all of them include a shade body 2611 and a fixed part 2612 connected to the inside of the shade body 2611. The fixed part 2612 and the shade body 2612 enclose a strip-shaped storage slot, and the circuit board component slides into the storage slot from one end of the lampshade 261 to be fixed in the storage slot.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A solar mosquito killer, comprising:
a solar module (1);
a mosquito killing module (2), wherein the mosquito killing module (2) is located on one side of solar module (1), and comprises a frame component (21), an electric grid (22) located in the frame component (21), a control component (23) electrically connected to the electric grid (22), and a button (24) set on the frame component (21) and electrically connected to the control component (23); and
a supporting module (3), wherein the supporting module (3) is detachably connected to the mosquito killing module (2) to support the mosquito killing module (2);
wherein the button (24) has multiple gears, corresponding to the automatic working state, normally off state, and normally on state of the mosquito killing module; in the automatic working state, the mosquito killing module is capable of automatically turning off a mosquito killing state or turning on a mosquito killing state according to a working state of the solar module;
wherein the button (24) comprises a first switch (K1) and a second switch (K2); the solar mosquito killer further comprises a switch control circuit (232) which includes a third switch (Q2), with two conducting terminals of the third switch (Q2) respectively connected between the button (24) and the mosquito killing module (2); the second switch (K2) is connected between the solar module (1) and the third switch (Q2), and the first switch (K1) is connected in parallel with the third switch (Q2).

2. The solar mosquito killer according to claim 1, further comprising a flexible waterproof cover (25) covering the button (24); wherein the flexible waterproof cover (25) comprises a main body portion (251) covering the button (24) and a connecting portion (252) connecting the main body portion (251), and the connecting portion (252) is fixed to the frame component (21).

3. The solar mosquito killer according to claim 1, further comprising a flexible waterproof cover (25) covering the button (24); wherein flexible waterproof cover (25) is made of a transparent material, and is fixed to the frame component (21) by glue and covers a periphery of the button (24).

4. The solar mosquito killer according to claim 1, wherein the electric grid (22) comprises a positive electrode component (221), a negative electrode component (222), and at least one connecting strip (223), the positive electrode component (221) comprises a positive electrode connecting part (2211) and multiple positive electrode strips (2212) sequentially connected to the positive electrode connecting part (2211); the negative electrode component (222) comprises a positive electrode connecting part (2221) and multiple negative electrode strips (2222) sequentially connected to the positive electrode connecting part (2221); the multiple positive electrode strips (2212) and the multiple negative electrode strips (2222) are alternately arranged at intervals and located between the positive electrode connecting part (2211) and the positive electrode connecting part (2221), at least one connecting strip (223) connects the multiple positive electrode strips (2212) and the multiple negative electrode strips (2222) as a whole;
the control component (23) further comprises a boost circuit (233), and a supply voltage (V1) is further provided to an input terminal (IN) of the boost circuit (233), the boost circuit (233) comprises a boost device (T1) to boost the supply voltage (V1), and outputs a driving voltage from a first output terminal (VNU) and a second output terminal (VU1), two ends of the first output terminal (VNU) and the second output terminal (VU1) are respectively used to connect the positive electrode component (221) and the negative electrode component (222).

5. The solar mosquito killer according to claim 4, wherein the at least one connecting strip (223) includes two connecting strips (223), one of the connecting strips (223) is located near the positive electrode connecting part (2211), and the other one of the connecting strips (223) is located near the negative electrode connecting part (2221); the two connecting strips (223) are arranged parallel to each other, and the at least one connecting strip (223) is made of a transparent material; the multiple positive electrode strips (2212) and the multiple negative electrode strips (2222) are parallel to each other, and the at least one connecting strip (223) is perpendicular to each of the multiple positive electrode strips (2212) and each of the multiple negative electrode strips (2222);
the first output terminal (VNU) and the second output terminal (VU1) are connected to a first connector joint, and the positive electrode component (221) and the negative electrode component (222) are connected to a second connector joint, and the first connector joint and the second connector joint are plugged together to achieve electrical connection between the first output terminal (VNU), the second output terminal (VU1) and the electric grid (22).

6. The solar mosquito killer according to claim 1, wherein the frame component (21) comprises two mounting columns (211), a top beam (212), a bottom beam (213), and two protective nets (214), the two mounting columns (211), the top beam (212), the bottom beam (213), and the two protective nets (214) are connected to each other to form a frame; the two mounting columns (211) are arranged opposite to each other, and the top beam (212) is arranged opposite to the bottom beam (213); the two protective nets (214) are arranged opposite to each other; both mounting columns (211) are provided with first insertion holes (2111) for installation at both ends of the electric grid (22); and the control component (23) and the button (24) are both installed on one of the mounting columns (211).

7. The solar mosquito killer according to claim 1, wherein the control component (23) of the mosquito killing module (2) comprises a control chip (U1), and a power supply terminal (VIN) of the control chip (U1) is electrically connected to a power supply interface (29) and the solar module (1) through node (VYH), an output terminal (LX) of the control chip (U1) is electrically connected to a battery (8) through a node (VK), the control chip (U1) obtains electrical energy from at least one of the power supply interface (29) and the solar module (1) to work and charge the battery (8).

8. The solar mosquito killer according to claim 7, the output terminal (LX) of the control chip (U1) is able to provide a charging voltage to the battery (8), an output terminal (LX) of the control chip U1 provides an charging voltage to the battery (8) through an inductor (L1), the control chip (U1) controls the charging signal output by the output terminal (LX) based on a real-time voltage of the battery (8); during an initial charging stage of the battery (8), if a real-time voltage of the battery (8) is within a first voltage range, the control chip (U1) controls an charging signal of the output terminal (LX) to charge the battery (8) at a first working current; during a middle charging stage of the battery (8), if the real-time voltage of the battery (8) is within a second voltage range, the control chip (U1) controls the charging signal of output terminal (LX) to charge the battery (8) at a second working current which is greater than the first working current; during a later charging stage of the battery (8), if the real-time voltage of the battery (8) is within a third voltage range, the control chip (U1) controls the charging signal of the output terminal (LX) to charge the battery (8) at a preset working voltage which is greater than the second voltage range.

9. The solar mosquito killer according to claim 1, wherein the switch control circuit (232) further comprises a fourth switch (Q3) and a fifth switch (Q4), two conducting terminals of the fourth switch (Q2) are respectively connected between the button (24) and mosquito control module (2), a control terminal of the third switch (Q2) is grounded through two conducting terminals of the fourth switch (Q3), and a control terminal of the fourth switch (Q3) is grounded through two conducting terminals of the fifth switch (Q4), and a control terminal of the fifth switch (Q4) is electrically connected to the solar module (1), in the normally off state, the second switch (K2) is disconnected, the first switch K1 is disconnected, the solar module (1) and battery (8) cannot supply power to the mosquito killing module (2), and the mosquito killing module (2) is in the off state;

in the normally on state, the second switch (K2) is conductive, the first switch (K1) is conductive, and at least one of the solar module (1) and the battery (8) supplies power to the mosquito killing module (2), which is in the on state, In the automatic working state, the second switch (K2) is turned on and the first switch (K1) is turned off, a voltage of the output terminal (SUN IN) of the solar module (1) controls the three switches (Q4, Q3, and Q2), thereby further controlling the conduction and turning off the third switch (Q2).

10. The solar mosquito killer according to claim 9, wherein during the day, when the output terminal (SUN IN) of solar module 1 has sufficient voltage to control the third switch (Q2) to be turned off through the fourth and fifth switches (Q3 and Q4), the solar module (1) supplies power to the mosquito control module (2) through the first switch (K1); in the evening or at night, the output terminal (SUN IN) of solar module (1) does not have enough voltage to control the fifth switch (Q4) to be turned off, causing the fourth switch (Q3) to conduct and the third switch (Q2) to conduct, and the battery (8) supplies power to mosquito control module (2) through switch third switch (Q2), an isolation circuit (234) is installed between solar module (1) and the button (24), the isolation circuit (234) comprises multiple unidirectional conducting diodes, an unidirectional component (D4) is set between the battery (8) and the button (24).

11. A solar mosquito killer, comprising:

a solar module (1);

a mosquito killing module (2), wherein the mosquito killing module (2) is located on one side of solar module (1), and comprises a frame component (21), an electric grid (22) located in the frame component (21), a control component (23) electrically connected to the electric grid (22), and a button (24) set on the frame component (21) and electrically connected to the control component (23); and a supporting module (3), wherein the supporting module (3) is detachably connected to the mosquito killing module (2) to support the mosquito killing module (2);

wherein the frame component (21) comprises two mounting columns (211), a top beam (212), a bottom beam (213), and two protective nets (214), the two mounting columns (211), the top beam (212), the bottom beam (213), and the two protective nets (214) are connected to each other to form a frame; the two mounting columns (211) are arranged opposite to each other, and the top beam (212) is arranged opposite to the bottom beam (213); the two protective nets (214) are arranged opposite to each other; both mounting columns (211) are provided with first insertion holes (2111) for installation at both ends of the electric grid (22); and the control component (23) and the button (24) are both installed on one of the mounting columns (211);

wherein the mosquito killing module (2) further comprises at least one mosquito trap lamp (26), and both mounting columns (211) are provided with second insertion holes (2112) for mounting at both ends of the at least one mosquito trap lamp (26); fixing slots (2113) are provided on both sides of the two mounting columns (211) near the protective nets (214), and the two ends of the protective nets (214) are installed in the fixing slots (2113);

the mosquito lure lamp (26) comprises a lampshade (261) and a circuit board component (262), the lampshade (261) comprises a shade body (2611) and a fixing portion (2612) connected to an inner side of the shade body (2611), the fixing part (2612) comprises two L-shaped fixing components arranged opposite to each other, the fixing portion (2612) and the shade body (2611) cooperatively enclose a strip-shaped storage slot, and the circuit board component (262) slides into the storage slot from one end of the lampshade (261) to be fixed in the storage slot.

12. The solar mosquito killer according to claim 11, wherein the circuit board component (262) includes multiple light emitting elements (2622), the light emitting elements (2622) are UV LEDs, and the peak wavelengths of the light emitting elements (2622) fall within the range of 360 nm to 405 µm, and a peak wavelength difference between the light emitting element with the highest peak wavelength (2622) and the light emitting element with the lowest peak wavelength (2622) is within 5 nm.

13. The solar mosquito killer according to claim 12, wherein the light emitting element (2622) further comprises a light emitting chip (2622c) and a convex lens structure (2622d) arranged above the light emitting chip (2622c); the convex lens structure (2622d) is used to converge the light emitted by the light emitting chip (2622c), and a peak wavelength of the light emitting chip (2622c) is between 369 nm-372 nm, 395 nm-400 nm, 397 nm-400 nm or 400 nm-403 nm.

14. A solar mosquito killer, comprising:
a solar module (1);
a mosquito killing module (2), wherein the mosquito killing module (2) is located on one side of solar module (1), and comprises a frame component (21), an electric grid (22) located in the frame component (21), a control component (23) electrically connected to the electric grid (22), and a button (24) set on the frame component (21) and electrically connected to the control component (23); and
a supporting module (3), wherein the supporting module (3) is detachably connected to the mosquito killing module (2) to support the mosquito killing module (2);
wherein the mosquito killing module (2) further comprises at least one mosquito trap lamp (26); and the solar mosquito killing device further comprises a lighting lamp (9) and an installation member (6) connected to the frame component (21), wherein the installation member (6) is electrically connected to the control component (23) and has an electrical connection installation part (61), the electrical connection installation part (61) is used for detachable connection of the lighting lamp (9), so that the control component (23) supplies power to the lighting lamp (9); and
wherein the lighting lamp (9) comprises a lamp body (92), a bracket (93), and a connecting structure (94), the lamp body (92) is connected to the bracket (93) through the connecting structure (94), and the bracket (93) is connected to the frame component (21).

15. The solar mosquito killer according to claim 14, wherein the connection structure (94) comprises a first connecting seat (941) and a second connecting seat (942); the first connecting seat (941) is fixedly connected to a bottom of the lamp body (92); the second connecting seat (942) comprises a seat body (9421), a connecting wall (9422), and a locking sleeve (9423); the seat body (9421) is detachably connected to the first connecting seat (941) through a clamping method;
the bracket (93) includes a frame body (931) and a connecting ball head (932), one end of the frame body (931) is in a U-shaped structure for clamping and connecting with the frame component (21), and another end of the frame body (931) is fixedly connected with the connecting ball head (932);
multiple connecting walls (9422) are arranged in a cantilever shape and fixedly connected to the seat body (9421), the multiple connecting walls (9422) cooperatively enclose a cavity (9422a) for inserting the connecting ball head (932), and the locking sleeve (9423) is configured to lock the multiple connecting walls (9422).

\* \* \* \* \*